United States Patent [19]
Yaguchi et al.

[11] Patent Number: 5,351,134
[45] Date of Patent: Sep. 27, 1994

[54] IMAGE COMMUNICATION SYSTEM, AND IMAGE COMMUNICATION APPARATUS AND MODEM USED IN THE SYSTEM

[75] Inventors: Tatsuya Yaguchi, Kanagawa; Takehiro Yoshida, Tokyo, both of Japan

[73] Assignee: Canon Kabushiki Kaisha, Tokyo, Japan

[21] Appl. No.: 994,471

[22] Filed: Dec. 21, 1992

Related U.S. Application Data

[63] Continuation of Ser. No. 887,598, May 21, 1992, abandoned, which is a continuation of Ser. No. 445,674, filed as PCT/JP89/00380, May 7, 1989, abandoned.

[30] Foreign Application Priority Data

| Apr. 7, 1988 | [JP] | Japan | 63-84178 |
| Apr. 7, 1988 | [JP] | Japan | 63-84179 |
| Jun. 30, 1988 | [JP] | Japan | 160688 |
| Sep. 29, 1988 | [JP] | Japan | 63-245103 |
| Sep. 29, 1988 | [JP] | Japan | 63-245104 |
| Feb. 10, 1989 | [JP] | Japan | 1-30028 |

[51] Int. Cl.$^5$ ............................................. H04N 1/00
[52] U.S. Cl. ............................ 358/435; 358/412; 358/405; 358/407; 379/100; 379/88; 379/67; 370/32
[58] Field of Search .......... 358/405, 407, 426, 261.1, 358/261.2, 261.3, 261.4, 262.1, 427, 430, 431, 433, 434, 435, 411, 412; 379/100, 88, 67; 455/78, 82, 85, 89; 370/26, 84; 371/30, 32

[56] References Cited

U.S. PATENT DOCUMENTS

| 4,630,126 | 12/1986 | Kaku et al. | 358/412 |
| 5,057,938 | 10/1991 | Edamura | 371/32 |
| 5,077,742 | 12/1991 | Tsumura et al. | 371/32 |
| 5,153,527 | 10/1992 | Yaguchi | 375/8 |
| 5,159,465 | 10/1992 | Maemura et al. | 358/405 |
| 5,172,246 | 12/1992 | Yoshida | 358/405 |
| 5,285,441 | 2/1994 | Bansal et al. | 370/16 |

FOREIGN PATENT DOCUMENTS

| 0080955 | 7/1981 | Japan . |
| 57-155856 | 9/1982 | Japan | H04L 1/04 |
| 0164376 | 9/1983 | Japan . |
| 58-198964 | 11/1983 | Japan | H04N 1/32 |
| 59-91752 | 5/1984 | Japan | H04L 11/00 |
| 59-117865 | 7/1984 | Japan . |
| 0010974 | 1/1985 | Japan . |
| 61-1130 | 1/1986 | Japan | H04L 1/00 |
| 63-36620 | 2/1988 | Japan | H04B 3/10 |
| 0311738 | 12/1989 | Japan . |

OTHER PUBLICATIONS

ICC 1980 Seattle, Wash.; *A One-Chip Modem LSI for Facsimile Modem Use*; pp. 11.6.(1–5); IEEE Journal.

*Primary Examiner*—Stephen Brinich
*Assistant Examiner*—Jerome Grant, III
*Attorney, Agent, or Firm*—Fitzpatrick, Cella, Harper & Scinto

[57] ABSTRACT

In an image communication system capable of performing communication at a plurality of transmission speeds, a transmission-side apparatus transmits a line condition check signal (a TCF signal of the CCITT facsimile recommendation T30, or the like) for determining a transmission speed prior to communication of image data. A reception-side apparatus determines an optimal transmission speed on the basis of a reception state of the line condition check signal (a square error accumulation value, an error count result, or the like in an equalizer of a reception-side modem), and informs the determined transmission speed or a fall-up or fall-down instruction of a transmission speed to a necessary step to the transmission-side apparatus. The optimal transmission speed according to a line condition can be set within a very short period of time.

60 Claims, 36 Drawing Sheets

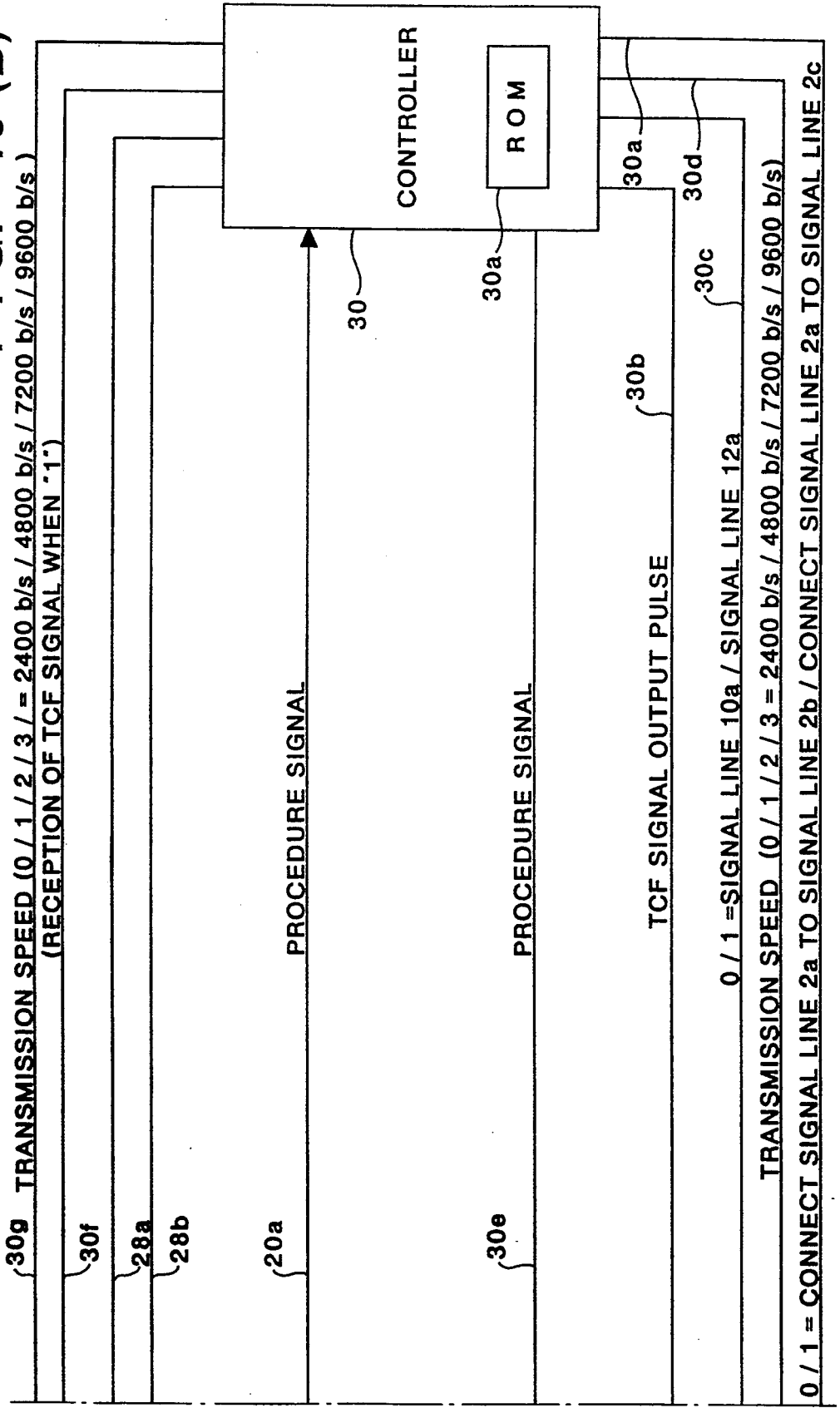

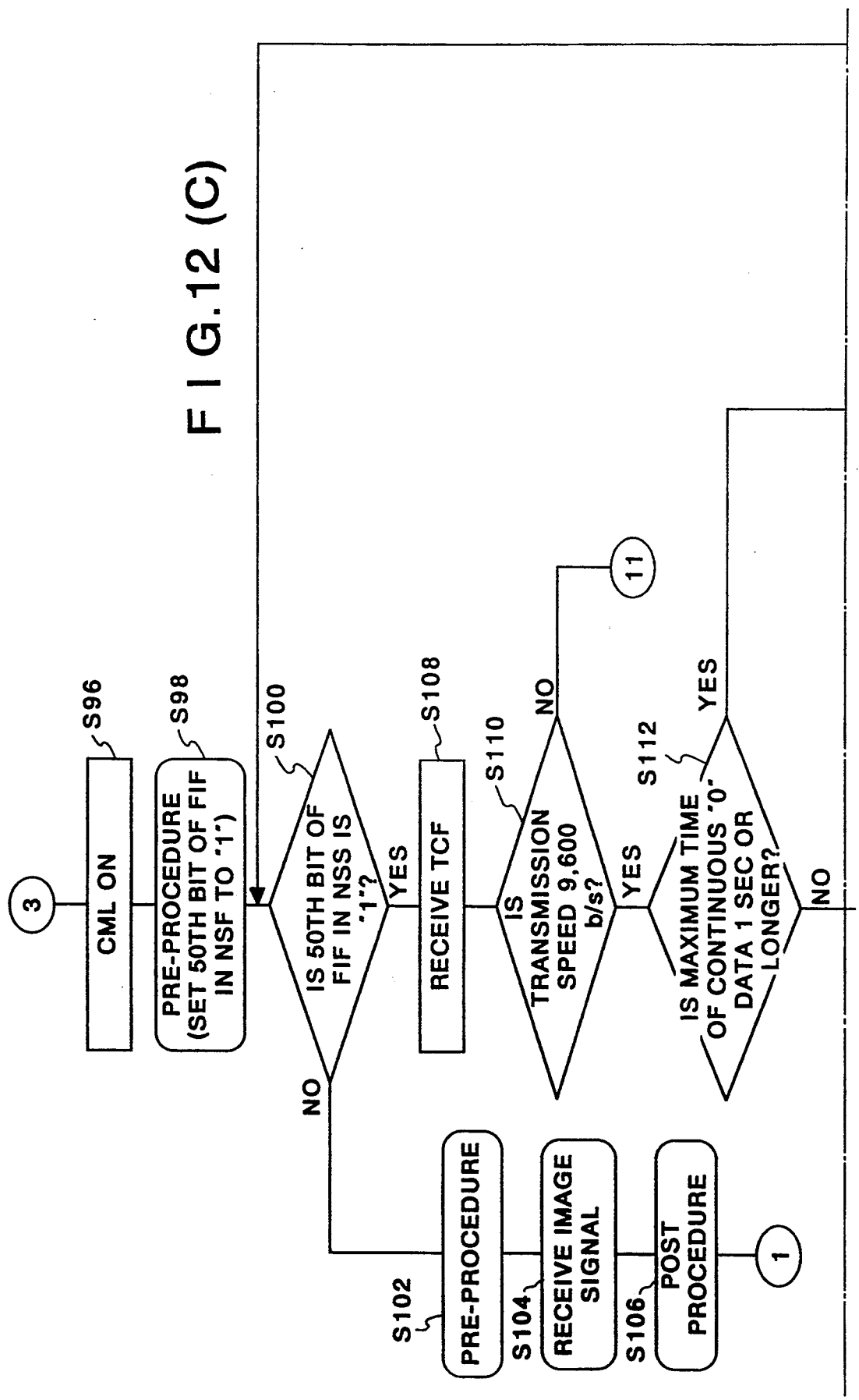

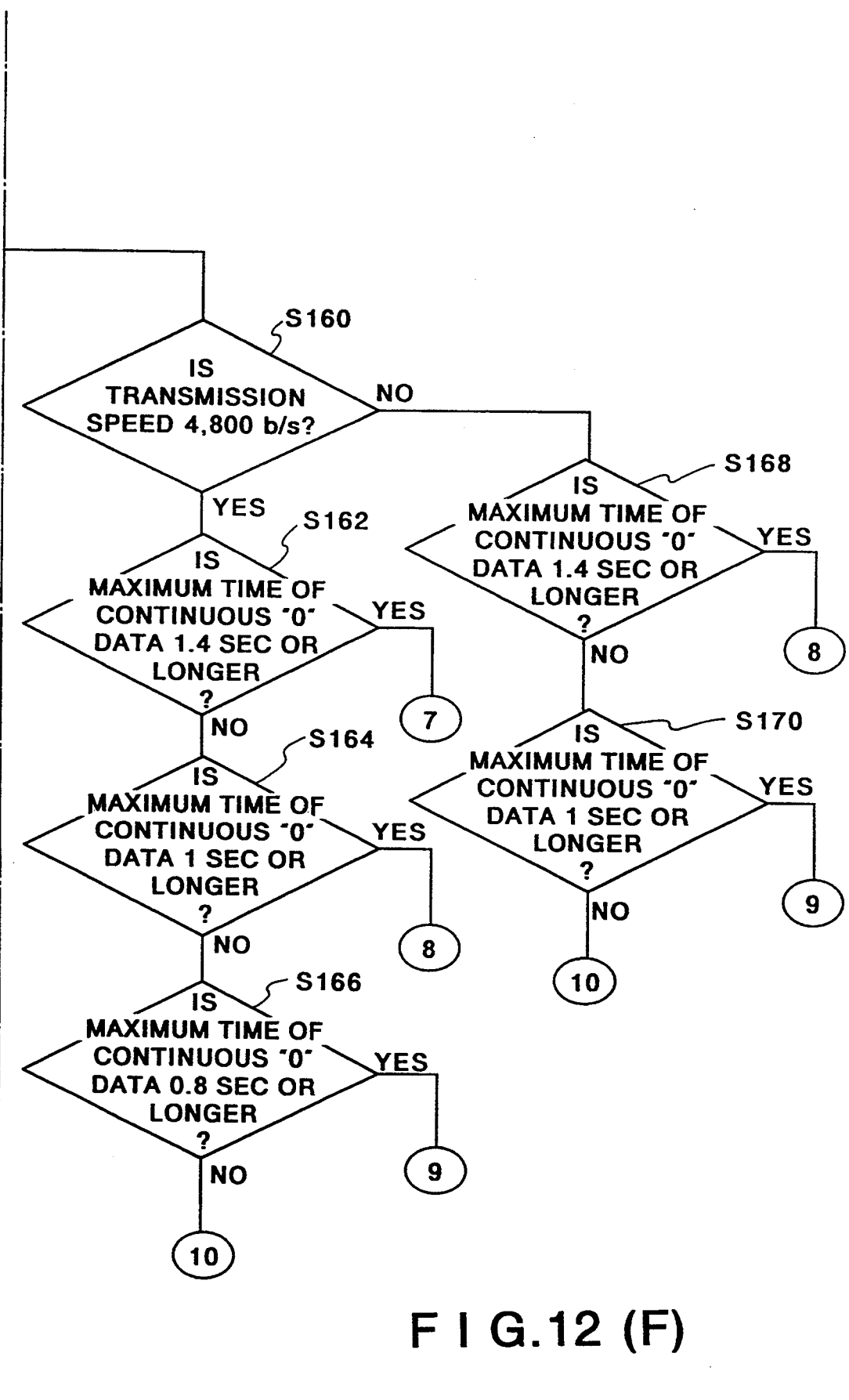
F I G. 12 (F)

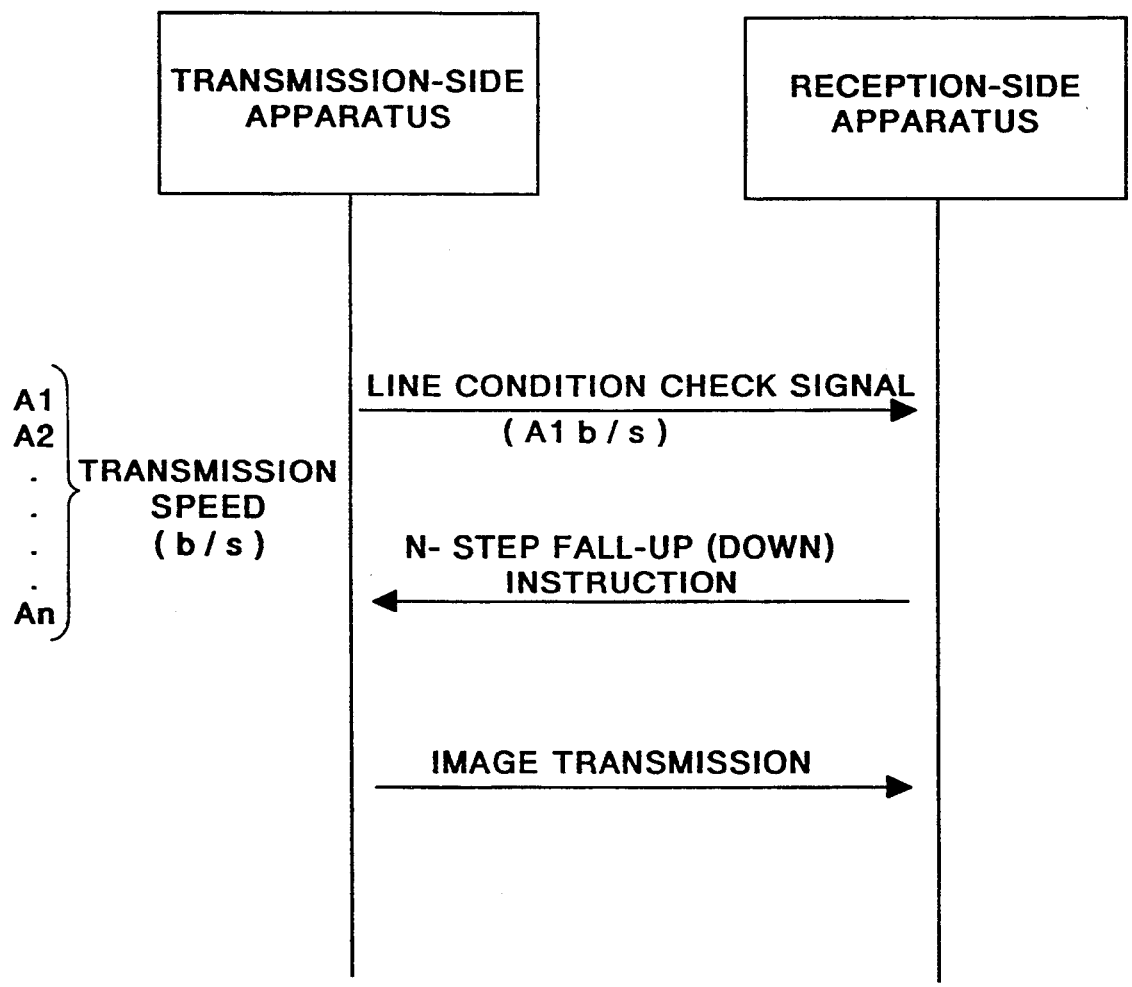
F I G. 13

IMAGE COMMUNICATION SYSTEM, AND IMAGE COMMUNICATION APPARATUS AND MODEM USED IN THE SYSTEM

This application is a continuation of application Ser. No. 07/887,598 filed May 21, 1992 which is abandoned and which is a continuation of Ser. No. 07,445,674 filed as PCT/JP89/00380, May 7, 1989, abandoned.

TECHNICAL FIELD

The present invention relates to an image communication system capable of performing communication at a plurality of communication speeds, and an image communication apparatus and a modem used in the system.

BACKGROUND ART

Conventionally, as a facsimile apparatus capable of performing communication at a plurality of communication speeds, a G3 standard facsimile apparatus defined in the CCITT recommendation T4 is known. A procedure of determining a communication speed in the conventional G3 standard facsimile apparatus will be described below.

In the G3 standard facsimile apparatus, prior to high-speed image transmission, an automatic equalizer of a reception-side modem is adjusted to be matched with line characteristics using a training signal and a training check signal. The adjustment result is discriminated, and the reception-side apparatus transmits, to a transmission-side apparatus, a signal representing that training is successful or a signal indicating that training is unsuccessful and re-training is required.

FIGS. 20(A,B) and 21 show communication control procedures of a general G3 standard facsimile apparatus.

In each of FIGS. 20(A,B) and 21, signals on the left-hand side of the central line are transmitted from a transmission-side apparatus (calling station) T, and signals on the right-hand side of the central line are transmitted from a reception-side apparatus (called station) R.

In FIGS. 20(A,B) and 21, an NSF (non-standard device) signal, a CSI (called station identification) signal, and a DIS (digital identification) signal are initial identification signals, and are used such that the reception-side apparatus informs its own facsimile functions to the transmission-side apparatus of a station on the other end of the line.

An NSS (non-standard device setting) signal, a TSI (transmission station identification) signal, and a DCS (digital command) signal are reception command signals transmitted from the transmission-side apparatus to designate a transmission mode to be used. When the transmission-side apparatus transmits a training check (TCF) signal after it transmits these signals and the reception-side apparatus sends back a CFR (reception ready confirmation) signal, a transmission speed of the following image signal to be transmitted is also designated.

The training check (TCF) signal is set to the reception-side apparatus R through a modulation system complying with the G3 standards, so that the reception-side apparatus R checks a training signal, and indicates whether or not a channel can be used at the designated speed. The format of the TCF signal is a continuous "0" signal for 1.5 sec±10%. The training signal transmitted immediately before the TCF signal is a sync signal for appropriately adjusting a reception-side modem. This sync signal is used for carrier detection, AGC (automatic gain control), timing synchronization, synchronization of a descrambler, and convergence of an equalizer (to be described later) if necessary.

The CFR (reception ready confirmation) signal and an FTT (train failure) signal are pre-message response signals transmitted from the reception-side apparatus.

The reception ready confirmation signal (CFR) is a digital response signal for confirming that all the pre-message procedures are completed and message transmission is ready to start.

The train failure (FTT) signal is an optional digital response signal for requesting to delete all or some of the pre-message procedures and to start re-training of a modulation system complying with the G3 standards.

A PIX signal is an image signal as a message. Immediately before transmission of this image signal, the training signal is transmitted.

An EOP signal is a procedure end signal. The EOP signal indicates an end of one page of facsimile information, and also indicates that control returns to the beginning of a phase B (pre-message procedure) of procedures.

An MCF signal is a message confirmation signal indicating that all the messages are received and an additional message can follow.

In the above description, when digital signal data is transmitted through a general public line as an analog line, the digital signal must be transmitted after it is modulated to be converted to a predetermined analog signal. A reception-side apparatus must demodulate the modulated signal, and a modem is necessary for this purpose.

A transmission speed upon data transmission tends to be increased. In some G3 facsimile systems, data is transmitted at a high data transmission speed of 9,600 bps (bits/sec). For this reason, a transmission signal modulated by a transmission-side modem and sent onto a line is distorted due to a line distortion, jitter, a timing error between transmission- and reception-side apparatuses, a carrier error, and the like, and is received by a reception-side modem.

The reception-side modem is assembled with an equalizer or the like for correcting the distortion. Before the received signal is output from the reception-side modem, it is corrected to be the original transmission signal.

A general operation of this equalizer will be described below with reference to FIG. 21 and FIGS. 22A to 22C.

In FIG. 21, reference numeral 10 denotes a transmission-side modem; 20, a reception-side modem; 21, an equalizer assembled in the reception-side modem 20; and 30, a line connecting both the modems.

A transmission signal $a_k$ output from the transmission-side modem 10 is sent onto the line 30 to have a uniform gain over the entire use range, as shown in FIG. 22A. However, the line 30 has frequency characteristics, and its transmission characteristics are as shown in FIG. 22B.

For this reason, a reception signal $R_k$ received at the reception-side modem 20 is influenced by the transmission characteristics, as shown in FIG. 22B. The reception-side modem 20 comprises the equalizer 21 having frequency characteristics shown in FIG. 22C, so that an output signal $a_k$ from the equalizer 21 has synthesized characteristics of FIGS. 22B and 22C. Both the frequency characteristics are opposite characteristics, and hence, the characteristics [those obtained by convoluting both the characteristics (a simple multiplication in a frequency region)] of the output signal $a_k$ become flat, as shown in FIG. 22A.

As a result, signal transmission free from distortion is achieved.

That is, the role of the equalizer 21 is to generate characteristics opposite to line characteristics.

With the above-mentioned method, in data communication such as facsimile communication using a public telephone line, line characteristics are equalized.

The table below shows training patterns for the equalizer which are transmitted immediately before the TCF signal and are recommended by the CCITT. V29 recommendation, and a fall-back mode will be described below with reference to the CCITT. V29 recommendation.

Note that segment 2 in the table below is a pattern for matching timing phases, and segment 3 is a pattern for adjusting the equalizer.

The table shows sync signals of the V29 recommendation, which are used for equalizing line characteristics prior to transmission/reception of facsimile image data.

Following the sync signal, a continuous "0" signal called a TCF (training check) is sent for 1.5 sec±10% so as to confirm whether or not line characteristics can be satisfactorily equalized.

TABLE

| | Type of Line Signal | Number of Symbol Intervals | Approximate Processing Time: (ms) |
|---|---|---|---|
| Segment 1 | No Energy to be Transmitted | 48 | 20 |
| Segment 2 | Alternate | 128 | 53 |
| Segment 3 | Pattern for Adjusting Equalizer | 384 | 160 |
| Segment 4 | Scrambled Data "1" | 48 | 20 |
| Total of Segments | Total of Sync Signals | 609 | 253 |

In FIGS. 20(A,B) and 21, both the transmission-reception-side apparatuses comprise modems having a function of transmitting data at transmission speeds of 2,400 bps, 4,800 bps, 7,200 bps, and 9,600 bps.

Therefore, the transmission-side apparatus first sends a sync signal having a transmission speed of 9,600 bps, and then sends the TCF.

The reception-side apparatus performs AGC control, timing extraction, equalizer adjustment, synchronization of a descrambler, and the like during reception of the sync signal.

During a TCF period, e.g., for 1 sec, it is checked if there is an error. If an error is detected, the reception-side apparatus sends back an FTT (training failure) signal to the transmission-side apparatus, and falls back the transmission speed to 7,200 bps. If no error is detected, the reception-side apparatus transmits a CFR (reception confirmation signal) to the transmission-side apparatus, and image data transmission/reception is performed at 9,600 bps without falling back a transmission speed.

FIG. 20A exemplifies that the transmission-side apparatus tries to transmit data at a transmission speed of 9,600 bps, the reception-side apparatus sends the CFR signal since it can correctly receive the TCF signal, and then image transmission is performed at 9,600 bps.

A function of judging whether the reception-side apparatus transmits the CFR or FTT signal after it receives the TCF signal is not standardized, and varies depending on individual apparatuses. Thus, there is a room for manufacturers to show features in their models.

For example, a demodulated TCF signal is checked, and when "0" data can be continuously received for 1.0 sec or more, the CFR signal is transmitted; otherwise, the FTT signal is transmitted.

FIG. 21 exemplifies a case of a poor line condition.

More specifically, although the transmission-side apparatus tries to transmit data at 9,600 bps, the reception-side apparatus cannot converge an equalizer due to the poor line condition and cannot correctly receive the TCF signal. In this case, the reception-side apparatus transmits the FTT signal. The transmission-side apparatus tries to transmit data at 7,200 bps upon reception of the FTT signal. Since the reception-side apparatus cannot correctly receive the TCF signal yet, it transmits the FTT signal again. For this reason, the transmission-side apparatus tries to transmit data at 4,800 bps. Since the reception-side apparatus cannot correctly receive the TCF signal yet, it transmits the FTT signal again.

When the transmission-side apparatus receives the FTT signal for the TCF signal at a transmission speed of 9,600 bps or 7,200 bps as described above, it immediately transits to transmission processing of the TCF signal for 7,200 bps or 4,800 bps.

However, for the TCF signal at 4,800 bps or 2,400 bps, when the FTT signal is received twice, the control transits to transmission processing of the TCF signal from 4,800 bps to 2,400 bps or from 2,400 bps to disconnection of the line for the following reason.

That is, at 4,800 bps or 2,400 bps, transmission is tried to be performed at that speed if possible.

Since the transmission-side apparatus performs such communication control, it tries to transmit data at 4,800 bps again after reception of the first FTT signal at 4,800 bps. When the reception-side apparatus cannot correctly receive the TCF signal yet, it transmits the FTT signal. At this time, since the transmission-side apparatus has received the FTT signal twice for transmission of the TCF signal at 4,800 bps, it then tries to transmit data at 2,400 bps.

For example, in FIG. 20A, since the reception-side apparatus can correctly receive the TCF signal at 2,400 bps first, it transmits the CFR signal. For this reason, the transmission-side apparatus transmits an image signal at 2,400 bps.

However, the conventional system has the following problem for a line condition check signal (TCF signal) for checking whether or not an image signal can be transmitted at the designated transmission speed. That is, the reception-side apparatus can only make two judgments, i.e., whether or not the reception-side apparatus can perform transmission at the designated transmission speed, and whether or not transmission is impossible at the designated transmission speed.

More specifically, as shown in FIG. 20B, when the line condition is poor, the transmission speed falls back from 9,600 bps to 7,200 bps, 4,800 bps, and 2,400 bps in turn. Therefore, a very long processing time is required for pre-procedures.

Therefore, when the transmission line characteristics are poor, an effective transmission speed using a V27ter modem (4,800 bps, 2,400 bps) is often higher than that using a V29 modem (9,600 bps, 7,200 bps).

In future, high-speed modems having transmission speeds of 12.0 kbps, 14.4 kbps, and 19.2 kbps will be recommended. However, if a fall-back mode like in the conventional system is used in the high-speed modems, the effective transmission efficiency would be further impaired.

For example, even if both the transmission- and reception-side apparatuses have a function of transmitting data at a transmission speed of 19.2 kbps, when a connected line condition is unexpectedly poor and transmission is performed at a transmission speed of 2,400 bps, if a transmission speed falls back one by one every time the FTT signal is received like in the prior art, the pre-procedures take about 42 sec until it ends (the reception-side apparatus transmits the CFR signal).

Recently, a so-called asymmetrical modem ("asymmetrical" means that an upstream transmission speed is not always equal to a downstream transmission speed) has been developed. As a simplest one of the asymmetrical modems, a tonal signal is known as a backward signal.

For example, when a 14.4-kbps modem is used, a time required for transmitting one page of an A4 standard original is 6 sec. Therefore, in consideration of this transmission time, it is wasteful to transmit a line condition check signal (e.g., the TCF signal) for checking whether or not a channel can be used at the designated transmission speed prior to transmission of image data. Thus, a further problem to be solved is posed.

DISCLOSURE OF INVENTION

The present invention has been made to solve the above problems, and has as its object to provide a modem which can reliably perform equalization processing within a very short period of time. As a means for solving the above problems, there is provided the following arrangement.

That is, an equalizer comprises a mean square error arithmetic circuit for calculating a mean square error during reception of predetermined scrambled data.

As the mean square error arithmetic circuit, a square error arithmetic circuit and an IDF filter are preferably connected to an output of an equalizer judging section.

An absolute value error arithmetic circuit or square error arithmetic circuit and a low-pass filter are preferably connected to the output of the equalizer judging section.

As another arrangement, the equalizer comprises a mean square error arithmetic circuit for calculating a mean square error during a TCF (training check) signal period (1.5 sec±10%).

As the mean square error arithmetic circuit, a square error arithmetic circuit and an IDF filter are preferably connected to an output of an equalizer judging section.

With the above-mentioned mean square error arithmetic circuit, a line equalization factor is measured, and an optimal transmission speed can be determined in a single training operation.

More specifically, a square error arithmetic circuit, an I.D.F. (Integrate and Dump Filter), and a comparator are added to the output side of the equalizer judging section of a reception-side modem, so that an equalization rate is calculated in a period of scrambled data "1" for the CCITT recommended synchronization, and an optimal transmission speed can be selected in accordance with the calculation result.

With another mean square error arithmetic circuit, a line equalization factor is measured, and an optimal transmission speed can be determined in a single training operation.

Furthermore, a square error arithmetic circuit, an I.D.F. (Integrate and Dump Filter), and a comparator are added to the output side of the equalizer judging section of a reception-side modem, so that an equalization rate is calculated in a TCF (training check) period of the CCITT facsimile recommendation T30, and an optimal transmission speed can be selected in accordance with the calculation result.

Moreover, according to the present invention, in an image communication system capable of performing communication at a plurality of transmission speeds, a line condition check signal for determining a transmission speed is transmitted in advance prior to transmission of image data, and an instruction is given to the transmission-side apparatus to fall up or back a transmission speed by one or a plurality of steps on the basis of the reception state of the check signal at the reception-side apparatus.

with the above-mentioned control, when both the transmission- and reception-side apparatuses have a function of performing transmission at transmission speeds of 2,400 bps, 4,800 bps, 7,200 bps, and 9,600 bps, a line condition check signal is transmitted at a transmission speed of 9,600 bps, and the reception-side apparatus can give the following instructions to the transmission-side apparatus in accordance with the reception state of the line condition check signal:

1. an instruction to allow transmission of an image signal at that transmission speed (9,600 bps)
2. an instruction to re-transmit the line condition check signal by falling back the transmission speed by one step (more specifically, at a transmission speed of 7,200 bps)
3. an instruction to re-transmit the line condition check signal by falling back the transmission speed by two steps (more specifically, at a transmission speed of 4,800 bps)
4. an instruction to re-transmit the line condition check signal by falling back the transmission speed by three steps (more specifically, at a transmission speed of 2,400 bps)
5. an instruction to fall back the transmission speed by four steps (more specifically, line disconnection)

The same applies to an apparatus having a function of 12,000 bps, 14,400 bps, and 19,200 bps. In this manner, when an apparatus has a function of performing transmission at a plurality of transmission speeds and a line condition is poor, a transmission speed can quickly fall back (or fall up) to an appropriate speed, a time required for determining an optimal transmission speed can be greatly shortened as compared to a conventional apparatus.

According to the present invention, in an image communication system for performing communication at one of a plurality of transmission speeds, a line condition check signal for determining a transmission speed is transmitted in advance prior to transmission of image data, and the reception-side apparatus transmits the check signal in advance, determines an optimal transmission speed on the basis of the reception condition of the check signal, and informs the determined transmission speed to the transmission-side apparatus.

With the above-mentioned control, in an image communication system capable of performing communication at a plurality of transmission speeds, a line condition check signal for determining the transmission speed is transmitted once prior to image transmission, and the reception-side apparatus determines an optimal transmission speed on the basis of the reception result of the check signal and informs the determined transmission speed to the transmission-side apparatus. Therefore, the transmission-side apparatus can immediately enter image transmission at the transmission speed informed from the reception-side apparatus.

Thus, when both the transmission- and reception-side apparatuses have a function of performing transmission at transmission speeds of 2,400 bps, 4,800 bps, 7,200 bps, and 9,600 bps, a line condition check signal (i.e., training/TCF signals) at 9,600 bps is transmitted first, and the reception-side apparatus can determine an optimal transmission speed in accordance with the reception state of this line condition check signal. The same applies to an apparatus having a function of performing transmission at transmission speeds of 12,000 bps, 14,400 bps, and 19,200 bps.

In this manner, when an apparatus has a function of performing transmission at a plurality of transmission speeds and a line condition is poor, the control can enter image transmission at a designated transmission speed by transmitting only one line condition check signal. Therefore, a time required for determining an optimal transmission speed can be greatly shortened as compared to a conventional apparatus.

In order to provide an image communication system which can greatly shorten a time required for determining an optimal transmission speed, the present invention comprises the following arrangement.

In an image communication system capable of performing communication at a plurality of transmission speeds and performing full duplex communication, after a reception-side apparatus declares a reception enable transmission speed, a transmission-side apparatus declares a transmission speed corresponding to the reception enable transmission speed, and subsequently starts transmission of an image signal at the declared transmission speed.

When the reception-side apparatus fails to receive the image signal at that transmission speed, it transmits a message as a backward signal indicating the reception failure, and subsequently transmits an instruction to fall back a transmission speed by the arbitrary number of steps.

According to the present invention, before transmission is performed at a plurality of transmission speeds in a full duplex communication mode, the reception-side apparatus first declares a reception enable transmission speed to the transmission-side apparatus using a procedure signal. The transmission-side apparatus checks the reception enable transmission speed of the reception-side apparatus and its own transmission enable transmission speed. Based on the checking result, the transmission-side apparatus declares a transmission speed of image data to the reception-side apparatus using a procedure signal, and subsequently starts image data transmission at the declared transmission speed.

When the reception-side apparatus can successfully receive a training signal transmitted from the transmission-side apparatus at the declared transmission speed, it subsequently receives an image signal.

However, when the reception-side apparatus fails to receive the training signal at the declared transmission speed, it sends, to the transmission-side apparatus using a backward channel, a message indicating that reception of the training signal at the declared transmission speed is unsuccessful, and then sends an instruction to fall back a transmission speed by the arbitrary number of steps.

For this reason, when the transmission-side apparatus recognizes that the reception-side apparatus fails to receive the training signal at the declared transmission speed through the backward channel, it interrupts transmission of the image signal. The transmission-side apparatus falls back the transmission speed by the number of steps instructed by the reception-side apparatus, and starts transmission of image data at the fallen-back transmission speed.

For example, a case will be exemplified below wherein both the transmission- and reception-side apparatus have a function of performing transmission at transmission speeds of 2,400 bps, 4,800 bps, 7,200 bps, and 9,600 bps.

The reception-side apparatus first transmits NSF/CSI/DIS signals, and the transmission-side apparatus transmits an image signal at a transmission speed of 9,600 bps immediately after it transmits NSS/TSI/DCS signals.

When the reception-side apparatus can successfully receive an image signal at 9,600 bps, it continues reception of the image signal. Therefore, according to the present invention, as compared to an image communication system like a conventional facsimile apparatus or the like, a time required for transmitting training/TCF signals, an acknowledgement signal and a CFR signal in response to these signals can be shortened.

A conventional facsimile apparatus or the like may fail transmission due to a change in line condition so far upon reception of training/image signals although transmission is successful upon reception of training/TCF signals. According to the present invention, however, such waste of time can be eliminated.

When the reception-side apparatus fails to receive an image signal at 9,600 bps, it can issue the following instructions during reception of a training signal or reception of a unique signal (e.g., a "1" signal for 1 sec or a flag pattern for 1 sec) transmitted after the training signal.

More specifically, according to the present invention, the reception-side apparatus can issue one of an instruction to re-transmit the training/image signals by falling back the transmission speed by one step (more specifically, at a transmission speed of 7,200 bps), an instruction to re-transmit the training/image signals by falling back the transmission speed by two steps (more specifically, at a transmission speed of 4,800 bps), an instruction to re-transmit the training/image signals by falling back the transmission speed by three steps (more specifically, at a transmission speed of 2,400 bps), and an instruction to fall back the transmission speed by four steps (more specifically, to disconnect the line).

These instructions are transmitted from the reception-side apparatus to the transmission-side apparatus after a transmission interrupt instruction signal using a backward channel. The transmission-side apparatus transmits the training/image signals at the instructed transmission speed.

The same operation applies to an apparatus having a function of 12,000 bps, 14,400 bps, and 19,200 bps.

According to the present invention, when image signals are transmitted among facsimile apparatuses having a function of performing transmission at a plurality of transmission speeds, if a line condition is good, transmission of training/TCF signals and CFR signal can be omitted; if a line condition is poor, a transmission speed is fallen back to a transmission enable speed. Therefore, a time required for determining an optimal transmission speed can be greatly shortened as compared to a conventional apparatus.

In the future, it is expected that the number of transmission speeds of the G3 standard facsimile apparatus is increased from 4 to 7. At that time, the present invention can provide further advantages.

BRIEF DESCRIPTION OF DRAWINGS

FIG. 13 is a schematic diagram of a fifth embodiment according to the present invention;

FIGS. 20, 20A, 20B and 21 show a communication control means of a conventional facsimile apparatus;

FIG. 22 is a diagram for explaining a general flow of a transmission signal;

BEST MODE OF CARRYING OUT THE INVENTION

A first embodiment of the present invention will now be described with reference to the accompanying drawings.

<First Embodiment>

A case will be exemplified below wherein a modem makes a fall-back judgement.

Figure 1:
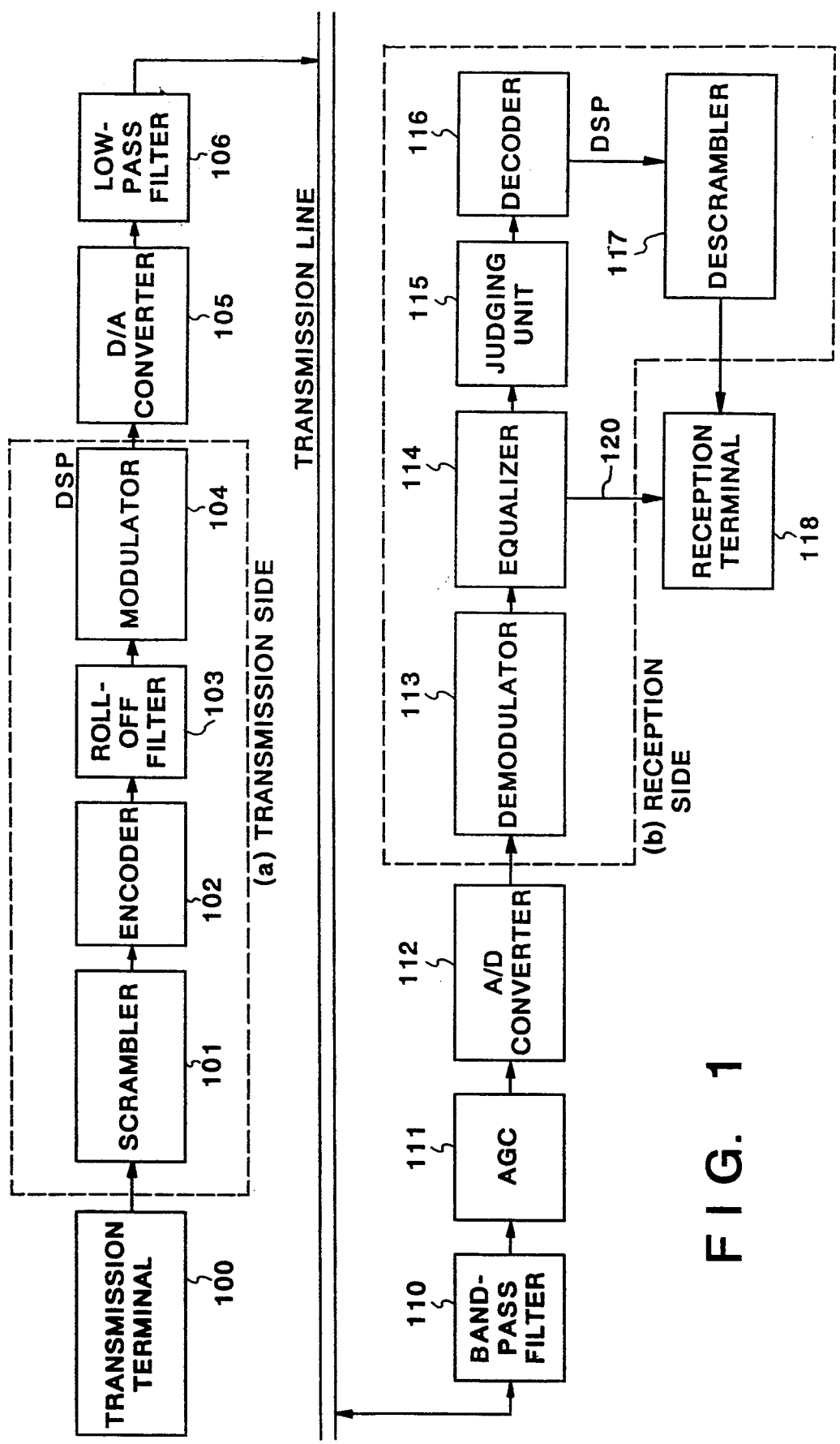
FIG. 1 is a block diagram of a first embodiment of a modem according to the present invention.

FIG. 1 is a block diagram showing a modulator/demodulator (modem) according to an embodiment of the present invention. In FIG. 1, portions surrounded by dotted lines are constituted by DSPs (digital signal processors).

In FIG. 1, reference numerals 100 and 118 respectively denote a transmission terminal which is connected to the modem of this embodiment and generates a digital signal to be transmitted, and a reception terminal.

Reference numeral 101 denotes a scrambler for scrambling transmission data so as to prevent a continuous output of identical data; 102, an encoder for assigning a code to tribit, dibit, and the like of a signal from the scrambler 101; 103, a roll-off filter for preventing an inter-code interference of a signal; and 104, a modulator for performing predetermined modulation processing for the signal output from the roll-off filter 103. The modulation system of this modulator 104 is a quadrature amplitude modulation (QAM) system for changing an amplitude and phase of a carrier wave.

The signal modulated by the modulator 104 is converted to an analog signal by a D/A converter 105 to be sent onto a public line as an analog line, and an excessive harmonic component is removed by a low-pass filter 106 from the analog signal to be matched with a transmission range of a transmission line. Then, the signal is sent onto the transmission line.

Components other than the transmission range are removed by a band-pass filter 110 from the transmission signal from the transmission line, and the signal level of the signal is controlled by an AGC 111 to one processed in the reception-side apparatus. Thereafter, the signal is converted by an A/D converter 112 into a digital signal. The digital signal is demodulated by a demodulator 113 into an original signal before modulation.

Reference numeral 114 denotes an equalizer which removes a distortion component generated during transmission from the reception signal, as described above, and extracts an original transmission signal.

An output signal from the equalizer 114 is sent to a judging unit 115 to be judged as a code point. Thereafter, the judged signal is decoded by a decoder 116, and is sent to a descrambler 117. Thus, the signal scrambled by the scrambler 101 of the transmission-side apparatus is descrambled to an original signal. In this manner, the reception signal is descrambled to the same signal as the transmission signal output from the transmission terminal 100, and is output to the reception terminal 118.

A signal line 120 goes to H (high) level in accordance with the judging result of the comparator 114 (upon completion of segment 5 or 4), e.g., when a square error accumulation value $Q_L$ (to be described later) is smaller than a mean square error accumulation value (threshold) $T_H$ and a transmission speed of 9,600 bps is selected, and goes to L (low) level when the square error accumulation value $Q_L$ is larger than the threshold $T_H$ and a transmission speed of 7,200 bps is selected.

Of course, a signal line for, when the square error accumulation value $Q_L$ exceeds $T_{div}$ (divergence value when the equalizer diverges, calculated in advance by simulations), saving a tap coefficient of the equalizer and signaling that a re-training operation is to be performed may be added.

The arrangement and control of a portion excluding the equalizer 114 portion in the modem of this embodiment are known to those who are skilled in the art, and a detailed description thereof will be omitted. The detailed arrangement and operation of the equalizer 114 portion of this embodiment will be described below.

Figure 2:
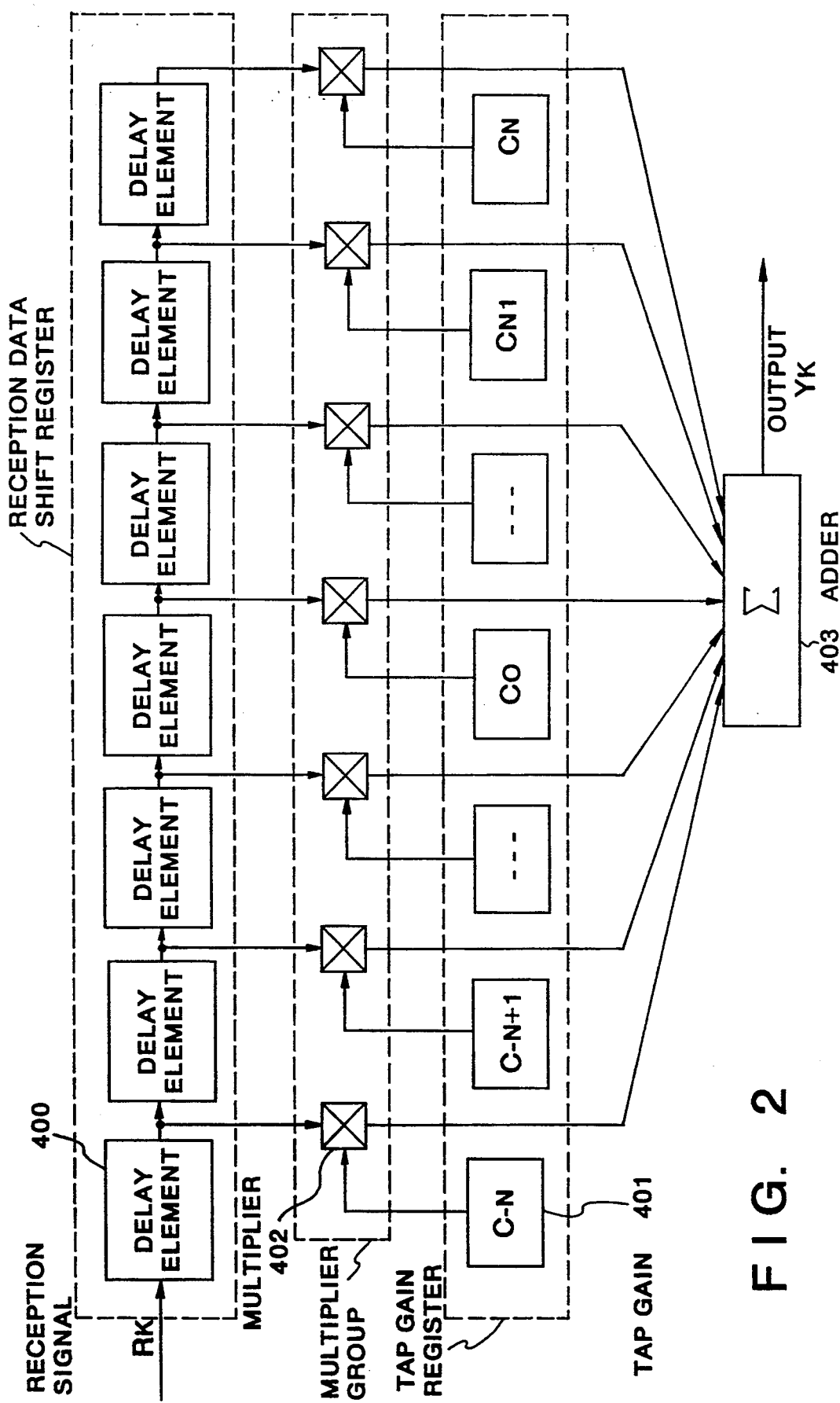
FIG. 2 is a detailed block diagram of an equalizer of the first embodiment shown in FIG. 1.

FIG. 2 shows the detailed arrangement of the equalizer of this embodiment. The equalizer 114 of this embodiment comprises a transversal filter. In FIG. 2, reference numeral 400 denotes delay elements each for delaying reception data $R_k$ by a predetermined period of time; and 401, tap gains [$C_{-N}$ to $C_N$] each of which is multiplied with delayed reception data immediately thereabove in FIG. 2.

Figure 10:
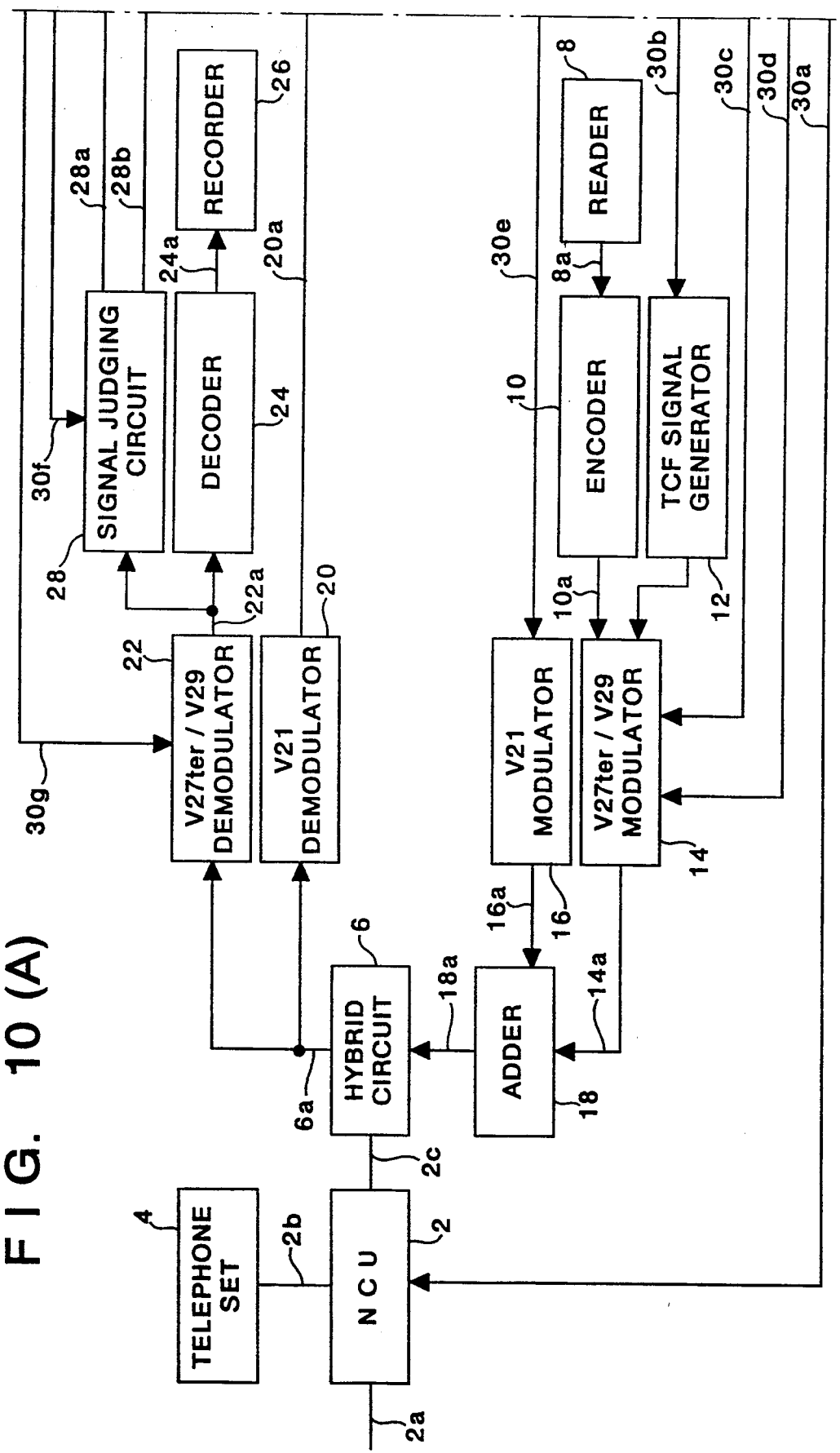
FIGS. 10(A) and 10(B) are block diagrams of facsimile apparatus of the fourth embodiment.

As is well known, the tap gain plotted along a time base is called a unit impulse response, and frequency characteristics of the equalizer shown in FIG. 10B are obtained by Fourier transforming the unit impulse response.

Reference numeral 402 denotes multipliers each for multiplying reception data delayed by the corresponding delay element 400 with the corresponding tap gain 401; and 403, an adder for calculating a total sum of multiplication results of the reception data delayed by the delay elements 400 and the tap gains 401 obtained from the multipliers 402.

With the above arrangement, an equalizer output signal $y_k$ can be expressed by the following equation:

$$y_k = \sum_{i=-N}^{N} C_i R_{k-i} \quad (1)$$

The equalizer 201 sequentially calculates the tap gains using the following equation by an MSE method (Mean Square Error method), and is adapted to opposite characteristics of a line.

$$Ce^{\gamma+1} = Ce^\gamma - \alpha \frac{\partial (y_k - a_k)^2}{\partial Ce} \quad (2)$$

where $Ce^{\gamma+1}=$: tap gain value calculated in a ($\gamma+1$)th calculation $a_k$: presumed value of judged (presumed) reception data $a_k$, and $a_k = a_k$ during training L: convergence coefficient (in general, $\alpha << 1$)

$y_k - a_k$: error signal ($e_k$)

Note that the above-mentioned MSE method is an algorithm for minimizing the square error signal $e^2_k$.

In particular, this modem requires speed and accuracy of an equalization operation, and it is no exaggeration to say that they determine the performance of the modem.

In this manner, the equalizer 114 generates in advance opposite line characteristics on the basis of existing data (training data) between the transmission- and reception-side apparatuses prior to data transmission. Thereafter, the equalizer characteristics are changed to follow a slow variation over time of the line (automatic equalization or adaptive equalization).

Figure 3:
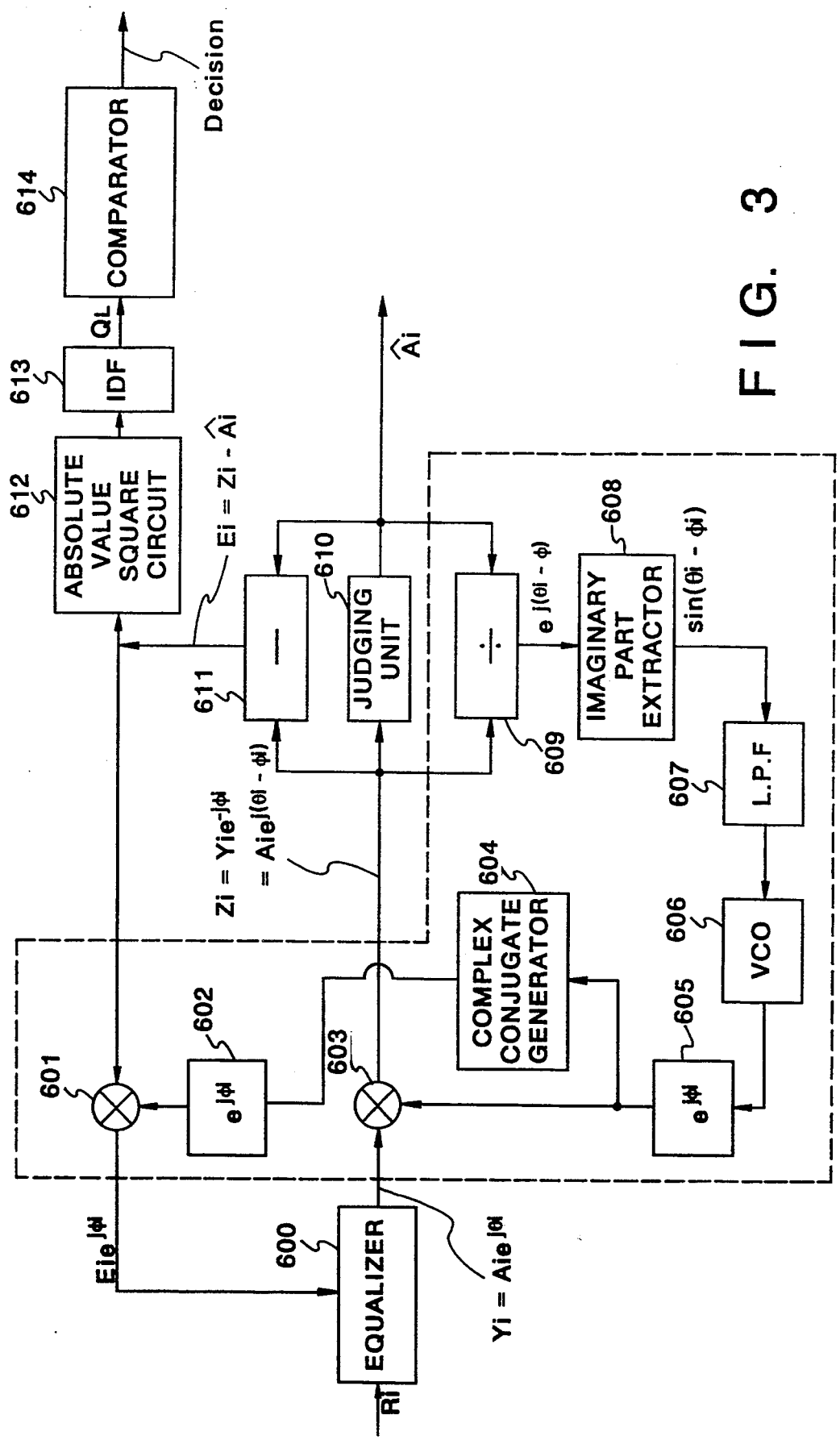
FIG. 3 is a schematic diagram showing an equalization operation by the equalizer of the first embodiment.

FIG. 3 shows an arrangement wherein a phase control unit at the output side of an equalizer judging unit comprises a PLL automatic equalizer (or a PLL automatic equalizer with a square error accumulator).

In FIG. 3, reference symbol $R_i$ denotes a demodulated complex signal, which is supplied from a demodulation section of the reception system. Reference numeral 600 denotes a line equalizer, which corrects data distorted on the line to an originally transmitted state.

$Y_i = A_i e^{j\theta i}$ expresses an ith output of the equalizer 600 by a polar coordinate.

Reference numeral 603 denotes a multiplier for multiplying an output $e^{-j\phi i}$ from a complex number generator 605 and an output $Y_i = e^{j\theta i}$ from the equalizer, and outputting the product as $Z_i = Y_i e^{-j\theta i} = A_i e^{j(\theta i - \phi i)}$. Reference numeral 610 denotes a judging unit for judging a code point ($\hat{A}_i$) closest to a reception signal point as an output from the multiplier 603. Reference numeral 611 denotes a subtractor for subtracting the judged point from the reception signal point and outputting an error signal $E_i = Z_i - \hat{A}_i$.

The error signal $E_i$ is then multiplied with the output $e^{j\phi i}$ from a complex number generator 602, thus obtaining $E_i e^{j\phi i}$ which is fed back to the equalizer 600.

Note that $e^{j\phi i}$ is the phase correction amount.

Phase control surrounded by a dotted line in FIG. 3 will be described below.

Reference numeral 609 denotes a divider for dividing $Z_i$ with $\hat{A}_i$ to approximately obtain $e^{j(\theta i - \phi i)}$.

Reference numeral 608 denotes an imaginary part extractor for outputting $\sin(\theta i - \phi i)$.

$\sin(\theta i - \phi i)$ becomes approximately equal to ($\theta i - \phi i$) when ($\theta i \approx \phi i$). Reference numerals 606 and 607 denote a VCO and a low-pass filter, respectively, as constituting elements of a normal PLL, for outputting a phase value ($-\phi i$) so as to cancel an input phase error. Subsequently, the complex number generators 605 and 602, and a complex conjugate generator 604 output $e^{-j\phi i}$ and $e^{j\phi i}$, which are respectively input to the multipliers 603 and 601, thereby canceling a phase error of the entire system.

The output $E_i = Z_i = \hat{A}_i$ from the subtractor 611 is input to an IDF 613 (to be described later) through an absolute value square circuit 612.

The absolute value square circuit 612 calculates a square of a distance between the reception signal point and the judged point.

In the IDF 613, the output from the absolute value square circuit 612 is accumulated a predetermined number of times (N Baud periods) set by a designer, and is output as $Q_L$. The output $Q_L$ approaches zero if the equalization rate is good and if a line noise amount is small. On the contrary, if the line equalization rate is poor and the line noise amount is large, the value $Q_L$ is increased.

The IDF (Integrate and Dump Filter) 613 will be described below with reference to FIG. 4.

Figure 4:
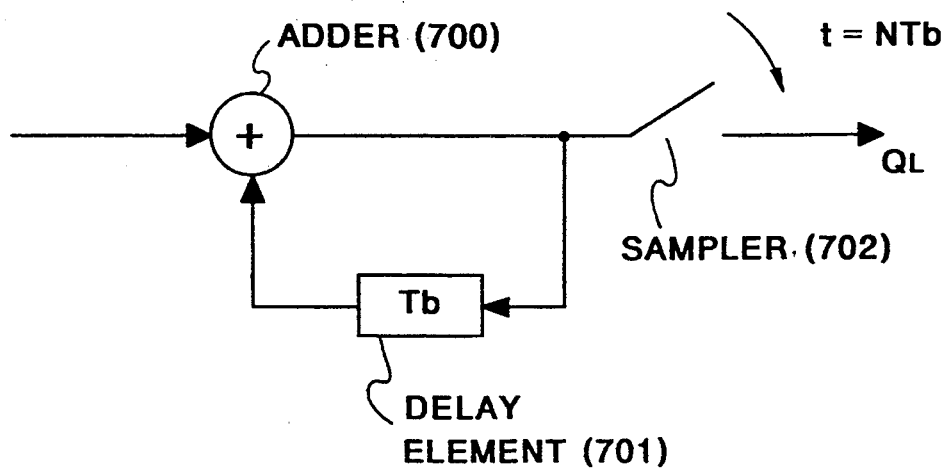
FIG. 4 is a circuit diagram of an IDF of the first embodiment.

In FIG. 4, reference numeral 700 denotes an adder; 701, a delay element; and 702, a sampler.

The output from the absolute value square circuit 612 shown in FIG. 3 is added to the output from the delay element 701 by the adder 700. This operation is repeated for every output period of the absolute value square circuit 612, i.e., every Baud period. The sampler 702 samples the output from the adder 700 for every value N determined by the designer. Subsequently, the value of the delay element 701 is initialized.

In this circuit, N outputs of the absolute value square circuit 612 are accumulated and added.

A method of judging an equalization rate using the PLL automatic equalizer with the square error accumulator described above, and determining an optimal transmission speed in accordance with the judging result will be described below.

CCITT modem recommendation V27ter segment 5 (a signal 8SI obtained by scrambling continuous "1"s) and V29 segment 4 (scrambled data "1" 48SI) are used, and the numbers of times of accumulation N in FIG. 4 are set to be "8" and "48".

A case will be described below wherein the V29 modem is used.

First, a bit error rate vs. S/N ratio curve of the V29 modem is drawn, so that an S/N ratio with respect to a user allowance error rate is calculated. Training signals are received a large number of times, so that a mean square error accumulation value is calculated from the square error accumulation value $Q_L$ corresponding to the calculated S/N ratio, and is used as the threshold $T_H$.

Therefore, in actual facsimile communication, if the value $Q_L$ is smaller than the threshold $T_H$, an optimal transmission speed of 9,600 bps is selected; if it is larger than the threshold $T_H$, an optimal transmission speed of 7,200 bps is selected.

As described above, when the above-mentioned method is used, an optimal transmission speed can be determined in a single training operation.

Furthermore, a value when the equalizer diverges is calculated in advance by simulations, and the divergence value is represented by $T_{div}$. When the square error accumulation value $Q_L$ is larger than the divergence value $T_{div}$, the tap coefficient of the equalizer is saved to perform re-training.

Comparison between the equalization factor square error accumulation value $Q_L$ and the threshold $T_H$ is performed by the comparator 614 in FIG. 3.

In the V27ter modem, the above-mentioned method can be applied. Ultra-high speed modems of, e.g., 14.4 kbps and 19.2 kbps have many transmission speeds. However, with the above-mentioned method, an optimal transmission speed can be selected in a single training operation.

Figure 5:
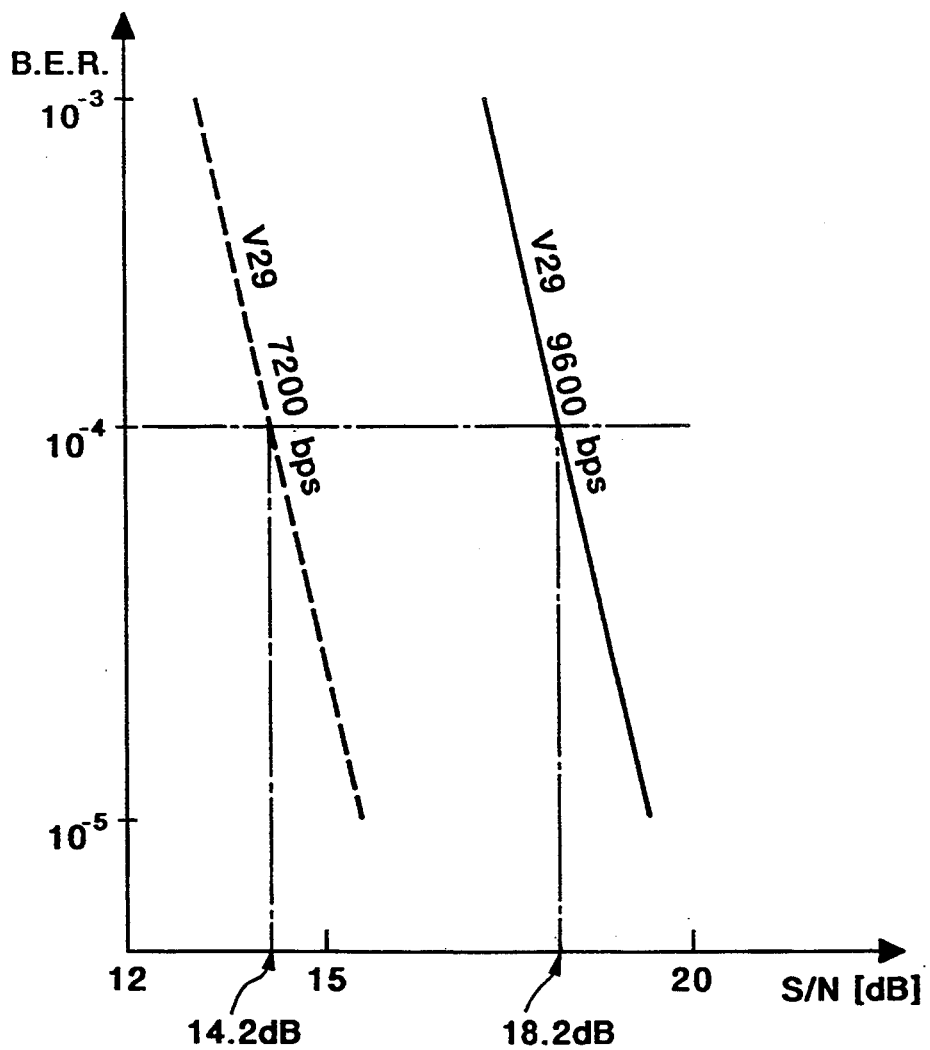
FIG. 5 is a graph for explaining an S/N ratio vs. a bit error rate in the first embodiment.

FIG. 5 is a graph showing an S/N ratio vs. a bit error rate of the V29 modem (transmission speed 9,600 bps/7,200 bps).

In FIG. 5, a solid line represents a bit error rate of the V29 modem during transmission at a speed of 9,600 bps, and a dotted line represents a bit error rate of the V29 modem during transmission at a speed of 7,200 bps.

Therefore, when a communication system having an allowable transmission error rate of $10^{-4}$ is to be constructed, a straight line parallel to an abscissa passing through a point of a bit error rate of $10^{-4}$ is drawn, and a perpendicular is drawn from the intersection between the straight line and the solid line representing the bit error rate of the V29 modem (transmission speed 9,600 bps) to the abscissa, as shown in FIG. 5.

The intersection between the abscissa and the perpendicular means a minimum S/N ratio capable of guaranteeing a bit error rate $10^{-4}$ at the transmission speed of the V29 modem (transmission speed 9,600 bps).

Note that in FIG. 5, a minimum S/N ratio capable of guaranteeing the bit error rate $10^{-4}$ at the transmission speed of the V29 modem (transmission speed 9,600 bps) is 18.2 dB.

In this embodiment, the transmission speed is switched between 9,600 bps and 7,200 bps. An optimal transmission speed can be determined for a transmission speed equal to or lower than 7,200 bps. For example, as shown in FIG. 5, when a straight line parallel to the abscissa and passing through a point of a bit error rate of $10^{-4}$ is drawn and perpendiculars are drawn from intersections between the straight line and solid lines representing bit error rates of transmission speeds 4,800 bps and 2,400 bps onto the abscissa, intersections between the abscissa and the perpendiculars represent minimum S/N ratios which can guarantee a bit error rate of $10^{-4}$ at the corresponding transmission speeds. Thus, the optimal transmission speed can be easily determined.

The method of calculating the mean square error accumulation value will be described in detail below.

In the case of the V29 modem, the number of times of accumulation N shown in FIG. 4 is "48".

A sync signal (training signal) of the CCITT recommendation V29 is sent from the transmission-side apparatus to the reception-side apparatus to execute training processing. For example, this operation is repeated 100 times, and the square error accumulation value $Q_L$ is calculated for each operation (every training processing). Therefore, $Q_{L0}, Q_{L1}, Q_{L2}, \ldots, Q_{L99}$ are obtained by the series of training processing. The mean square error accumulation value is calculated as follows using the values $Q_{L0}, Q_{L1}, Q_{L2}, \ldots, Q_{L99}$.

$$\text{Threshold } T_H = \frac{\sum_{i=0}^{99} Q_{Li}}{100}$$

In the above equation, the threshold $T_H$ is defined as a mean square error accumulation value.

Figure 6:
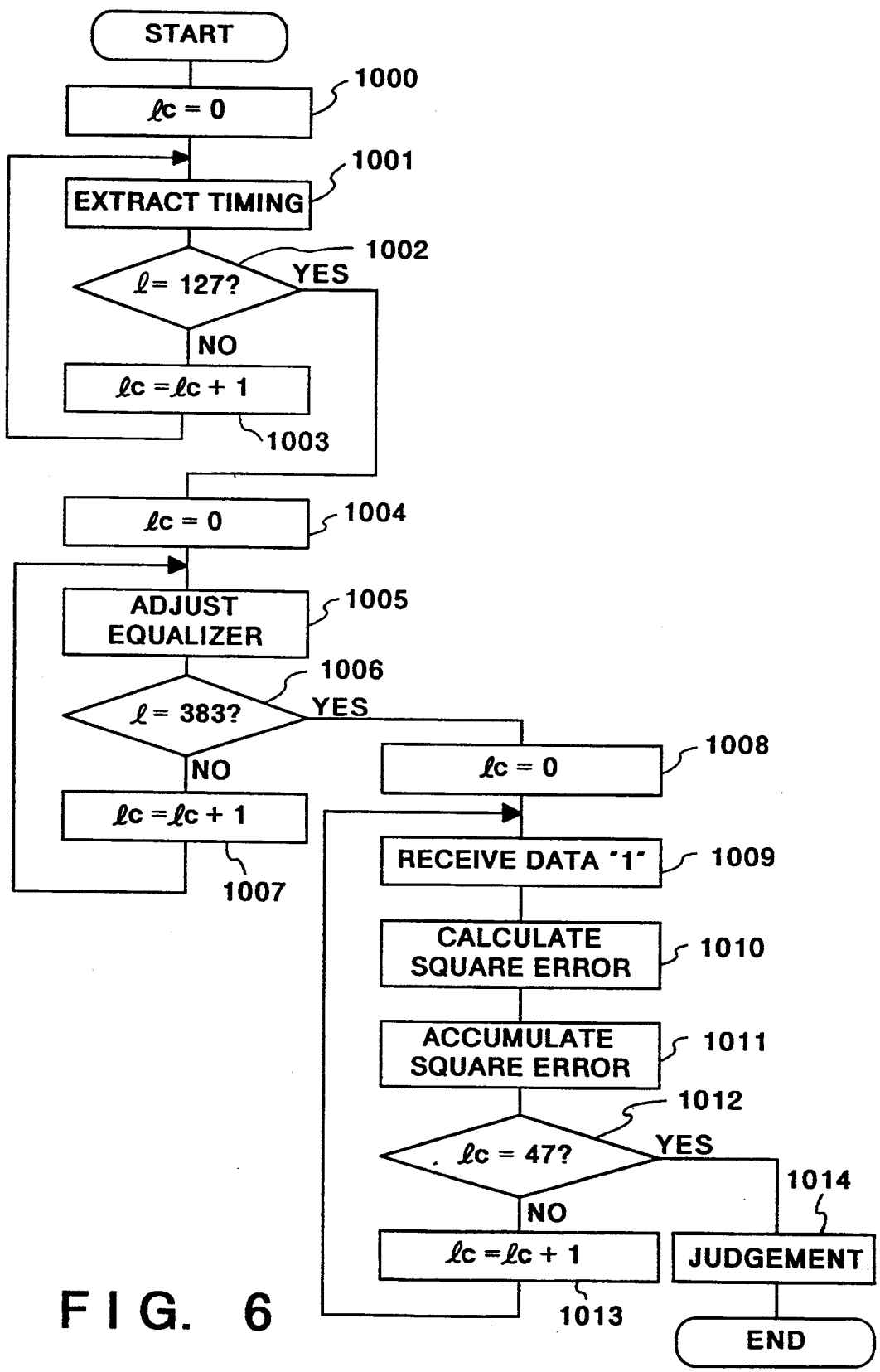
FIG. 6 is a flow chart showing equalization processing of the first embodiment.

Finally, the method of judging an equalization rate using the PLL automatic equalizer with the automatic error accumulator described above, and determining an optimal transmission speed in accordance with the judging result will be described below with reference to the flow chart shown in FIG. 6.

In step 1000, initialization processing of a loop counter lc for counting a Baud frequency of each segment of the sync signal is performed. In step 1001, a normal timing extraction algorithm by a base-band or carrier-band extraction method is operated. In step 1002, it is checked if the count of the loop counter lc has reached "127" (by counting the number of symbol intervals of the V29 sync signal segment 2). If NO in step 1002, the loop counter lc is incremented by one in step 1003. The flow then returns to step 1001.

If YES in step 1002, i.e., the number of symbol intervals of the V29 sync signal segment 2 has reached "127" and the timing extraction algorithm (step 1001) has been executed 128 times, the flow advances to step 1004, and the loop counter lc is reset to be initialized again. In steps 1005 to 1007, an algorithm of updating an equalizer tap coefficient to adaptively follow line characteristics using reception data is operated 384 times. More specifically, the algorithm of updating the equalizer tap coefficient is executed in step 1005, and it is then checked in step 1006 if the count of the loop counter lc has reached "283", i.e., the count of symbol intervals of the V29 sync signal segment 3 has reached 383. If NO in step 1006, the loop counter lc is incremented by one in step 1007, and the flow returns to step 1005.

After the algorithm of updating the equalizer tap coefficient is executed 384 times, the flow advances to step 1008, and the loop counter lc is initialized. In steps 1009 to 1013, square error accumulation processing is executed 48 times. In step 1009, scrambled data "1" of the V29 sync signal segment 4 is received. Subsequently, in step 1010, a square error between the reception signal and a signal coordinate point defined by the CCITT. V29 recommendation is calculated.

Furthermore, in step 1011, the square error calculated in step 1010 is accumulated by the IDF 613 shown in FIG. 3. In step 1012, the number of symbol intervals of the V29 sync signal segment 4 is counted. When the loop of steps 1009 to 1011 is executed 48 times (loop counter lc=47), the flow advances to step 1014; otherwise, the flow advances to step 1013, and the loop counter lc is incremented by one. The flow then returns to step 1009.

In step 1014, a mean square error accumulation value, i.e., a value obtained by dividing the square error accumulation value by the symbol interval number "48" is calculated. The value calculated in step 1014 is compared with the threshold $T_H$ to obtain a judging result. The signal line 120 shown in FIG. 1 is switched to one of H and L levels using the judging result as the equalizer output, and the judging result is output to the reception terminal 118.

In this embodiment, a square error is used as a reference for measuring the equalization rate. However, the present invention is not limited to this, but can be easily realized by using an absolute value of an error between the reception signal point and the judged point.

In the above description, the CCITT. V29 recommendation has been exemplified. However, the present invention is not limited to the V29 recommendation, but can be applied to a modem having a plurality of transmission speeds, e.g., CCITT. V27ter, V33 recommendations, and the like.

According to the V29 recommendation, in this embodiment, the square error is accumulated 48 times corresponding to the number of symbol intervals of segment 4. However, the number of times is not limited as long as it is equal to or smaller than 48.

In this embodiment, the IDF is used as an accumulation circuit. However, the present invention is not limited to this. For example, the present invention can be easily realized by using a normal low-pass filter.

Furthermore, in this embodiment, as a mean square error accumulation value, a total of 100 square error accumulation values are calculated and are used to calculate a mean value. However, the number of samples is not limited to 100.

According to this embodiment as described above, the following effects can be provided.

The transmission speed determination by a conventional sequential fall-back system using a TCF (training signal) is not performed, the mean square accumulation error arithmetic section is arranged at an output side of the judging section of the equalizer, and an equalization rate is calculated during a TCF reception period after the sync signal and is compared with the predetermined threshold $T_H$. Thus, an optimal transmission speed can be determined by one sync signal, or when the equalization rate cannot be improved, re-training can be performed.

In a modem having a plurality of transmission speeds, a time required for a pre-procedure can be greatly shortened, and a very efficient modem can be achieved.

An effective transmission speed can be greatly increased. If ultra-high speed modems of 12.0 kbps, 14.4 kbps, and 19.2 kbps which are expected to be used in future are standardized, and the number of transmission speeds is increased from 4 to 37, transmission efficiency can be remarkably improved if the equalization processing according to the method of the present invention is executed.

The above embodiment has been described under a condition that DSPs are used. However, the present invention is not limited to this. If an equivalent hardware arrangement is adopted, the same algorithm can be used, and the same effect can be obtained.

As described above, reliable equalization processing can be executed in a very short period of time.

<Second Embodiment>

In the above description, the equalizer comprises the mean square error arithmetic circuit for calculating a mean square error during reception of predetermined scrambled data, a line equalization factor is measured using this circuit, and an optimal transmission speed is determined in a single training operation. However, the present invention is not limited to this. For example, the same effect can be attained if the equalizer comprises a mean square error arithmetic circuit for calculating a mean square error in a TCF (training check) signal period (1.5 sec±10%).

In this case, as the mean square error arithmetic circuit, a square error arithmetic circuit and an IDF filter can be connected to the output of an equalizer judging section.

As another arrangement, an absolute value error arithmetic circuit or square error arithmetic circuit and a low-pass filter may be connected to the output of the equalizer judging section.

Another embodiment of the present invention with the above arrangement will be described below.

The basic hardware arrangement of this embodiment is the same as that in the first embodiment described above. In this embodiment, a square error arithmetic circuit, an IDF (Integrate and Dump Filter), and a comparator are added to the output side of the equalizer judging section of a reception-side apparatus, an equalization rate is judged by a PLL automatic equalizer with an automatic error accumulator, and an optimal transmission speed is determined in accordance with the judging result. For example, an equalization rate is calculated during a TCF (training check) period of the CCITT facsimile recommendation T30, and an optimal transmission speed can be selected according to the calculation result.

In this embodiment, the CCITT modem recommendation V29 is also used. However, the number of times of accumulation N in FIG. 4 is set to be "2,400".

According to the CCITT recommendation T30 associated with the facsimile procedure, a continuous "0" signal for 1.5 sec ±10% is sent in the TCF period.

Therefore, since the number of times of accumulation N is set to be "2,400", a square error can be accumulated for 1 sec.

Subsequently, an error rate vs. S/N ratio curve of the V29 modem is drawn, and an S/N ratio corresponding to a user allowable error rate is calculated. When a training signal is received a large number of times, a mean square error accumulation value is calculated from square error accumulation values $Q_L$ corresponding to calculated S/N ratios, and is used as a threshold $T_H$.

Therefore, in actual facsimile communication, the signal line 120 outputs H (high)-level data for selecting 9,600 bps as the optimal transmission speed in accordance with the judging result of the comparator 114 (upon completion of segment 4), e.g., when the square error accumulation value $Q_L$ (to be described later) is smaller than the threshold $T_H$, and outputs L (low)-level data for selecting 7,200 bps as the optimal transmission speed when it is larger than the threshold $T_H$.

Of course, a signal line for saving a tap coefficient of the equalizer and performing re-training when the square error accumulation value $Q_L$ exceeds $T_{div}$ may be added.

With the above method, the optimal transmission speed can be determined in a single training operation.

Furthermore, a value when the equalizer is diverged is calculated in advance by simulations, and is represented by $T_{div}$. When the square error accumulation value $Q_L$ is larger than the divergence value $T_{div}$, the tap coefficient of the equalizer can be saved to perform re-training.

Comparison between the equalization factor square error accumulation value $Q_L$ and the threshold $T_H$ is performed by the comparator 614 in FIG. 3.

In the V27ter modem, the above-mentioned method can be applied. Ultra-high speed modems of, e.g., 14.4 kbps and 19.2 kbps have many transmission speeds. However, with the above-mentioned method, an optimal transmission speed can be selected in a single training operation.

A method of calculating the mean square error accumulation value will be described in detail below.

In this embodiment, in the case of the V29 modem, the number of times of accumulation N shown in FIG. 4 is "2,400".

A sync signal (training signal) of the CCITT recommendation V29 is sent from the transmission-side apparatus to the reception-side apparatus to execute training processing. For example, this operation is repeated 100 times, and the square error accumulation value $Q_L$ is calculated for every training processing. Therefore, $Q_{L0}, Q_{L1}, Q_{L2}, \ldots, Q_{L99}$ are obtained by the series of training processing.

The mean square error accumulation value is calculated as follows using the values $Q_{L0}, Q_{L1}, Q_{L2}, \ldots, Q_{L99}$.

$$\text{Threshold } T_H = \frac{\sum_{i=0}^{99} Q_{Li}}{100}$$

In the above equation, the threshold $T_H$ is defined as a mean square error accumulation value.

Finally, the method of judging an equalization rate using the PLL automatic equalizer with the automatic error accumulator described above, and determining an optimal transmission speed in accordance with the judging result will be described below with reference to the flow chart shown in FIG. 7.

In step 2000, initialization processing of a loop counter lc for counting a Baud frequency of each segment of the sync signal is performed. In step 2001, a normal timing extraction algorithm by a base-band or carrier-band extraction method is operated.

In step 2002, it is checked if the count of the loop counter lc has reached "127". If NO in step 2002, the loop counter lc is incremented by one in step 2003. The flow then returns to step 2001.

If YES in step 2002, i.e., the number of symbol intervals of the V29 sync signal segment 2 has reached "127" and the timing extraction algorithm (step 2001) has been executed 128 times, the flow advances to step 2004, and the loop counter lc is reset to be initialized again. In steps 2005 to 2007, an algorithm of updating an equalizer tap coefficient to adaptively follow line characteristics using reception data is operated 384 times.

More specifically, the algorithm of updating the equalizer tap coefficient is executed in step 2005, and it is then checked in step 2006 if the count of symbol intervals of the V29 sync signal segment 3 has reached 383. If NO in step 2006, the loop counter lc is incremented by one in step 2007, and the flow returns to step 2005.

After the algorithm of updating the equalizer tap coefficient is executed 384 times, the flow advances to step 2008, and the loop counter lc is initialized. Similarly, in steps 2009 to 2011, 48 scrambled data "1" of the V29 sync signal segment 4 are received. The number of symbol intervals of the V29 sync signal segment 4 is counted, and when step 2009 is executed 48 times, the flow advances from step 2010 to step 2012; otherwise, the flow advances to step 2011 to increment the loop counter lc by one. The flow then returns to step 2009.

In step 2012, the loop counter lc is initialized, and in steps 2013 to S1017, square error accumulation processing is executed 2,400 times.

In step 2013, scrambled data "0" of the TCF of the CCITT recommendation T30 is received. In step 2014, a square error of the reception signal and a signal coordinate point defined by the CCITT. V29 recommendation is calculated. Furthermore, in step 2015, the square error calculated in step 2014 is accumulated by the IDF 613 shown in FIG. 2. In step 2016, the number of symbol intervals of the TCF is counted. If the loop of steps 2013 to 2015 is executed 2,400 times, the flow advances to step 2018; otherwise, the flow advances to step 2017 to increment the loop counter by "1". The flow then returns to step 2013.

In step 2018, a mean square error accumulation value, i.e., a value obtained by dividing square error accumulation values by the number of symbol intervals "2,400" for the 1-sec TCF is calculated, and is compared with a predetermined threshold $T_H$ to obtain a judging result. The signal line 120 is switched to one of H and L levels in accordance with the judging result, and the judging result is output to the reception terminal 118.

In this embodiment, a square error is used as a reference for measuring the equalization rate. However, the present invention is not limited to this, but can be easily realized by using an absolute value of an error between the reception signal point and the judged point.

In the above description, the CCITT. V29 recommendation has been exemplified. However, the present invention is not limited to the V29 recommendation, but can be applied to a modem having a plurality of transmission speeds, e.g., CCITT. V27ter, V33 recommendations, and the like.

In this embodiment, square errors corresponding to the number of symbol intervals "2,400" are accumulated according to the T30 recommendation. However, the number of times of accumulation is not particularly limited as long as it is performed within 1.5 sec.

In this embodiment, the IDF 613 is used as an accumulation circuit. However, the present invention is not limited to this. For example, the present invention can be easily realized by using a normal low-pass filter.

Furthermore, in this embodiment, as a mean square error accumulation value, a total of 100 square error accumulation values are calculated and are used to calculate a mean value. However, the number of samples is not limited to 100.

According to this embodiment as described above, the following effects can be provided.

The transmission speed determination by a conventional sequential fall-back system using a TCF (training signal) is not performed, the mean square accumulation error arithmetic section is arranged at an output side of the judging section of the equalizer, and an equalization rate is calculated during a TCF reception period after the sync signal and is compared with the predetermined threshold $T_H$. Thus, an optimal transmission speed can be determined during a single TCF period following the sync signal, or when the equalization rate cannot be improved, re-training can be performed.

Since the TCF period continues for a long period of time, i.e., 1.5 sec, a mean square error accumulation value can be obtained more accurately than that in a sync signal period. Thus, in a modem having a plurality of transmission speeds, a time required for a pre-procedure can be greatly shortened, and a very efficient modem can be achieved.

An effective transmission speed can be greatly increased. If ultra-high speed modems of 12.0 kbps, 14.4 kbps, and 19.2 kbps which are expected to be used in future are standardized, and the number of transmission speeds is increased from 4 to 37, transmission efficiency can be remarkably improved if the equalization processing according to the method of the present invention is executed.

The above embodiment has been described under a condition that DSPs are used. However, the present invention is not limited to this. If an equivalent hardware arrangement is adopted, the same algorithm can be used, and the same effect can be obtained.

As described above, reliable equalization processing can be executed in a very short period of time.

<Third Embodiment>

In the above description, the equalizer comprises the mean square error arithmetic circuit for calculating a mean square error during the TCF (training check) signal period (1.5 sec ±10%). However, the present invention is not limited to this. For example, the equalizer may comprise count means for counting the number of errors during the TCF (training check) signal period (e.g., 1.5 sec ±10%), and a mean square error arithmetic circuit for calculating a mean square error so as to measure a line equalization factor, and to determine an optimal transmission speed during at least one TCF signal period.

A method of judging an equalization rate by a PLL automatic equalizer with an automatic error accumulator according to still another embodiment of the present invention with the above arrangement and determining an optimal transmission speed by the judging result will be described below.

The basic hardware arrangement is the same as that in the second embodiment described above, and the number of times of accumulation N in FIG. 4 is set to be "2,400".

Figure 7:
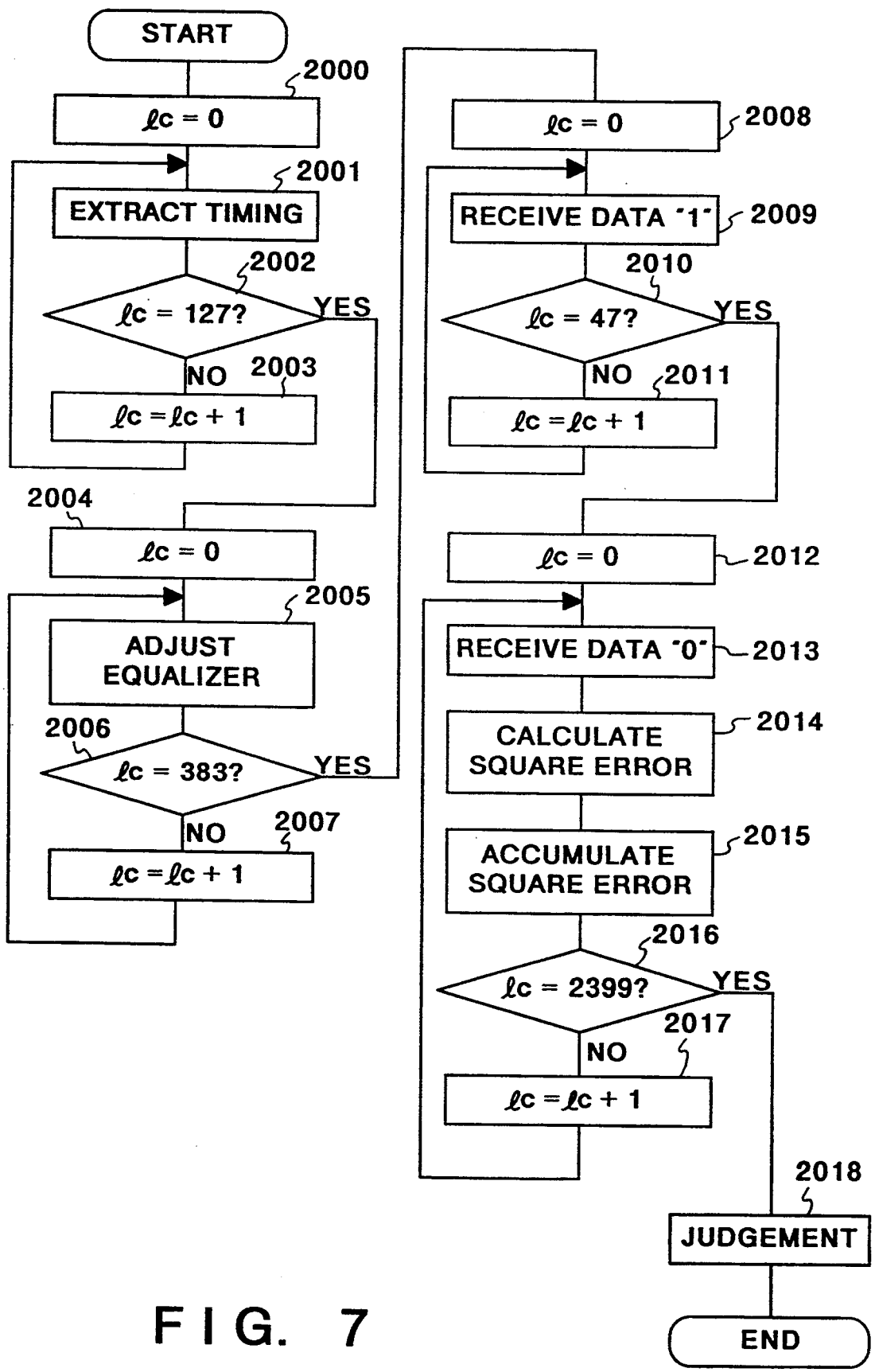
FIG. 7 is a flow chart showing equalization processing according to a second embodiment of the present invention.

In the same manner as in the second embodiment, the equalization processing method shown in FIG. 7 is executed by the comparator 614 shown in FIG. 3, the equalization factor square error accumulation value $Q_L$ is compared with the threshold $T_H$, and the comparison result is output onto the signal line 120.

In this embodiment, the number of errors is counted during reception of a TCF command at the reception terminal.

Figure 8:
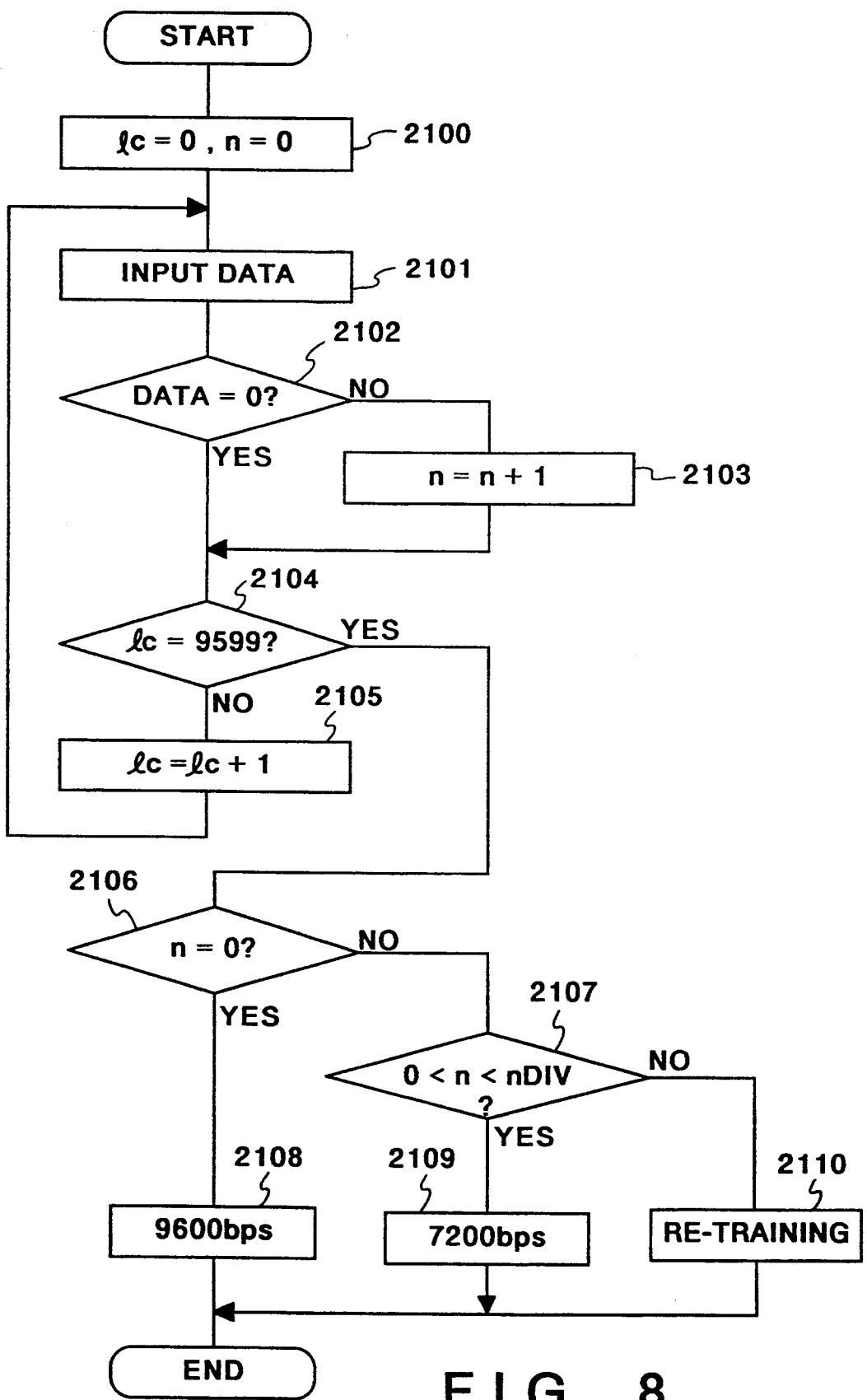
FIG. 8 is a flow chart showing equalization processing according to a third embodiment of the present invention.

A method of counting the number of errors during reception of the TCF command at the reception terminal will be described below with reference to the flow chart in FIG. 8.

In step 2100, a counter lc and a counter n (neither are shown) incorporated in the DSP are initialized. The counter lc counts a continuous "0" signal for 1 sec (i.e., 9,600 signals) when the transmission speed is 9,600 bps, and the counter n counts the number of errors.

In step 2101, data from a modem is fetched in the reception terminal 118 through a data input line 121. In step 2102, it is checked if fetched data is "0". If YES in step 2102, the flow advances to step 2104. If NO in step 2102, i.e., if the data is "1", the flow advances to step 2103.

In step 2104, it is checked if 9,600 data are fetched. If NO in step 2104, the flow advances to step 2105, and the counter lc is incremented by one. The flow then returns to step 2101 to execute processing for the next data.

If YES in step 2104, i.e., 9,600 data are fetched, the flow advances to step 2106 to check if the count of the counter n is "0", i.e., no error is detected. If YES in step 2106, the flow advances to step 2108, and communication is performed at a transmission speed of 9,600 bps.

If NO in step 2106, i.e., if the count of the counter n is not "0", the flow advances to step 2107 to check if the count "n" of the counter n falls within the range of $0 < \text{"n"} < n_{DIV}$.

If YES in step 2107, the flow advances to step 2109, and communication is performed at a transmission speed of 7,200 bps.

On the other hand, if it is determined in step 2106 that the count "n" of the counter n is equal to or larger than "$n_{DIV}$", the flow advances to step 2110 to perform re-training.

Note that "$n_{DIV}$" is determined in the same manner as described above.

More specifically, the V29 sync signal is received, and a number of errors vs. S/N ratio curve with respect to continuous "0"s for 1 sec immediately after equalization processing is drawn. When the equalizer is not equalized, the count of the counter n becomes an extremely large value. Therefore, if "$n_{DIV}$" is set to be 2 to 3, when the count "n" of the counter n is "0", the transmission speed of 9,600 bps can be set, so that an error rate of about $10^{-5}$ can be guaranteed.

On the other hand, if $0 < n < n_{DIV} (=2 \text{ or } 3)$, an error rate is about $10^{-5}$ or less at the transmission speed of 9,600 bps, but can be improved to $10^{-5}$ or less by setting a transmission speed to be 7,200 bps.

If $8n > n_{DIV}$, it is determined that the equalizer cannot be converged, and re-training is executed.

As described above, according to this embodiment, when the above-mentioned control is made, an optimal transmission speed can be selected upon reception of a single TCF command.

In the above description, a method of calculating a square error and a method of counting the number of errors are used solely. A combined method of these methods may be used to more reliably determine a transmission speed.

In this case, if a high-speed transmission speed is selected when the conditions of both the methods are satisfied, conditions may be moderated since the conditions of both the methods are imposed.

In this manner, when both the methods are combined, a more reliable optimal transmission speed can be selected.

In this embodiment, a square error is used as a reference for measuring the equalization rate. However, the present invention is not limited to this, but can be easily realized by using an absolute value of an error between the reception signal point and the judged point.

In the above description, the CCITT. V29 recommendation has been exemplified. However, the present invention is not limited to the V29 recommendation, but can be applied to a modem having a plurality of transmission speeds, e.g., CCITT. V27ter, V33 recommendations, and the like.

In this embodiment, square errors corresponding to the number of symbol intervals "2,400" are accumulated according to the T30 recommendation. However, the number of times of accumulation is not particularly limited as long as it is performed within 1.5 sec.

In this embodiment, the IDF is used as an accumulation circuit. However, the present invention is not limited to this. For example, the present invention can be easily realized by using a normal low-pass filter.

According to this embodiment as described above, a mean square error accumulation arithmetic section is arranged at the output of a judging section of the equalizer, so that an equalization rate is calculated during a TCF reception period after the sync signal and is compared with the predetermined threshold $T_H$, and the number of errors is counted during reception of the TCF con, hand and the count of the error counter n is compared with "0" and "$n_{DIV}$". Thus, an optimal transmission speed can be determined during a single TCF period following the sync signal, or when the equalization rate cannot be improved, re-training can be performed.

An effective transmission speed can be greatly increased. If ultra-high speed modems of 12.0 kbps, 14.4 kbps, and 19.2 kbps which are expected to be used in future are standardized, and the number of transmission speeds is increased from 4 to 7, transmission efficiency can be remarkably improved if the equalization processing according to the method of the present invention is executed.

Furthermore, the optimal transmission speed selection is made with reference to both the square errors and the number of errors, so that the transmission speed can be more optimally determined.

The above embodiment has been described under a condition that DSPs are used. However, the present invention is not limited to this. If an equivalent hardware arrangement is adopted, the same algorithm can be used, and the same effect can be obtained.

As described above, reliable equalization processing can be executed in a very short period of time, and an optimal transmission speed can be selected.

<Fourth Embodiment>

A fourth embodiment according to the present invention will now be described with reference to the drawings wherein fall-back discrimination is performed on a processor side.

Figure 9:
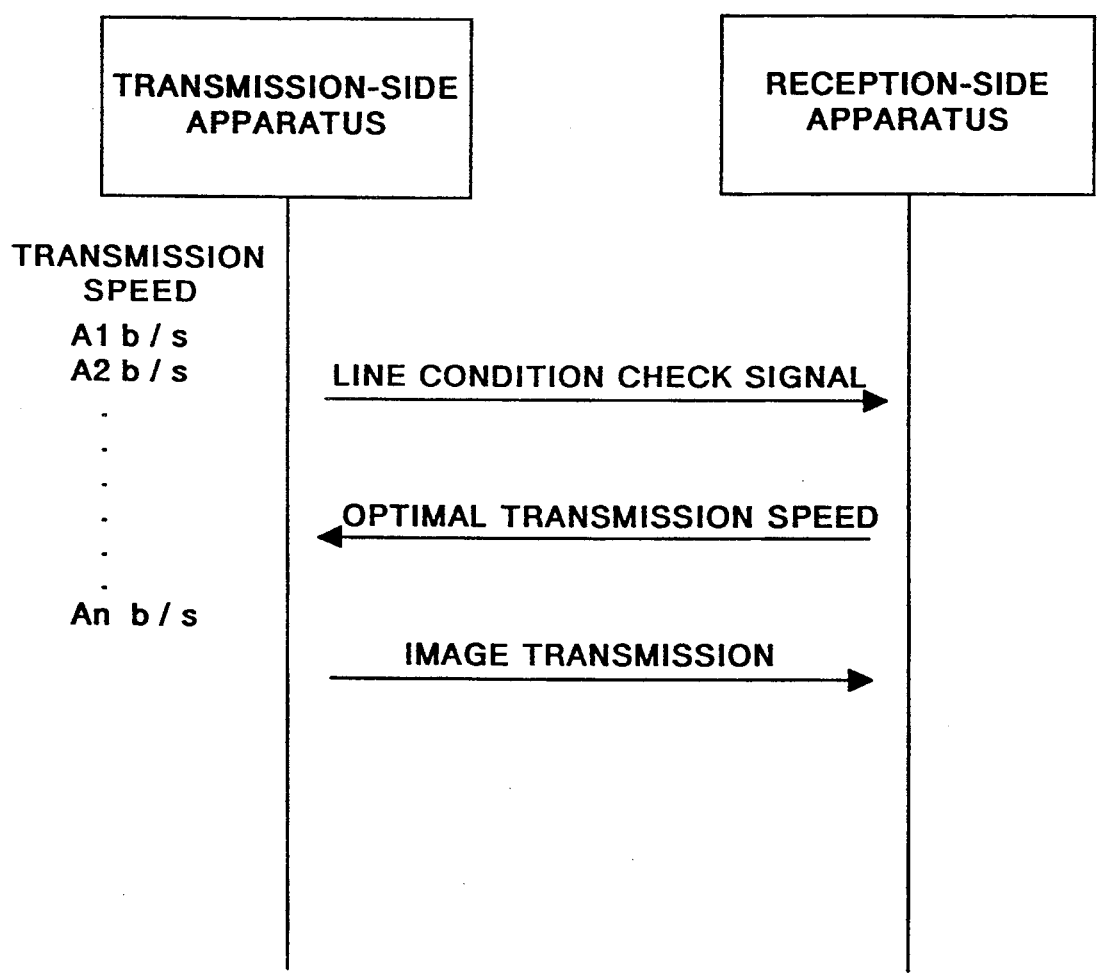
FIG. 9 is a schematic diagram of a fourth embodiment according to the present invention.

FIG. 9 is a schematic diagram of an image communication system according to this embodiment.

This system is an invention associated with an image communication system capable of performing transmission at a plurality of transmission speeds in a full duplex mode.

Prior to transmission in image communication, a line condition check signal for determining a transmission speed is transmitted in advance. A reception-side apparatus determines an optimal transmission speed on the basis of a reception state of the check signal, and informs the determined transmission speed to a transmission-side apparatus. The transmission-side apparatus starts transmission of an image signal at the determined transmission speed.

FIGS. 10(A) and 10(B) are block diagrams of facsimile apparatus to which this embodiment of applied. In,- this embodiment, the above-mentioned functions of a modem apparatus are dispersely assembled in the apparatus, and selection and control of the modem functions are performed by a controller 30 (its control will be described later).

In FIGS. 10(A) and 10(B), reference numeral 2 denotes an NCU (Network Control Unit) for controlling an interface between the apparatus of this embodiment and a telephone network. The NCU performs line switching control for connecting a line (telephone line) 2a connected to the telephone network to a hybrid circuit 6 for the use of data communication or connecting the telephone line 2a to a telephone set 4, holds a DC loop with respect to the telephone line 2a, and so on. The NCU 2 is connected to a signal line 30a extending from the controller 30. When the signal line 30a is at signal level "0", the NCU connects the telephone line to the telephone set side, i.e., connects the telephone line 2a to a signal line 2b. When the signal line 30a is at signal level "1", the NCU connects the telephone line to the facsimile apparatus side, i.e., connects the signal line 2a to a signal line 2c. In a normal state, the telephone line 2a is connected to the telephone set 4 side.

The signal line 2a is the telephone line. Reference numeral 4 denotes the telephone set; and 6, the hybrid circuit for separating signals of a transmission system and signals of reception system. A transmission signal sent from an adder 18 through a signal line 18a is sent onto the telephone line 2a through the NCU 2. A reception signal sent from a communication apparatus on the other end of the line is output onto a signal line 6a through the NCU 2 and the signal line 2c.

Reference numeral 8 denotes a reader. The reader sequentially reads image signals for one main-scanning line, and forms a signal train representing two values of black and white levels. The reader 8 comprises an image pickup element such a CCD (charge coupled device), and an optical system for scanning an original to be transmitted. Note that a binarized read signal train of black and white levels is sent to an encoder 10 through a signal line 8a.

Reference numeral 10 denotes the encoder. The encoder receives data output onto the signal line 8a, and outputs encoded (e.g., MH (Modified Huffman)- encoded or MR (Modified READ)-encoded) data onto a signal line 10a.

Reference numeral 12 denotes a TCF signal generator for sending a TCF signal, i.e., "0" signal for 1.5 sec onto a signal line 12a when a TCF signal output pulse appears on a signal line 30b.

Reference numeral 14 denotes a V27ter/V29 modulator having a modem function of performing modulation based on the known CCITT recommendation V27ter (differential phase modulation) or V29 (orthogonal modulation). The V27ter/V29 modulator 14 receives a signal on a signal line 30d extending from the controller 30, and determines a transmission speed on the basis of the content of this signal. More specifically, when a signal on the signal line 30d corresponds to "0", "1", "2", or "3", 2,400 bps, 4,800 bps, 7,200 bps, or 9,600 bps is set. The V27ter/V29 modulator 14 receives a signal on a signal line 30c extending from the controller 30. When this signal is at level "0", the modulator receives and modulates a signal on the signal line 10a; when the signal on the signal line 30c is at level "1", it receives and modulates a signal on the signal line 12a. Then, the modulator outputs the modulated data onto a signal line 14a.

Reference numeral 16 denotes a V21 modulator for performing modulation on the basis of the known CCITT recommendation V21. The V21 modulator 16 receives and modulates a procedure signal sent from the controller 30 through a signal line 30e, and outputs the modulated data to the adder 18 through a signal line 16a.

Reference numeral 18 denotes the adder. The adder receives and adds the modulated signal sent from the V27ter/V29 modulator 14 through the signal line 14a and the modulated signal sent from the V21 modulator 16 through the signal line 16a, and outputs a sum to the hybrid circuit 6 through the signal line 18a.

Reference numeral 20 denotes a V21 demodulator for performing demodulation based on the known CCITT recommendation V21. The V21 demodulator 20 receives a reception procedure signal sent from the hybrid circuit 6 through a signal line 6a to perform V21 demodulation, and outputs the demodulated data onto a signal line 20a.

Reference numeral 22 denotes a V27ter/V29 modulator for performing demodulation based on the known CCITT recommendation V27ter (differential phase modulation) or V29 (orthogonal modulation). The V27ter/V29 demodulator 22 receives and demodulates a received image signal sent from the hybrid circuit 6 through the signal line 6a, and outputs the demodulated data to a decoder 24 and/or a TCF signal judging circuit 28 through a signal line 22a. The V27ter/V29 demodulator 22 receives a signal on a signal line 30g extending from the controller 30, and determines a transmission speed on the basis of the content of this signal. More specifically, when a signal on the signal line 30g corresponds to "0", "1", "2", or "3", 2,400 bps, 4,800 bps, 7,200 bps, or 9,600 bps is set.

Reference numeral 24 denotes a decoder for receiving demodulated data output onto the signal line 22a, and outputting decoded e.g., MH (Modified Huffman)-decoded or MR (Modified READ)-decoded data onto a signal line 24a.

Reference numeral 26 denotes a recorder for receiving the decoded data output onto the signal line 24a and sequentially performing recording (image formation) in units of lines.

Reference numeral 28 denotes the TCF signal judging circuit. When a signal at signal level "1" is output onto a signal line 30f, i.e., upon reception of a TCF signal, the judging circuit 28 receives the demodulated data output onto the signal line 22a, outputs an actual reception time of the TCF signal onto a signal line 28a, and outputs a maximum reception time of continuous "0" data onto a signal line 28b.

Reference numeral 30 denotes the controller for controlling the overall apparatus of this embodiment in accordance with programs shown in, e.g., FIGS. 12(A) to 12(F) (to be described later) stored in a ROM 30a.

In the embodiment shown in FIG. 9, assume that both the transmission- and reception-side apparatuses are G3 standard facsimile apparatuses having a transmission system complying with the CCITT recommendations V27ter and V29.

Figure 11:
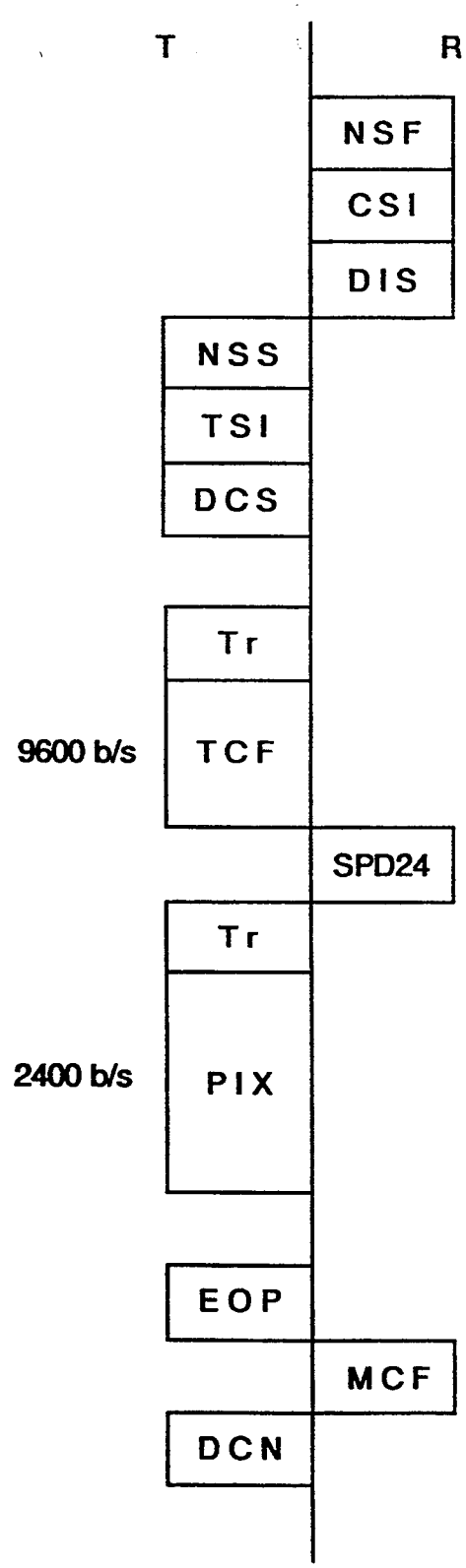
FIG. 11 is a diagram showing detailed image transmission procedures in the fourth embodiment.
Figure 12A:
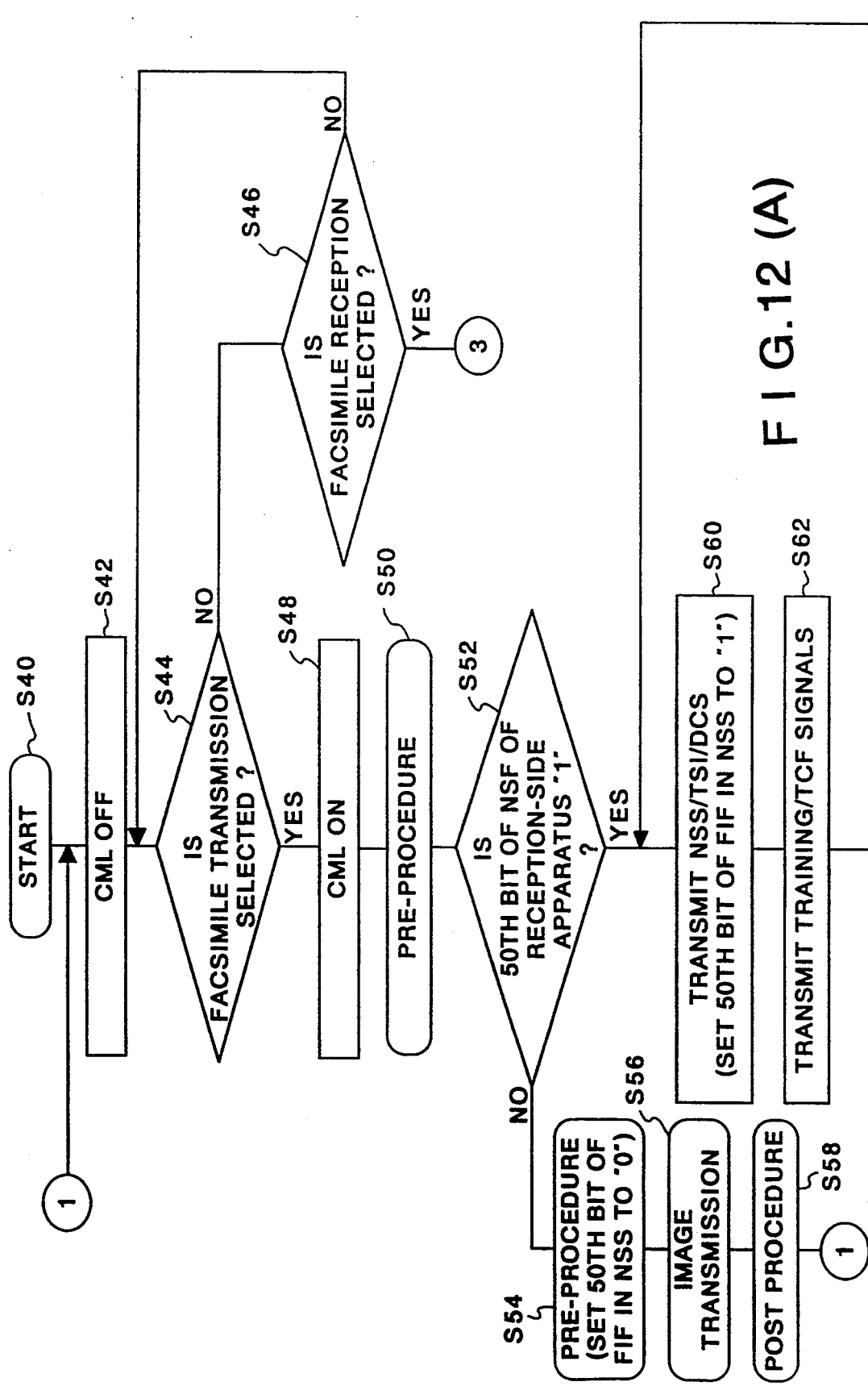
FIGS. 12(A) to 12(F) are flow charts showing control procedures to be executed by a controller of the fourth embodiment shown in FIG. 10.
Figure 12:
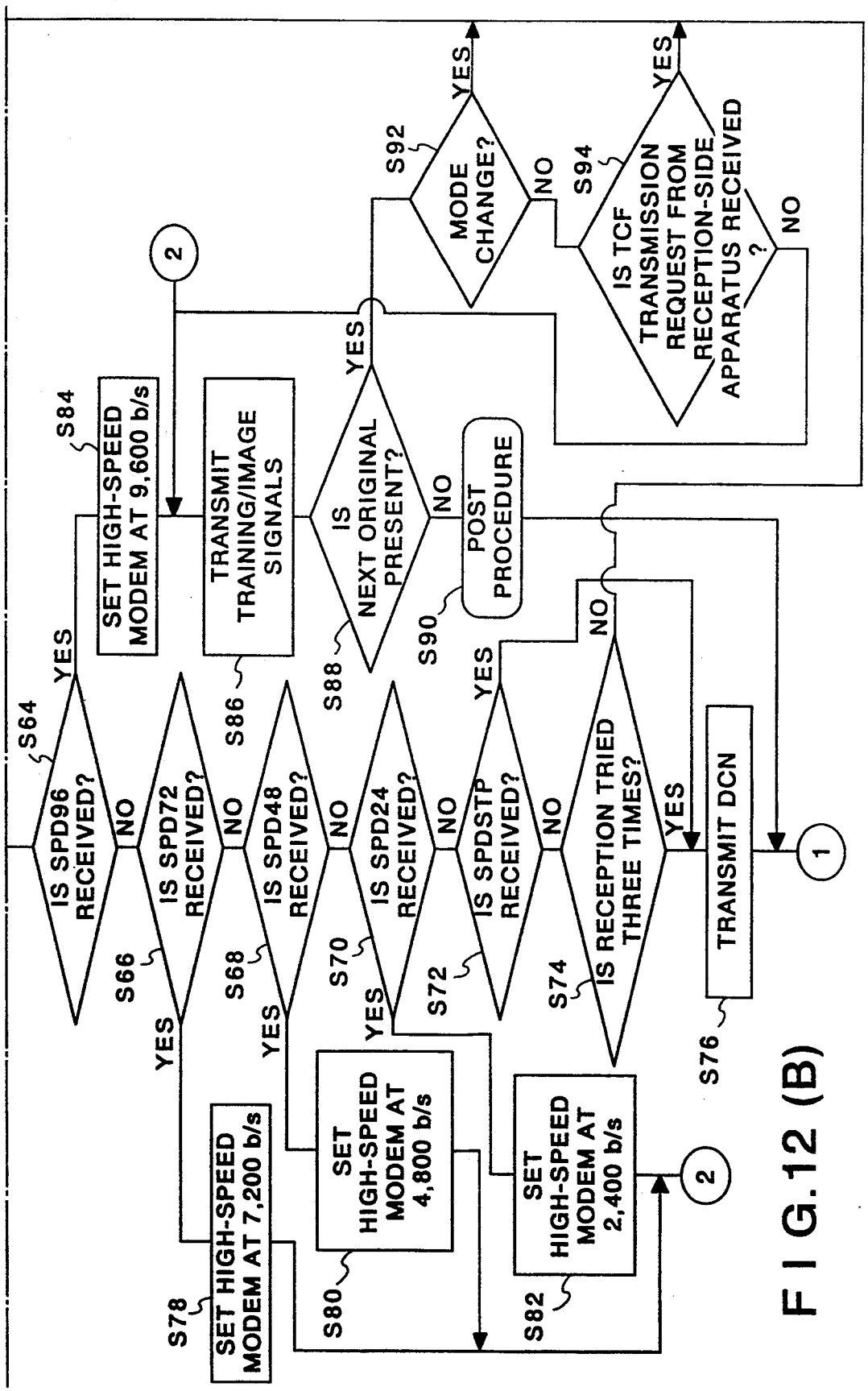
Figure 12:
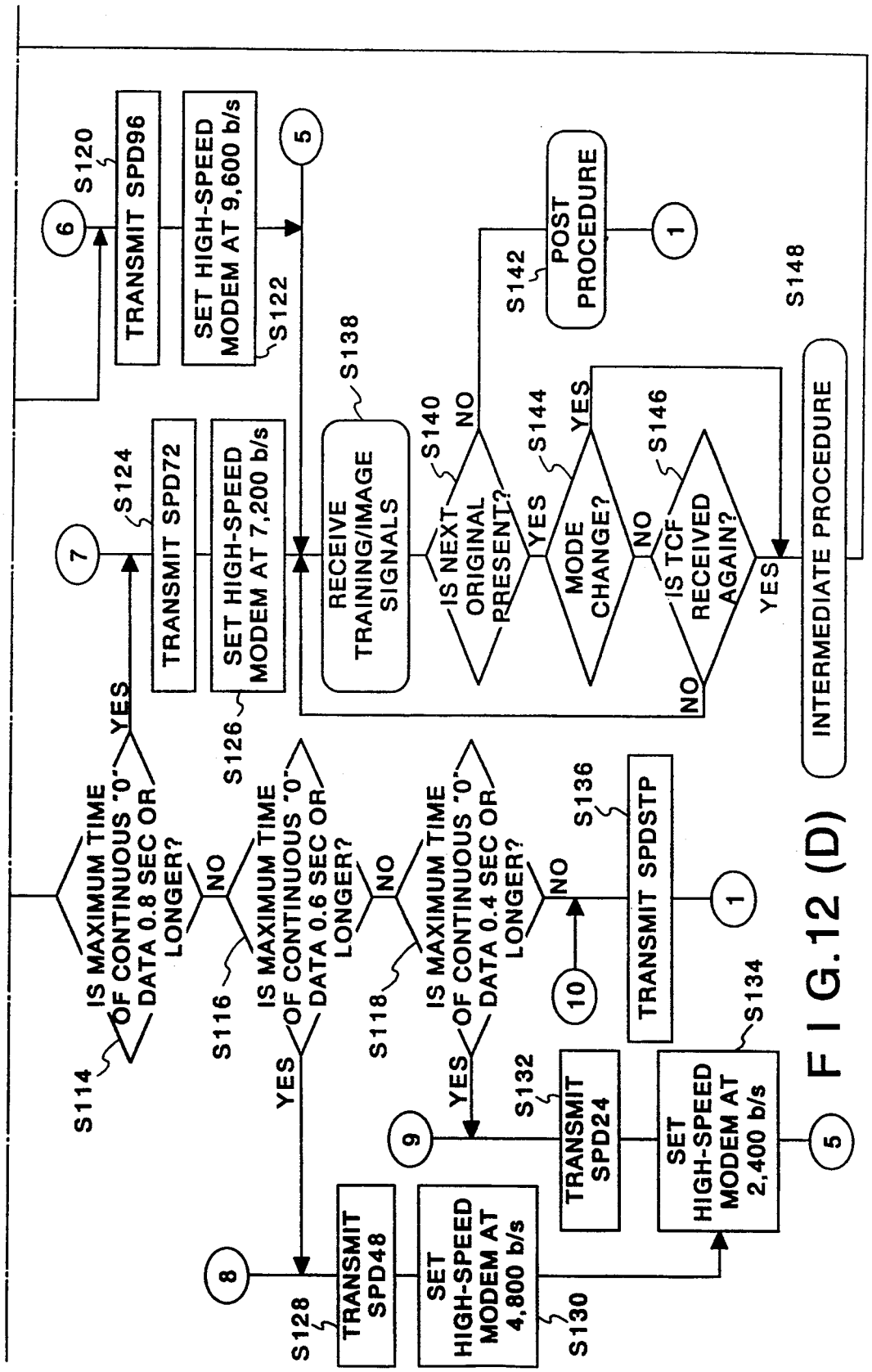
Figure 12:
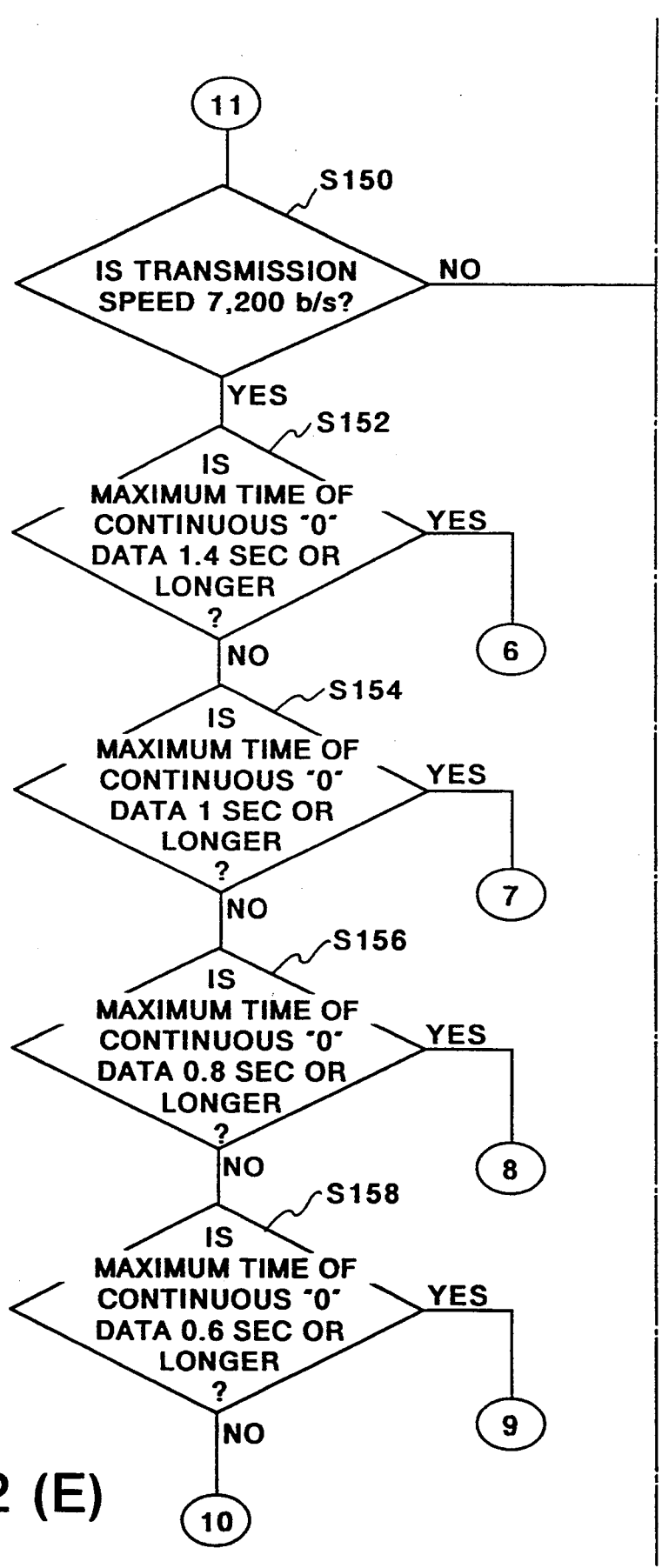

The image communication system of this embodiment will be briefly described below with reference to FIG. 11.

A reception-side apparatus transmits initial identification signal (NSF/CSI/DIS signals). The reception-side apparatus informs to the transmission-side apparatus using the NSF signal in the initial identification signal whether or not the reception-side apparatus has a function of determining an optimal reception speed on the basis of a reception result of a line condition check signal (more specifically, a TCF signal) and informing the determined transmission speed to the transmission-side apparatus. More specifically, when the reception-side apparatus has a function unique to this embodiment, a 50th bit of an FIF (facsimile information field) in the NSF (non-standard device) signal is set to "1"; otherwise, the 50th bit of the FIF in the NSF signal is set to "0", thereby informing it to the transmission-side apparatus.

A case will be exemplified below wherein the apparatus has a function unique to this embodiment. When both the reception-side apparatus on the other end of a line and the transmission-side apparatus have the function unique to this embodiment, the transmission-side apparatus sets a 50th bit of an FIF in an NSS (non-standard device setting) signal to "1", and transmits NSS/TSI/DCS signals.

The transmission-side apparatus then transmits a training signal/TCF. Note that the TCF signal is a "0" signal for 1.5 sec.

The reception-side apparatus receives the training signal/TCF signal. The reception result of the TCF signal is judged by the TCF signal judging circuit 28 to recognize an actual reception time of the TCF signal and a maximum reception time of continuous "0" data. Since the TCF signal has a predetermined duration of 1.5 sec, an optimal transmission speed is determined on the basis of the maximum reception time of the continuous "0" data. Note that when a time of the line condition check signal corresponding to the TCF signal is changed, an actual reception time of the TCF signal must be measured.

A method of instructing transmission at a given speed or line disconnection based on a reception transmission speed of the training/TCF signals and a maximum continuous "0" signal time received at that time will be described below.

A case will be exemplified wherein the transmission speed of the training/TCF signals is 9,600 bps. In this case, when a maximum reception time of continuous "0" data at the reception-side apparatus is, e.g., 1.0 sec or longer, a transmission instruction at 9,600 bps is issued to the transmission-side apparatus; when the time is equal to or longer than 0.8 sec and shorter than 0.1 sec, a transmission instruction at 7,200 bps is issued; when the time is equal to or longer than 0.6 sec and shorter than 0.8 sec, a transmission instruction at 4,800 bps is issued; and when the time is equal to or longer than 0.4 sec and shorter than 0.6 sec, an instruction of line disconnection is issued.

A case will be exemplified wherein the transmission speed of the training/TCF signals is 7,200 bps. In this case, when a maximum reception time of continuous "0" data at the reception-side apparatus is, e.g., 1.4 sec or longer, a transmission instruction at 9,600 bps is issued to the transmission-side apparatus; when the time is equal to or longer than 1.0 sec and shorter than 1.4 sec, a transmission instruction at 7,200 bps; when the time is equal to or longer than 0.8 sec and shorter than 1.0 sec, a transmission instruction at 4,800 bps; when the time is equal to or longer than 0.6 sec and shorter than 0.8 sec, a transmission instruction at 2,400 bps; and when the time is shorter than 0.6 sec, an instruction of line disconnection.

A case will be exemplified wherein the transmission speed of the training/TCF signals is 4,800 bps. In this case, when a maximum reception time of continuous "0" data at the reception-side apparatus is, e.g., 1.4 sec or longer, a transmission instruction at 7,200 bps is issued to the transmission-side apparatus; when the time is equal to or longer than 1.0 sec and shorter than 1.4 sec, a transmission instruction at 4,800 bps; when the time is equal to or longer than 0.8 sec and shorter than 1.0 sec, a transmission instruction at 2,400 bps; and when the time is equal to or longer than 0.8 sec, an instruction of line disconnection.

A case will be exemplified wherein the transmission speed of the training/TCF signals is 2,400 bps. In this case, when a maximum reception time of continuous "0" data at the reception-side apparatus is, e.g., 1.4 sec or longer, a transmission instruction at 4,800 bps is issued to the transmission-side apparatus; when the time is equal to or longer than 1.0 sec and shorter than 1.4 sec, a transmission instruction at 2,400 bps; and when the time is shorter than 1.0 sec, an instruction of line disconnection.

When the transmission-side apparatus receives an SPD96 signal, i.e., a 9,600-bps transmission instruction signal after it transmits the NSS/TSI/DCS signals and the training/TCF signals, it transits to transmission of training/image signals at 9,600 bps.

When the transmission-side apparatus receives an SPD72 signal, i.e., a 7,200-bps transmission instruction signal, it transits to transmission of training/image signals at 7,200 bps.

When the transmission-side apparatus receives an SPD48 signal, i.e., a 4,800-bps transmission instruction signal, it transits to transmission of training/image signals at 4,800 bps.

When the transmission-side apparatus receives an SPD24 signal, i.e., a 2,400-bps transmission instruction signal, it transits to transmission of training/image signals at 2,400 bps.

When the transmission-side apparatus receives an SPDSTP signal, i.e., a line disconnection transmission instruction signal, it transmits a DCN (disconnection command) signal, and opens the line.

Thereafter, a facsimile transmission procedure based on the conventional CCITT recommendation T30 is performed.

The image communication system of the fourth embodiment will be described in detail below with reference to FIGS. 12(A) to 12(F).

Step S40 represents "start".

In step S42, a signal at signal level "0" is output onto the signal line 30a to set a CML (Connect Modem to Line) signal OFF. In step S44, it is checked if facsimile transmission is selected.

If NO in step S44, the flow advances to step S46 to check if facsimile reception is selected. If YES in step S46, the flow advances to step S96; otherwise, the flow returns to step S44.

If it is determined in step S44 that the facsimile transmission is selected, the flow advances to step S48, and a signal at signal level "1" is output onto the signal line 30a to set the CML ON. The flow then advances to step S50. When the CML is ON, a DC loop is formed in the telephone line 2a, line calling is performed, and the telephone line 2a is connected to the hybrid circuit 6.

In step S50, a pre-procedure is executed. In step S52, it is checked if the 50th bit of the FIF in the NSF signal is "1", i.e., if the reception-side apparatus on the other end of the line has a function of determining an optimal transmission speed based on a reception result of a line condition check signal, i.e., the TCF signal and informing the determined transmission speed to the transmission-side apparatus.

If it is determined that the 50th bit of the FIF in the NSF signal is "0", that is, if the reception-side apparatus does not have the above-mentioned function, the flow advances to step S54, and a pre-procedure is executed. When the NSS signal is transmitted, a 50th bit of the FIF in the NSF signal is set to "0".

In step S56, transmission processing of image data is executed. Upon completion of image transmission, the flow advances to step S58, and a post-procedure is executed to end processing. The flow then returns to step S42.

In steps S54 to S58, facsimile communication is executed in a protocol according to the conventional CCITT recommendation T30.

On the other hand, if it is determined in step S52 that the 50th bit of the FIF in the NSF signal is "1", that is, the reception-side apparatus has the above-mentioned function, the flow advances to step S60 to transmit the NSS/TSI/DCS signals. In this case, the 50th bit of the FIF in the NSS signal is set to "1".

In step S62, the training/TCF signals for checking a line condition are transmitted.

In steps S64 to S72, a reception result of a signal from the reception-side apparatus is judged, and corresponding processing is executed. Thereafter, the flow advances to step S86.

When the SPD96 signal, i.e., a transmission instruction signal of training/image signals at 9,600 bps is received from the reception-side apparatus, the flow advances from step S64 to step S84, and a signal "338 is output onto the signal line 30d to set the high-speed modem 14 at 9,600 bps.

When the SPD72 signal, i.e., a transmission instruction signal of training/image signals at 7,200 bps is received from the reception-side apparatus, the flow advances from step S66 to step S78, and a signal "2" is output onto the signal line 30d to set the V27ter/V29 modulator 14 at 7,200 bps.

When the SPD48 signal, i.e., a transmission instruction signal of training/image signals at 4,800 bps is received from the reception-side apparatus, the flow advances from step S68 to step S80, and a signal "1" is output onto the signal line 30d to set the V27ter/V29 modulator 14 at 4,800 bps.

When the SPD24 signal, i.e., a transmission instruction signal of training/image signals at 2,400 bps is received from the reception-side apparatus, the flow advances from step S70 to step S82, and a signal "0" is output onto the signal line 30d to set the V27ter/V29 modulator 14 at 2,400 bps.

When the SPDSTP signal, i.e., a shift instruction signal to line disconnection is received from the reception-side apparatus, the flow advances from step S72 to step S76, and the DCN signal is transmitted. Thereafter, the flow advances to step S42 to set the CML signal OFF, so that the DC loop of the line 2a is opened to recover the line.

It is checked in step S74 if there is no response after the NSS/TSI/DCS signals and the training/TCF signals are transmitted three times. If YES in step S74, the flow advances to step S76, and the DCN signal is transmitted. The flow then advances to step S42 to open the line.

If NO in step S74, however, the flow advances to step S60.

In step S86, training/image signals are transmitted.

In step S88, it is checked if there is the next original. If NO in step S88, the flow advances to step S90, and the post-procedure is executed to end transmission processing. The flow then returns to step S42 to open the line.

If YES in step S88, the flow advances to step S92 to check if a mode is to be changed. If YES in step S92, the flow advances to step S60.

If NO in step S92, the flow advances to step S94 to check if there is a transmission request of the TCF signal from the reception-side apparatus, that is, whether or not an RTP (re-train positive) signal or an RTN (re-train negative) signal is received. If YES in step S94, the flow advances to step S60.

If NO in step S94, the flow advances to step S86.

When the facsimile reception is selected and the flow advances from step S46 to step S96, a signal at signal level "1" is output onto the signal line 30a in step S96 to set the CML ON, so that the DC loop is formed in the line to make a response. Thereafter, the flow advances to step S98.

In step S98, a pre-procedure is executed. Since the reception-side apparatus has the function of determining an optimal transmission speed based on a reception result of a line condition check signal, i.e., the TCF signal and informing the determined transmission speed to the transmission-side apparatus, "1" is set in the 50th bit of the FIF in the NSF signal. In step S100, it is checked if the 50th bit of the FIF in the NSS signal is "1", i.e., the transmission-side apparatus has a function according to this embodiment. If the 50th bit of the FIF in the NSS signal is "0", i.e., the transmission-side apparatus does not have a function according to this embodiment, the flow advances to step S102, and a pre-procedure is executed. In step S104, an image signal is received. Upon completion of the image signal, the flow advances to step S106, and a post procedure is executed.

In steps S102 to S106, facsimile communication is executed in a normal protocol according to the CCITT recommendation T30.

If it is determined in step S100 that the 50th bit of the FIF in the NSS signal is "1", i.e., the transmission-side apparatus has the function of this embodiment, the flow advances to step S108. In step S108, the TCF signal is received. Upon reception of the TCF signal, a signal on the signal line 28b is received to detect a maximum reception time of continuous "0" data. It is checked in step S110 if a transmission speed is 9,600 bps. If NO in step S110, the flow advances to step S150; otherwise, the flow advances to processing in step S112 and thereafter.

In steps S112 to S118, the maximum time of continuous "0" data is checked, and processing according to the maximum time is performed. The flow then advances to step S138.

If it is determined that the maximum time is 1 sec or longer, the flow advances from step S112 to step S120, and the SPD96 signal is transmitted to instruct the transmission-side apparatus to transmit training/image signals at 9,600 bps. The reception-side apparatus outputs a signal "3" onto the signal line 30g to set the V27ter/V29 demodulator 22 at 9,600 bps in step S122.

If it is determined that the maximum time is equal to or longer than 0.8 sec and shorter than 1.0 sec, the flow advances from step S114 to step S124, and the SPD72 signal is transmitted to instruct the transmission-side apparatus to transmit training/image signals at 7,200 bps. The reception-side apparatus outputs a signal "2" onto the signal line 30g to set the V27ter/V29 demodulator 22 at 7,200 bps in step S126.

If it is determined that the maximum time is equal to or longer than 0.6 sec and shorter than 0.8 sec, the flow advances from step S116 to step S128, and the SPD48 signal is transmitted to instruct the transmission-side apparatus to transmit training/image signals at 4,800 bps. The reception-side apparatus outputs a signal "1" onto the signal line 30g to set the V27ter/V29 demodulator 22 at 4,800 bps in step S130.

If it is determined that the maximum time is equal to or longer than 0.4 sec and shorter than 0.6 sec, the flow advances from step S118 to step S132, and the SPD24 signal is transmitted to instruct the transmission-side apparatus to transmit training/image signals at 2,400 bps. The reception-side apparatus outputs a signal "0" onto the signal line 30g to set the V27ter/V29 demodulator 22 at 2,400 bps in step S134.

If it is determined that the maximum time is shorter than 0.4 sec, the flow advances from step S118 to step S136, and the SPDSTP signal is transmitted to instruct the transmission-side apparatus to open the line. The flow then advances to step S42.

In step S138, the training/image signals are received at the setup transmission speed. In step S140, it is checked if there is the next original. If NO in step S140, the flow advances to step S142, and a post-procedure is executed to end reception processing. The flow then advances to step S42.

On the other hand, if YES in step S140, the flow advances from step S140 to step S144 to check if a mode is to be changed. If YES in step S144, the flow advances to step S148; otherwise, the flow advances to step S146.

It is checked in step S146 if the reception-side apparatus requests to receive the training/TCF signals again. If NO in step S146, a message indicating this is transmitted, and the flow advances to step S138.

On the other hand, if YES in step S146, a request signal is transmitted, and the flow then advances to step S148. In step S148, a known intermediate procedure is executed, and the flow advances to step S100.

If it is determined in step S110 that the transmission speed is not 9,600 bps, the flow advances to step S150 to check if the transmission speed is 7,200 bps. If YES in step S150, the flow advances to processing in step S152 and thereafter. In steps S152 to S158, a maximum time of continuous "0" data is checked, and corresponding processing is executed.

If it is determined that the maximum time is 1.4 sec or longer, the flow advances from step S152 to step S120, and the V27ter/V29 demodulator 22 is set at 9,600 bps.

If it is determined that the maximum time is equal to or longer than 1.0 sec and shorter than 1.4 sec, the flow advances from step S154 to step S124, and the V27ter/V29 demodulator 22 is set at 7,200 bps.

If it is determined that the maximum time is equal to or longer than 0.8 sec and shorter than 1.0 sec, the flow advances from step S156 to step S128, and the V27ter/V29 demodulator 22 is set at 4,800 bps.

If it is determined that the maximum time is equal to or longer than 0.6 sec and shorter than 0.8 sec, the flow advances from step S158 to step S132, and the V27ter/V29 demodulator 22 is set at 2,400 bps.

If it is determined that the maximum time is shorter than 0.6 sec, the flow advances from step S158 to step S136, and the line is disconnected.

If it is determined in step S150 that the transmission speed is 7,200 bps, the flow advances to step S160. It is checked in step S160 if the transmission speed is 4,800 bps. If YES in step S160, the flow advances to processing in step S162 and thereafter. In steps S162 to S166, a maximum time of continuous "0" data is checked.

If it is determined that the maximum time is 1.4 sec or longer, the flow advances from step S162 to step S124, and the V27ter/V29 demodulator 22 is set at 7,200 bps.

If it is determined that the maximum time is equal to or longer than 1 sec and shorter than 1.4 sec, the flow advances from step S164 to step S128, and the V27ter/V29 demodulator 22 is set at 4,800 bps.

If it is determined that the maximum time is equal to or longer than 0.8 sec and shorter than 1.0 sec, the flow advances from step S166 to step S132, and the V27ter/V29 demodulator 22 is set at 2,400 bps.

If it is determined that the maximum time is shorter than 0.8 sec, the flow advances from step S166 to step S136, and the line is disconnected.

If it is determined in step S160 that the transmission speed is not 4,800 bps, the flow advances to processing in step S168 and thereafter. In steps S168 to S170, a maximum time of continuous "0" data is checked.

If it is determined that the maximum time is 1.4 sec or longer, the flow advances from step S168 to step S128, and the V27ter/V29 demodulator 22 is set at 4,800 bps.

If it is determined that the maximum time is equal to or longer than 1.0 sec and shorter than 1.4 sec, the flow advances from step S170 to step S132, and the V27ter/V29 demodulator 22 is set at 2,400 bps.

If it is determined that the maximum time is shorter than 1.0 sec, the flow advances from step S170 to step S136, and the line is disconnected.

In the present CCITT recommendation T30, since no bit of a transmission speed of 12.0 kbps, 14.4 kbps, or 19.2 kbps is assigned to DIS (digital identification)/DTC (digital transmission command)/DCS (digital command) signals, the corresponding bit must be assigned to a signal representing a non-standard function, that is, NSF (non-standard device)/NSC (non-standard device command)/NSS (non-standard device setting) signals.

In the fourth embodiment described above, the negotiation of whether or not the apparatus has the function according to the present invention is performed by a signal representing a non-standard function, that is, by assigning a bit to the NSF/NSC/NSS signals. However, if this function is recommended in a meeting of the CCITT, the bit may be assigned to the DIS/DTC/DCS signals.

As described above, according to this embodiment, when transmission is performed between apparatuses having a function of performing transmission at a plurality of transmission speeds, an optimal transmission speed can be determined by transmitting only one line condition check signal. Thus, a time required for determining an optimal transmission speed can be greatly reduced as compared to a conventional apparatus.

In the future, it is expected that the number of transmission speeds is considerably increased (for example, the number of transmission speeds of a G3 facsimile is increased from 4 (present) to 7). Thus, the present invention can provide a further advantage.

<Fifth Embodiment>

The present invention is not limited to the above embodiments. The present invention may be applied to the following image communication system. That is, in an image communication system capable of performing communication at a plurality of transmission speeds, when a line condition check signal (e.g., a TCF signal) for checking whether or not a channel can be used at a designated transmission speed is transmitted prior to transmission of image data, a reception-side apparatus instructs a transmission-side apparatus to fall up or fall back a transmission speed by the arbitrary number of steps on the basis of the reception result of the check signal.

FIG. 13 schematically shows a fifth embodiment of an image communication system according to the present invention.

The detailed arrangement for realizing the image communication system of the fifth embodiment shown in FIG. 13 is the same as that shown in FIGS. 10(A) and 10(B) in the above-mentioned fourth embodiment.

The image communication system of this embodiment comprising the arrangement shown in FIGS. 10(A) and 10(B) will be described in detail below with reference to FIG. 14.

In this embodiment, assume that both the transmission- and reception-side apparatuses have a function of performing transmission at transmission speeds of 2,400 b/s, 4,800 b/s, 7,200 b/s, and 9,600 b/s.

Figure 14:
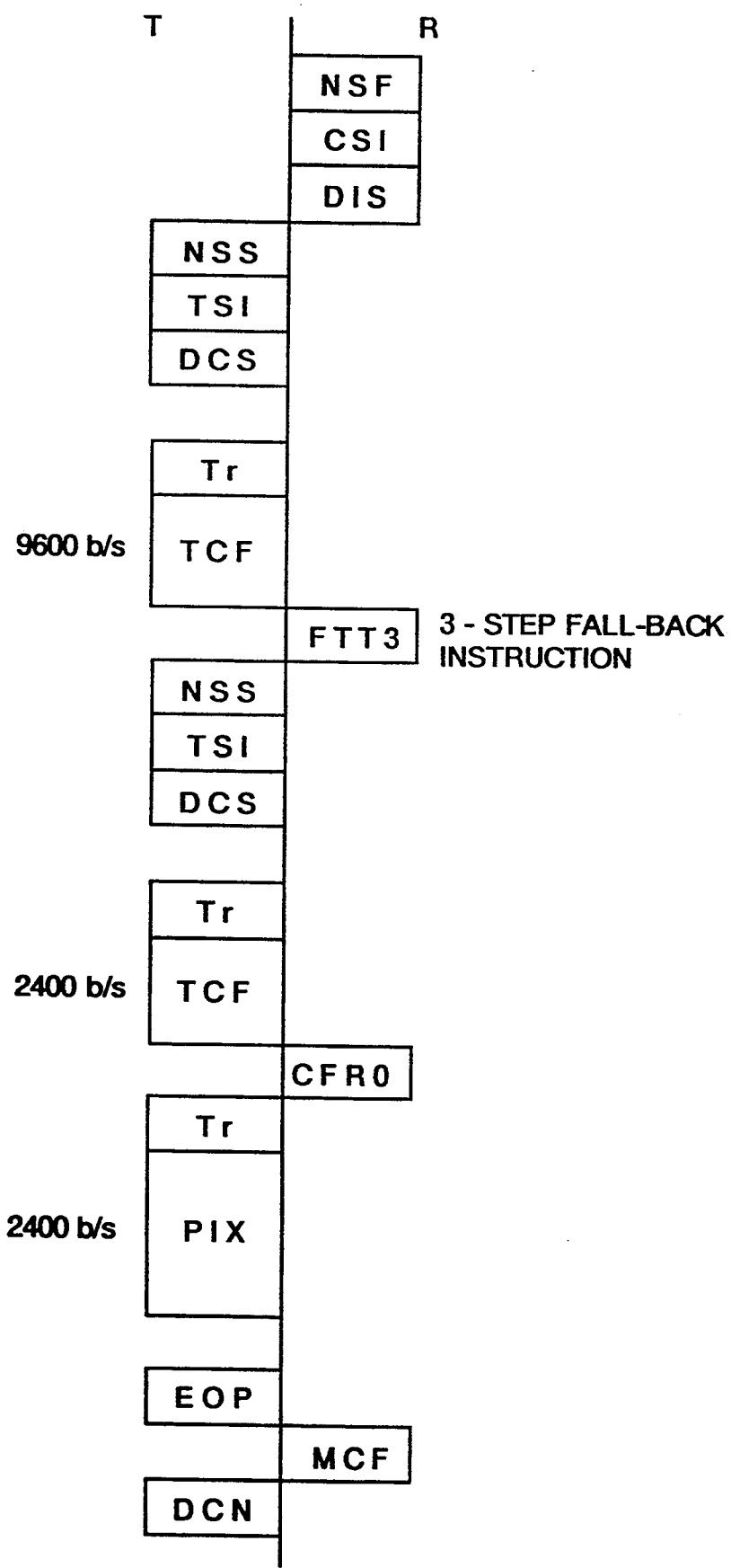
FIG. 14 is a diagram showing detailed image transmission procedures in the fifth embodiment.
Figure 15A:
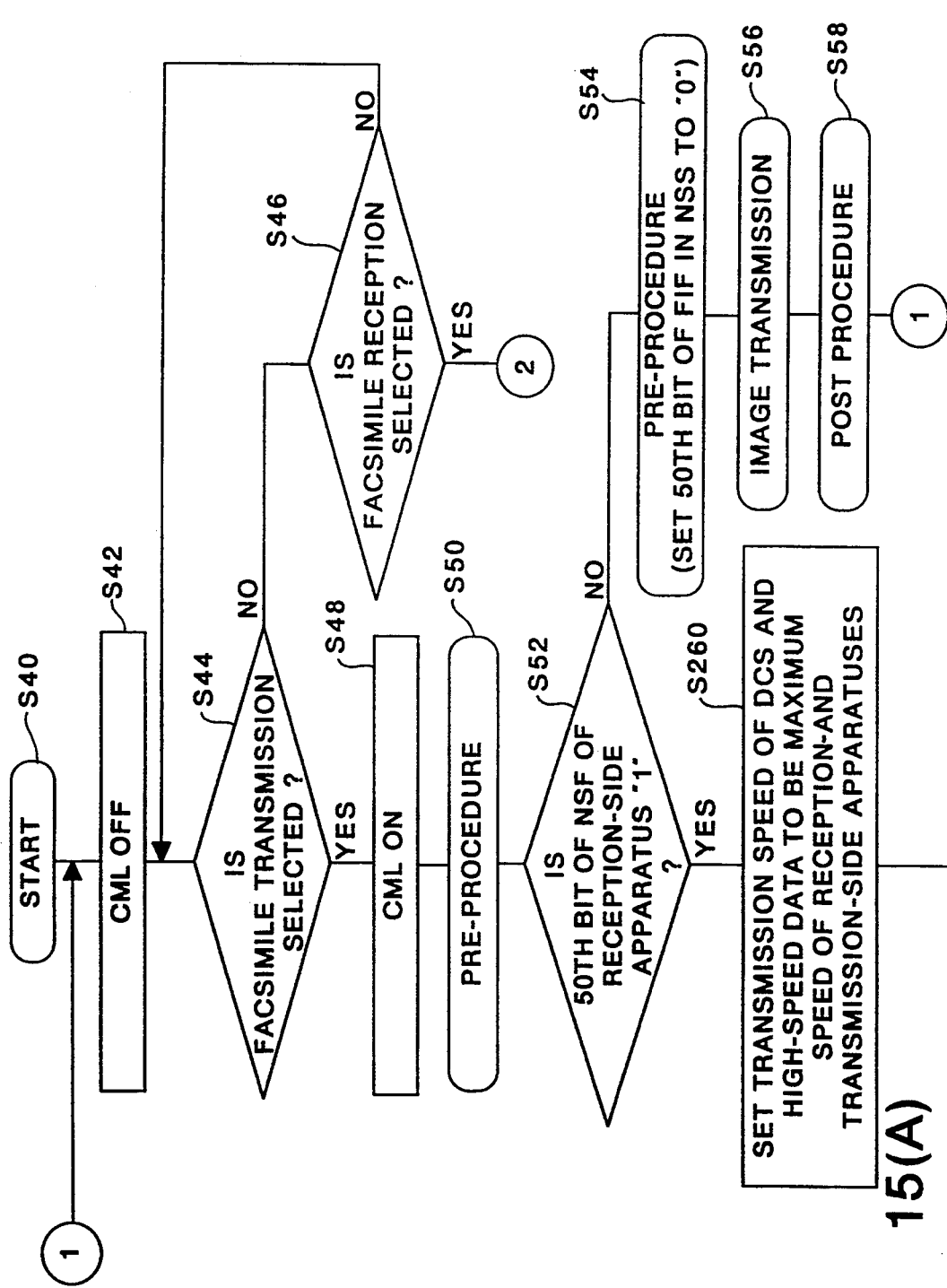
FIGS. 15(A) to 15(D) are flow charts showing control procedures to be executed by a controller of the fifth embodiment.
Figure 15B:
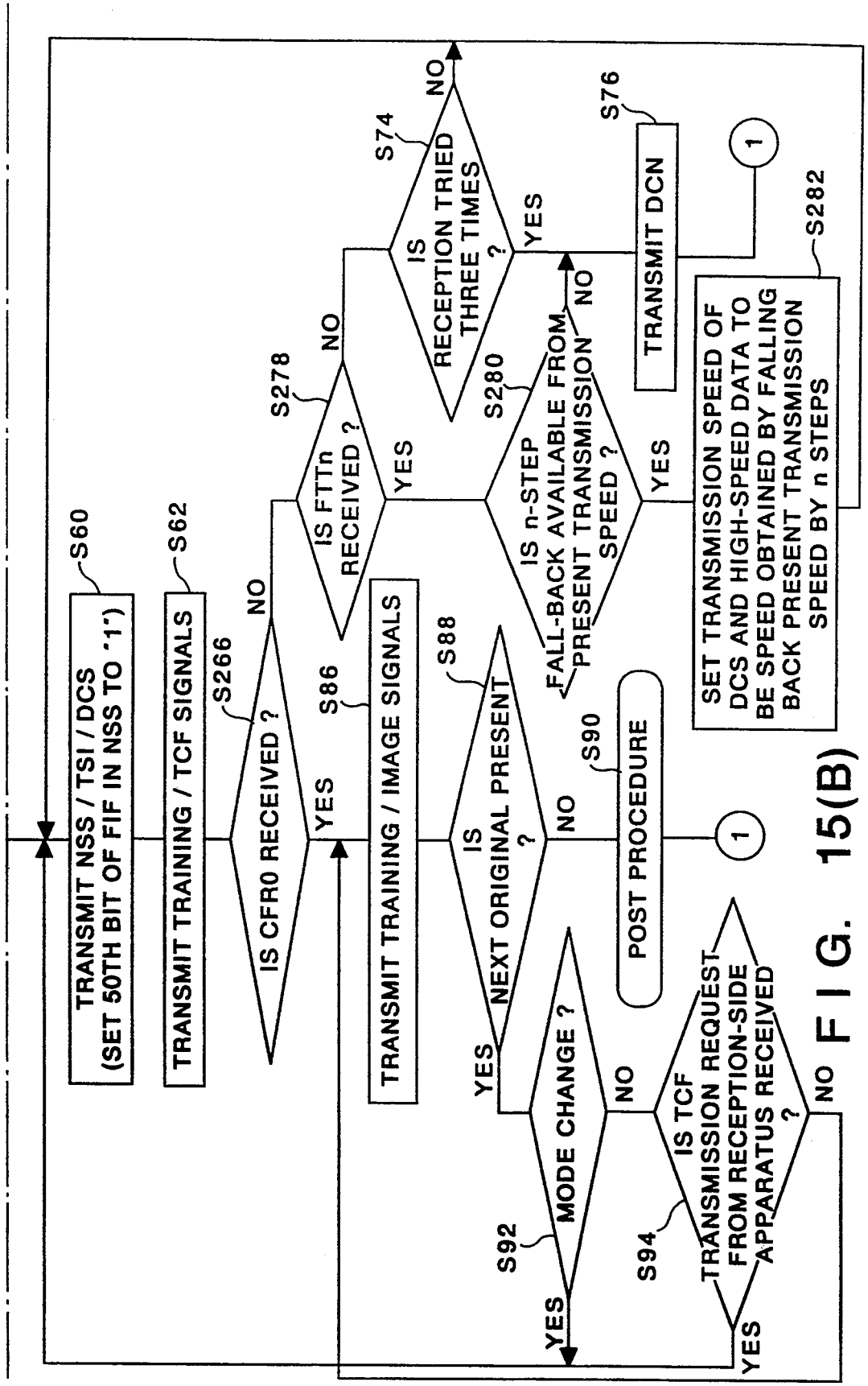
Figure 15:
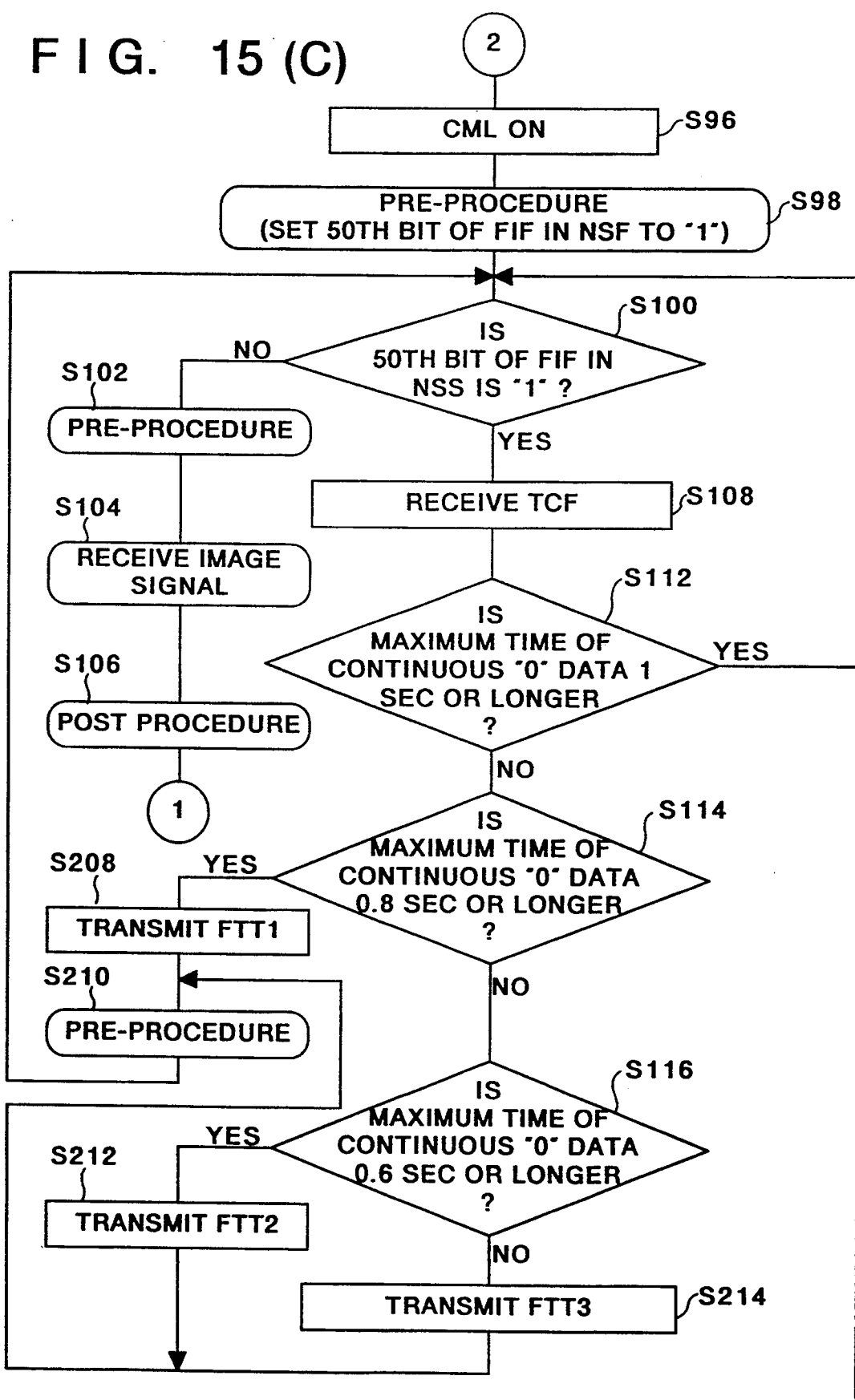
Figure 15:
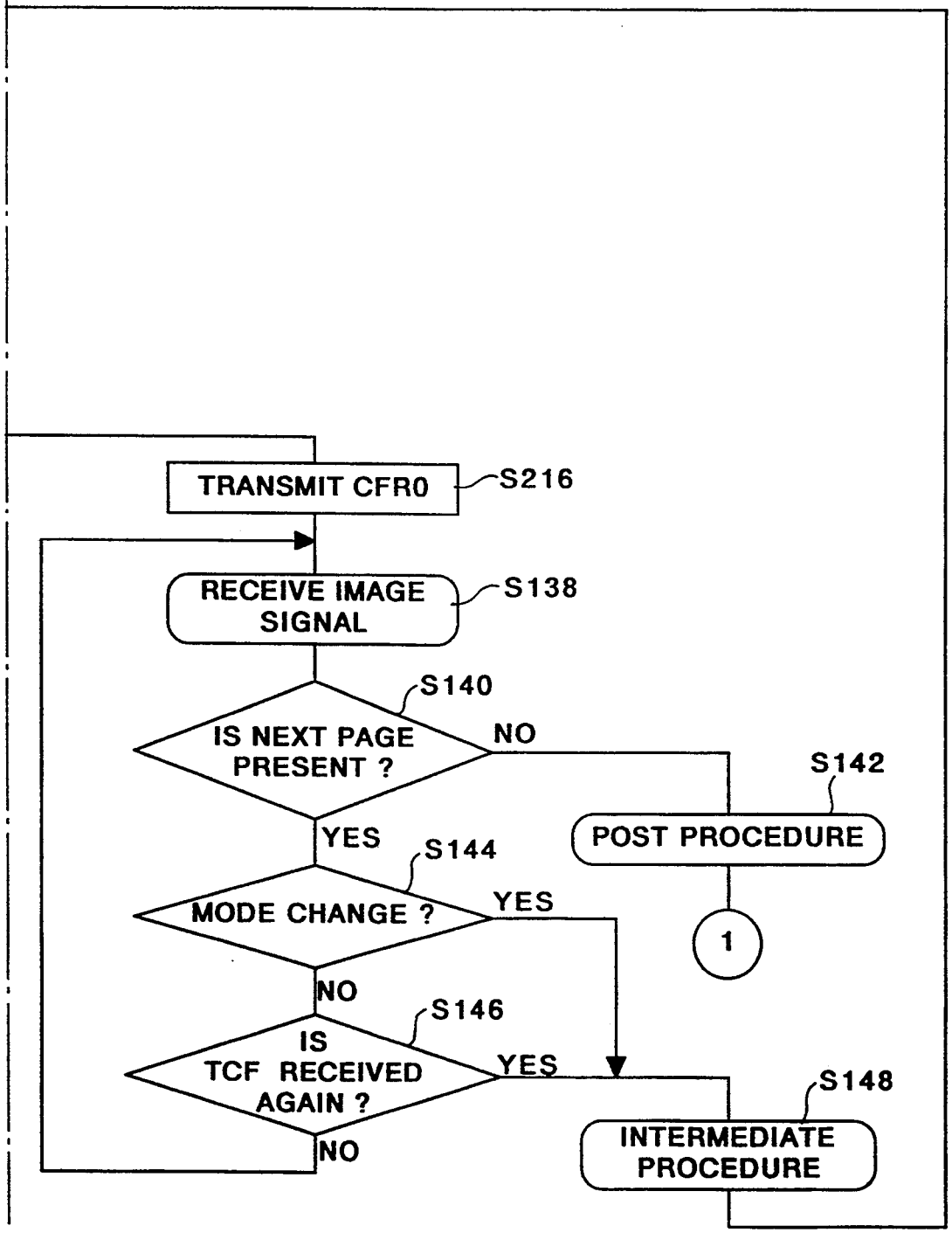

In FIG. 14, the reception-side apparatus transmits NSF/CSI/DIS signals. The transmission-side apparatus transmits training/TCF signals at 9,600 b/s after the transmission of NSS/TSI/DCS signals.

When a line condition is poor, a 3-step fall-back instruction is transmitted. Thereafter, a 3-step fallen-back signal, i.e., 2,400-bps training/TCF signals are transmitted, thus starting image communication.

This procedure is very simple as compared to a case wherein a conventional facsimile apparatus falls back a speed to 2,400 bps, and a time so far can be much shortened.

In this embodiment to be described below, assume that both the transmission- and reception-side apparatuses are G3 standard facsimile apparatuses of a transmission system complying with the CCITT recommendations V27ter and V29.

An instruction for falling up or falling back a transmission speed by the arbitrary number of steps is issued to a transmission-side apparatus on the basis of a reception result of the line check signal (more specifically, the TCF signal).

As the instruction, one of the following instructions is given:

1. an instruction to allow image transmission at a transmission speed of the line condition check signal
2. an instruction to perform fall-back by one or a plurality of steps A signal for allowing image transmission at that transmission speed when the line check signal (more specifically, TCF signal) is received is named CFR0 although it has the same meaning as a conventional CFR (reception ready confirmation) signal.

A signal for instructing n-step fall-back is named FTTn (n is a positive integer).

For example, a signal for instructing 3-step fall-back is FTT3.

The image transmission system shown in FIG. 14 does not initially designate a transmission speed but instructs the number of steps to fall back a transmission speed and to perform re-training at the fallen-back speed according to the instruction. When the TCF can be received with given precision by training at the fallen-back transmission speed, the reception-side apparatus sends back the CFR0 signal to start image transmission at the corresponding transmission speed. For this reason, image transmission can be reliably started at an optimal transmission speed.

For example, when a transmission speed of the training/TCF signals is 9,600 bps, if a maximum reception time of continuous "0" data at the reception-side apparatus is, e.g., 1.0 sec or longer, a transmission instruction CFR0 at 9,600 bps is issued to the transmission-side apparatus; if the time is equal to or longer than 0.8 sec and shorter than 0.1 sec, a transmission instruction FTT1 at 7,200 bps fallen back by one step is issued; if the time is equal to or longer than 0.6 sec and shorter than 0.8 sec, a transmission instruction FTT2 at 4,800 bps fallen back by two steps is issued; and if the time is equal to or longer than 0.4 sec and shorter than 0.6 sec, a transmission instruction FTT3 at 2,400 bps fallen back by two steps is issued.

The image transmission system of this embodiment will be described in detail below with reference to FIGS. 15(A) to 15(D).

Note that the same processing steps in FIGS. 15(A) to 15(D) are denoted by the same step numbers as in FIGS. 12(A) to 12(F), and a detailed description thereof will be omitted.

In FIGS. 15(A) to 15(D), if it is determined in step S52 that a 50th bit of an FIF in an NSF signal is "1", i.e., if the apparatus has the above-mentioned function, the flow advances to step S260, and a maximum transmission speed of the transmission- and reception-side apparatuses is set in a DCS (digital command). A signal for instructing transmission at that transmission speed is output onto the signal line 30d, and the V27ter/V29 modulator 14 in the transmission-side apparatus and the V27ter/V29 demodulator 22 in the reception-side apparatus are set at maximum processing speeds.

In this embodiment, the maximum speed is 9,600 bps.
The flow then advances to step S60.

In a decision of reception result of a signal from the reception-side apparatus after transmission of the training/TCF signals for checking a line condition in step S62, it is first checked in step S266 if the received signal is the CFR0 signal and the present transmission speed can be maintained. If YES in step S266, the flow advances to step S86.

When the FTTn signal for instructing fall-back is received, the flow advances from step S278 to step S280 to check if the present transmission speed can be fallen back by the designated n steps. If NO in step S280, the flow advances to step S76.

If YES in step S280, the flow advances to step S282, and the transmission speed is fallen back by the designated n steps (although n=1 to 3 in this embodiment, a fall-back instruction of four steps or more may be input if still higher transmission speeds are available). The transmission speed is set by the signal line 30 d in the same manner as in the fourth embodiment described above.

On the other hand, if the received signal is not the FTTn signal, the flow advances to step S74 to check if no response is detected after the NSS/TSI/DCS signals and training/TCF signals are transmitted three times. If YES in step S74, the flow advances to step S76, and the DCN signal is transmitted. The flow then advances to step S42 to open the line.

After the TCF signal is received in step S108, a signal on the signal line 28b is received to detect a maximum reception time of continuous "0" data. In this case, since the TCF signal at the maximum transmission speed is received, the flow directly advances to processing in step S112 and thereafter.

In steps S112 to S116, the maximum time of continuous "0" data is checked, and the number of fall-back steps according to the maximum time is designated.

If the maximum time is 1 sec or longer, the flow advances from step S112 to step S216, and the CFR0 signal is transmitted to instruct the transmission-side apparatus to transmit training/image signals at the present transmission speed of 9,600 bps. The flow then advances to step S138.

If the maximum time is equal to or longer than 0.8 sec and shorter than 1.0 sec, the flow advances from step S114 to step S208, and the FTT1 signal is transmitted to instruct the transmission-side apparatus to fall back a transmission speed by one step and to transmit training-/image signals at 7,200 bps after the NSS/TSI/DCS signals. In addition, the reception-side apparatus outputs a signal "2" onto the signal line 30g to set the V27ter/V29 demodulator 22 at 7,200 bps. The flow then advances to step S210. In step S210, pre-procedure processing at 7,200 bps is executed, and the flow advances to step S100.

If the maximum time is equal to or longer than 0.6 sec and shorter than 0.8 sec, the flow advances from step S116 to step S212, and the FTT2 signal is transmitted to instruct the transmission-side apparatus to fall back a transmission speed by two steps and to transmit training/image signals at 4,800 bps after the NSS/TSI/DCS signals. In addition, the reception-side apparatus outputs a signal "1" onto the signal line 30g to set the V27ter/V29 demodulator 22 at 4,800 bps. The flow then advances to step S210. In step S210, pre-procedure processing at 4,800 bps is executed, and the flow advances to step S100.

If the maximum time is equal to or longer than 0.6 sec and shorter than 0.8 sec, the flow advances from step S116 to step S214, and the FTT3 signal is transmitted to instruct the transmission-side apparatus to fall back a transmission speed by three steps and to transmit training/image signals at 2,400 bps after the NSS/TSI/DCS signals. In addition, the reception-side apparatus outputs a signal "0" onto the signal line 30g to set the V27ter/V29 demodulator 22 at 2,400 bps. The flow then advances to step S210. In step S210, pre-procedure processing at 2,400 bps is executed, and the flow advances to step S100.

In the above description, a transmission speed is fallen back by the arbitrary number of steps. However, the present invention is not limited to the above embodiment. When an apparatus has a function of performing transmission at a higher transmission speed than that of a presently transmitted line condition check signal and when a reception state of the line condition check signal is very good, a transmission speed may be fallen up by the arbitrary number of steps accordingly.

For example, the above fall-up operation may be used when the line condition check signal (more specifically, TCF signal) is transmitted when the reception-side apparatus transmits an RTN or RTP signal, or when the transmission-side apparatus transmits an EOM (end of message) signal, or while a plurality of originals are transmitted.

When the line condition check signal (more specifically, TCF signal) is received, a signal for instructing to fall up a speed by n steps is named CFRn (n is a positive integer).

For example, a signal for instructing to fall up a speed by one step is "CFR1".

When the transmission-side apparatus receives the n-step fall-up instruction signal CFRn after it transmits the TCF signal, it transmits the training/TCF signals at a fallen-up transmission speed again after the NSS/TSI/DCS signals.

In this embodiment, when a reception time of continuous "0" data is longer than 1 sec upon reception of the TCF signal, the reception-side apparatus transmits the CFR0 signal indicating that transmission is performed at the designated transmission speed; and when the reception time of continuous "0" data is equal to or longer than 0.8 sec and shorter than 1.0 sec, the reception-side apparatus transmits the NSS/TSI/DCS signals declaring that a transmission speed is fallen back by one step and transmits the FTT1 signal for instructing the transmission-side apparatus to transmit the training/TCF signals and an image signal, whose transmission speed is fallen back by one step.

When the reception time of continuous "0" data is equal to or longer than 0.6 sec and shorter than 0.8 sec, the reception-side apparatus transmits the NSS/TSI/DCS signals declaring that a transmission speed is fallen back by two steps and transmits the FTT2 signal for instructing the transmission-side apparatus to transmit the training/TCF signals and an image signal, whose transmission speed is fallen back by two steps.

When the reception time of continuous "0" data is shorter than 0.6 sec, the reception-side apparatus transmits the NSS/TSI/DCS signals declaring that a transmission speed is fallen back by three steps and transmits the RTT3 signal for instructing the transmission-side apparatus to transmit the training/TCF signals and an image signal, whose transmission speed is fallen back by three steps.

When a transmission speed cannot be fallen back by the designated number of steps, the transmission-side apparatus transmits the DCN (line disconnection signal).

However, when the reception time of continuous "0" or "1" data is equal to or longer than 1 sec, the reception-side apparatus can execute the following control procedure, so that a fall-up instruction can be easily issued in addition to the above-mentioned fall-back function.

For example, if the reception time of continuous "0" data is equal to or longer than 1 sec and shorter than 1.2 sec, the reception-side apparatus transmits the CFR0 signal indicating that reception of an image signal is continued at this transmission speed.

If the reception time of continuous "0" data is equal to or longer than 1.2 sec and shorter than 1.4 sec, the reception-side apparatus transmits the NSS/TSI/DCS signals declaring that a transmission speed is fallen up by one step, and then transmits the CFR1 signal for instructing the transmission-side apparatus to transmit training/TCF signals and an image signal, whose transmission speed is fallen up by one step.

If the reception time of continuous "0" data is equal to or longer than 1.4 sec, the reception-side apparatus transmits the NSS/TSI/DCS signals declaring that a transmission speed is fallen up by two steps, and then transmits the CFR2 signal for instructing the transmission-side apparatus to transmit training/TCF signals and an image signal, whose transmission speed is fallen up by two steps.

When the transmission-side apparatus cannot fall up a transmission speed by the number of steps designated by the reception-side apparatus, the transmission-side apparatus tries to transmit data at the maximum speed.

More specifically, when the present transmission speed is a maximum one, the CFRn (n=0, 1, 2, ... ) is regarded as the same signal as the CFR0 in both the transmission- and reception-side apparatuses. The CFR0 represents transmission at the same speed as the present transmission speed.

In this embodiment, transmission speeds are 2,400 bps, 4,800 bps, 7,200 bps, i.e., those recommended by the CCITT recommendations V27ter and V29.

However, this embodiment may be applied to transmission speeds of 12.0 kbps and 14.4 kbps which are provisionally recommended in the CCITT recommendation V33 and a transmission speed of 19.2 kbps which is expected to be recommended in the future.

In the present CCITT recommendation T30, since no bit of a transmission speed of 12.0 kbps, 14.4 kbps, or 19.2 kbps is assigned to DIS/DTC/DCS signals, the corresponding bit must be assigned to a signal representing a non-standard function, that is, NSF/NSC/NSS signals.

In this embodiment, the negotiation of whether or not the apparatus has the function according to the present invention is performed by a signal representing a non-standard function, that is, by assigning a bit to the NSF/NSC/NSS signals.

However, if this function is recommended in a meeting of the CCITT, the bit can be assigned to the DIS/DTC/DCS signals.

<Sixth Embodiment>

There have been described the image communication system capable of performing communication at a plurality of transmission speeds according to the fourth embodiment, wherein when a line condition check signal (e.g., a TCF signal) for checking whether or not a channel can be used at a designated transmission speed is transmitted prior to transmission of image data, a reception-side apparatus determines an optimal transmission speed on the basis of the reception result of the check signal, and informs to a transmission-side apparatus that transmission of image data is performed at the designated transmission speed; and the image communication system capable of performing communication at a plurality of transmission speeds according to the fifth embodiment of wherein when a line condition check signal (e.g., a TCF signal) for checking whether or not a channel can be used at a designated transmission speed is transmitted prior to transmission of image data, a reception-side apparatus issues an instruction to cause a transmission-side apparatus to fall up or fall back a transmission speed by the arbitrary number of steps. However, the present invention is not limited to the above embodiments but may be applied to an image communication system which can greatly shorten a time required for determining an optimal transmission speed using a tonal signal as a backward signal in a so-called asynchronous modem.

A sixth embodiment according to the present invention will be described hereinafter wherein an optimal transmission speed is determined using a tonal signal as a backward signal in a so-called asynchronous modem.

Figure 16:
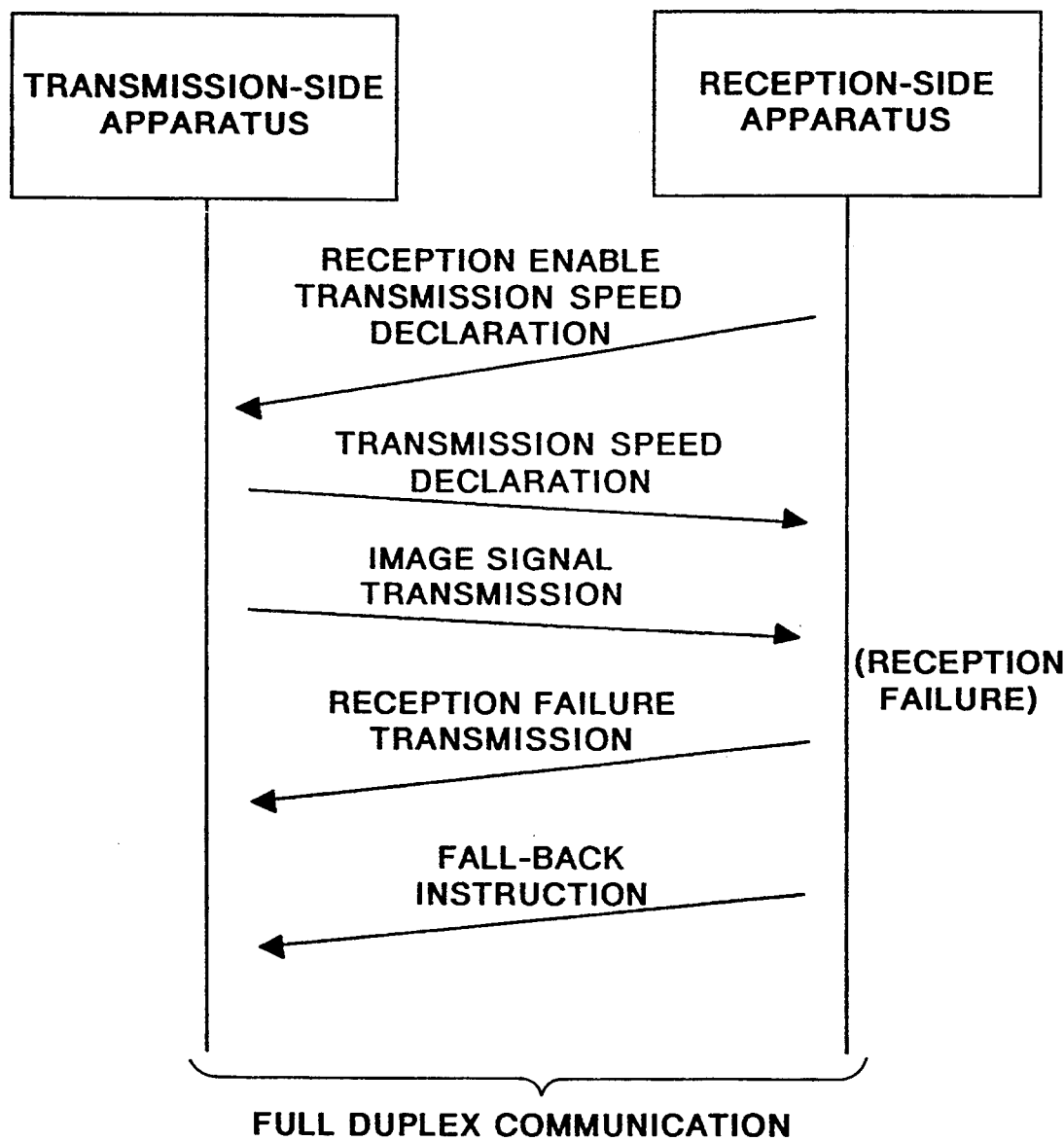
FIG. 16 is a schematic diagram of a sixth embodiment according to the present invention.

FIG. 16 is a schematic view for explaining an image communication system of the sixth embodiment of the present invention.

According to this embodiment, in an image communication system capable of performing transmission at a plurality of transmission speeds in a full duplex communication mode, after a reception-side apparatus declares a reception enable transmission speed, a transmission-side apparatus declares a transmission speed corresponding to the reception enable transmission speed and then starts transmission of an image signal at the declared transmission speed. When the reception-side apparatus fails to receive the image signal at the transmission speed, it transmits a message indicating reception failure to the transmission-side apparatus through a backward channel, and issues an instruction to fall back a transmission speed by the arbitrary number of steps.

Figure 17:
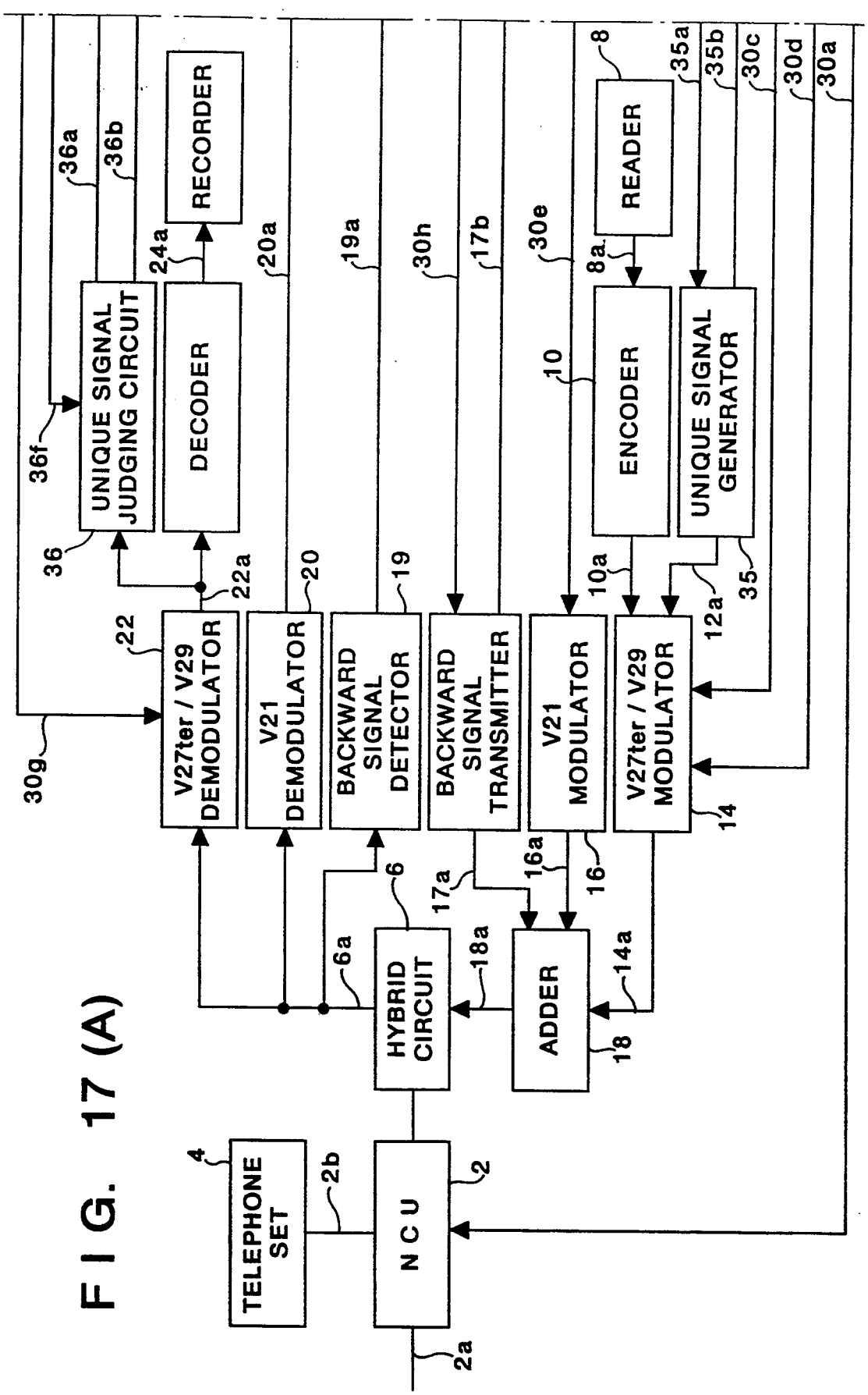
FIGS. 17(A) and 17(B) are block diagrams of facsimile apparatus of the sixth embodiments.
Figure 17B:
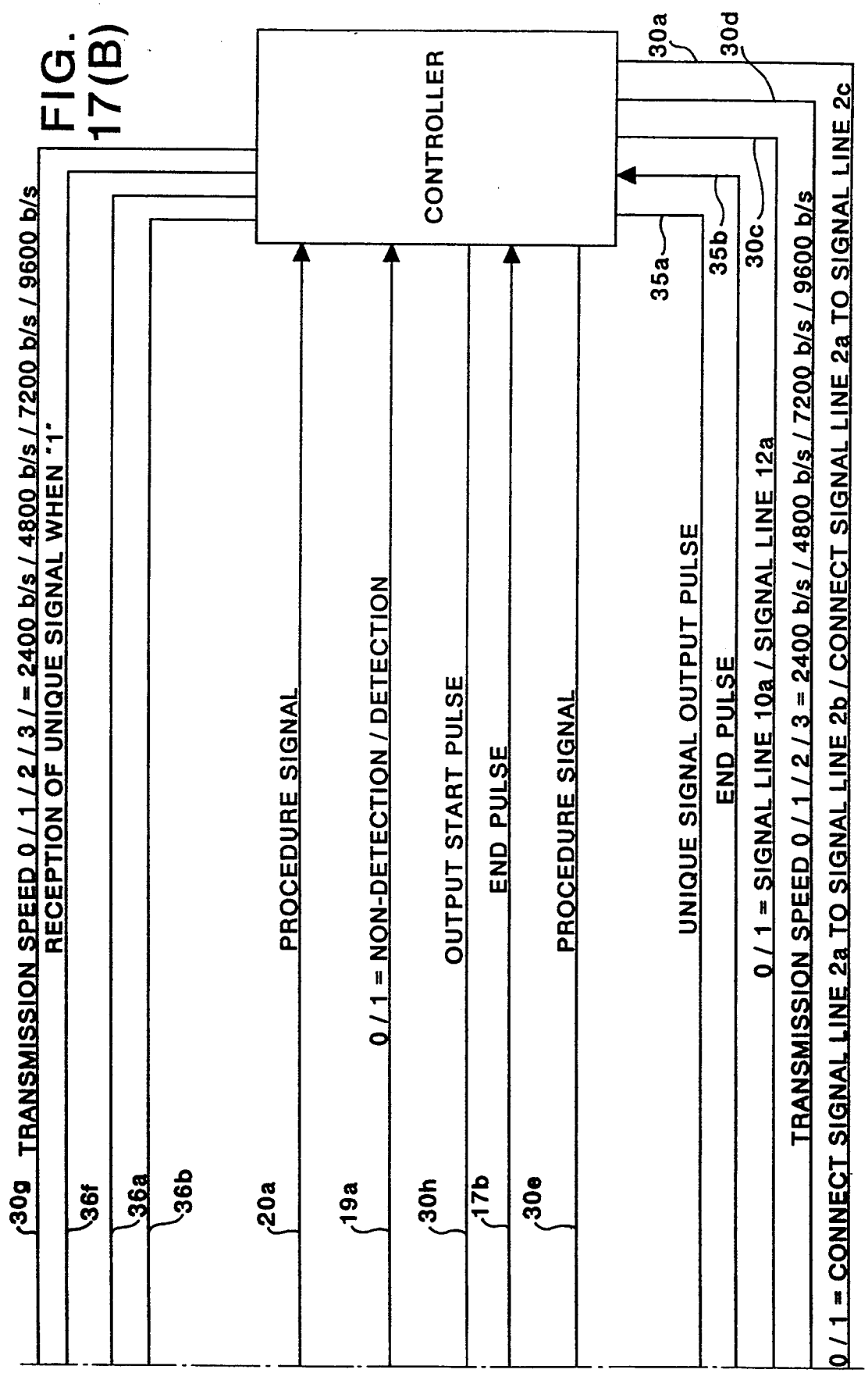
Figure 18A:
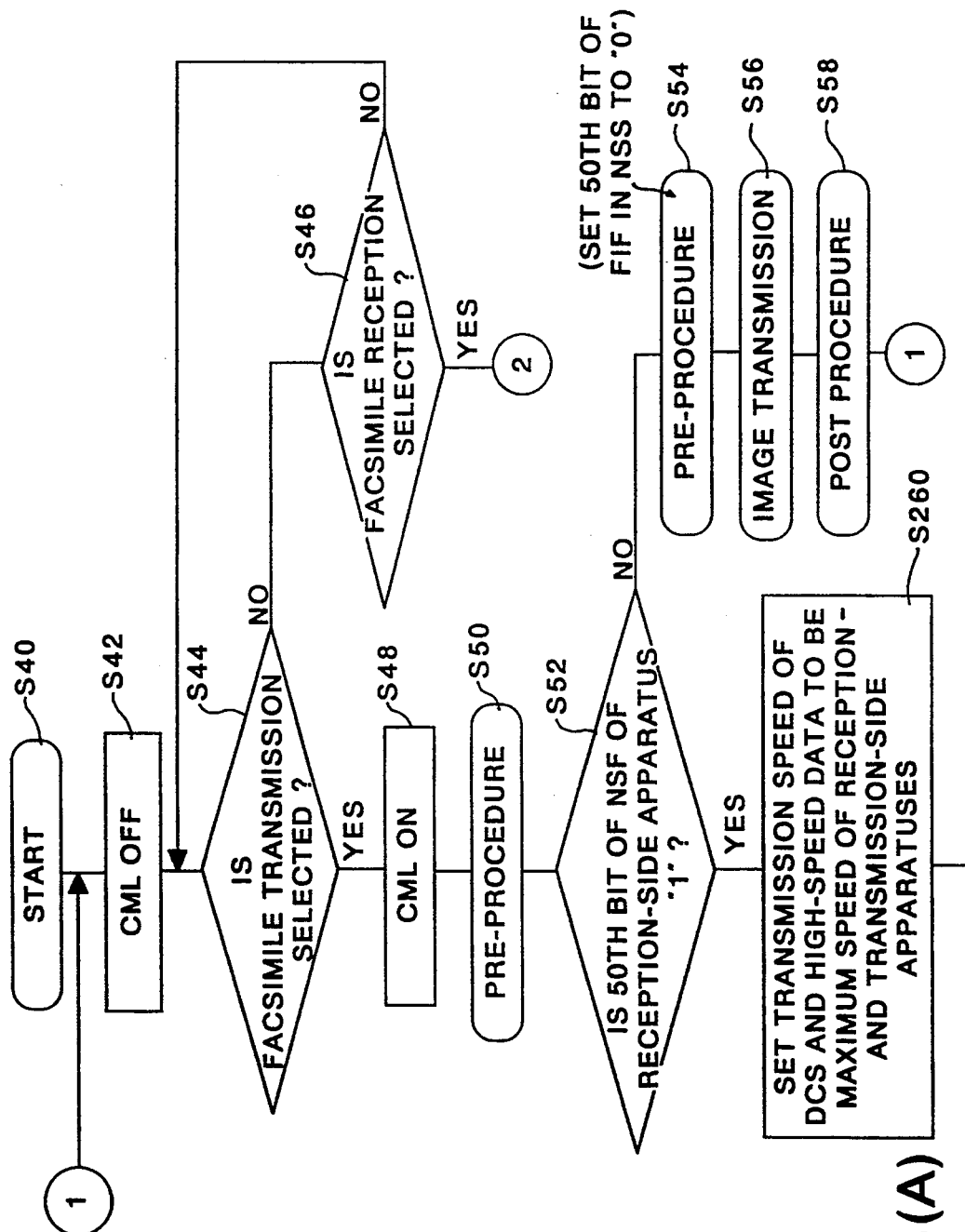
FIGS. 18(A) to 18(D) are flow charts showing control procedures to be executed by a controller of the sixth embodiment shown in FIG. 17.
Figure 18B:
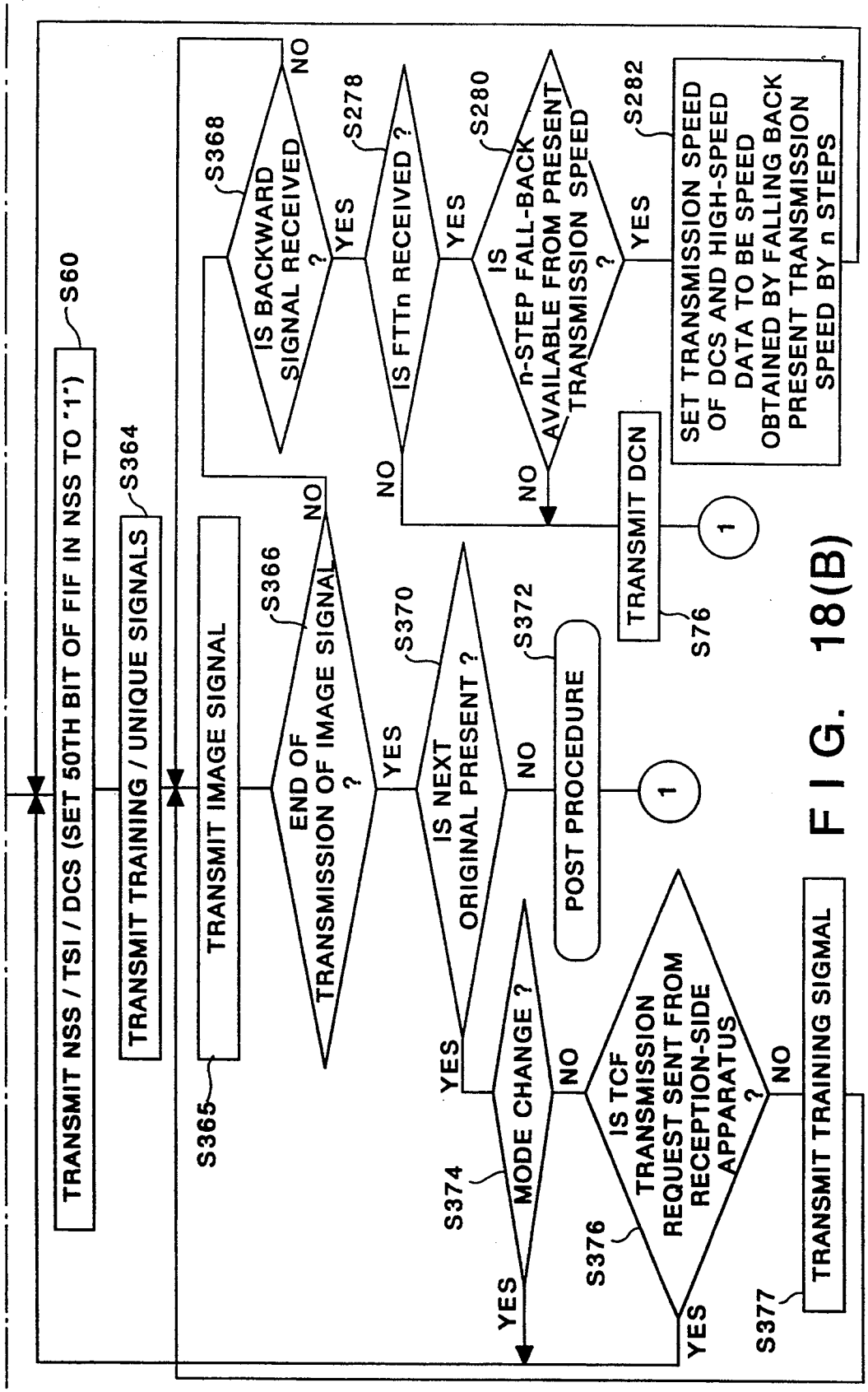
Figure 18C:
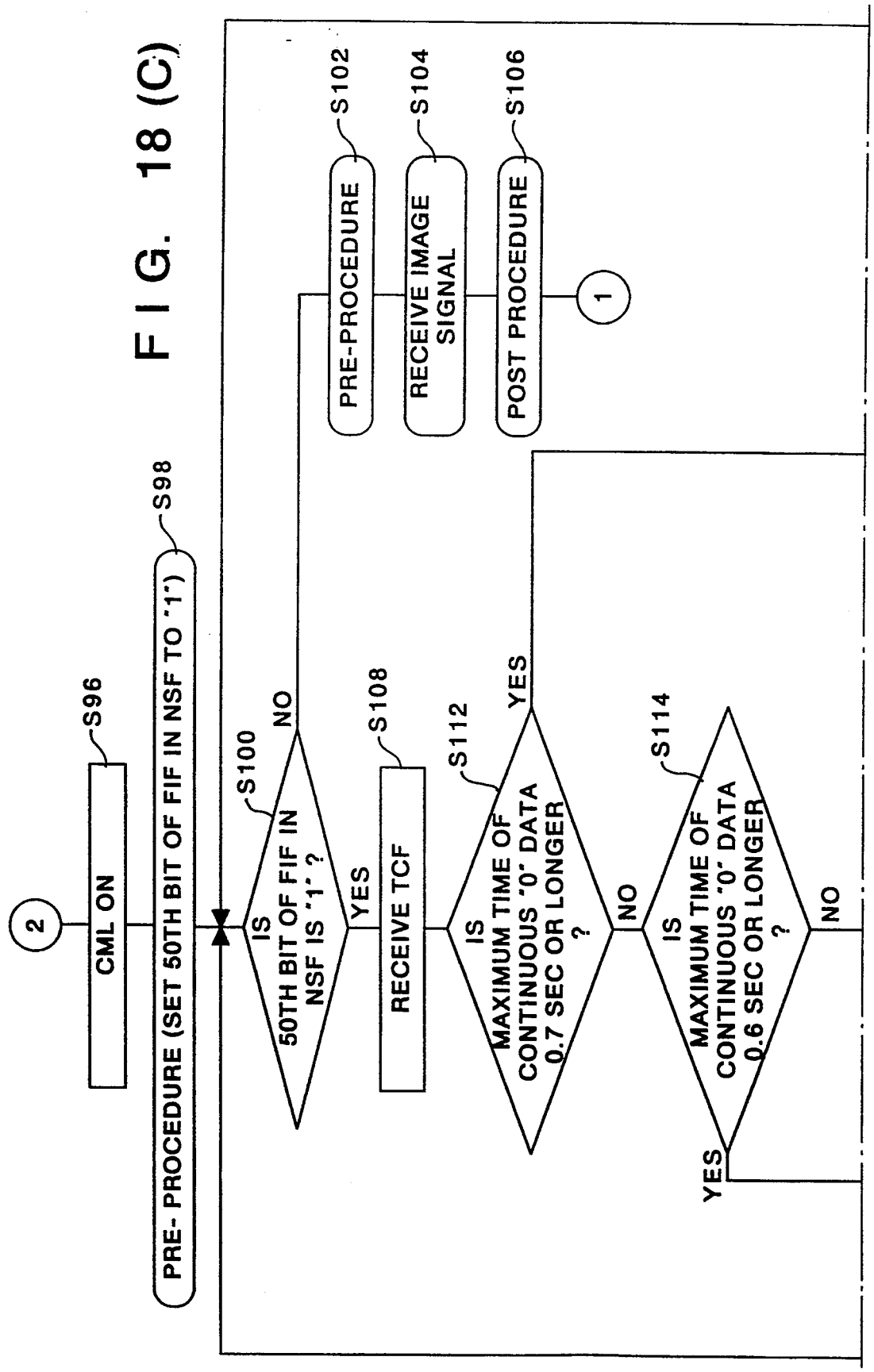
Figure 18:
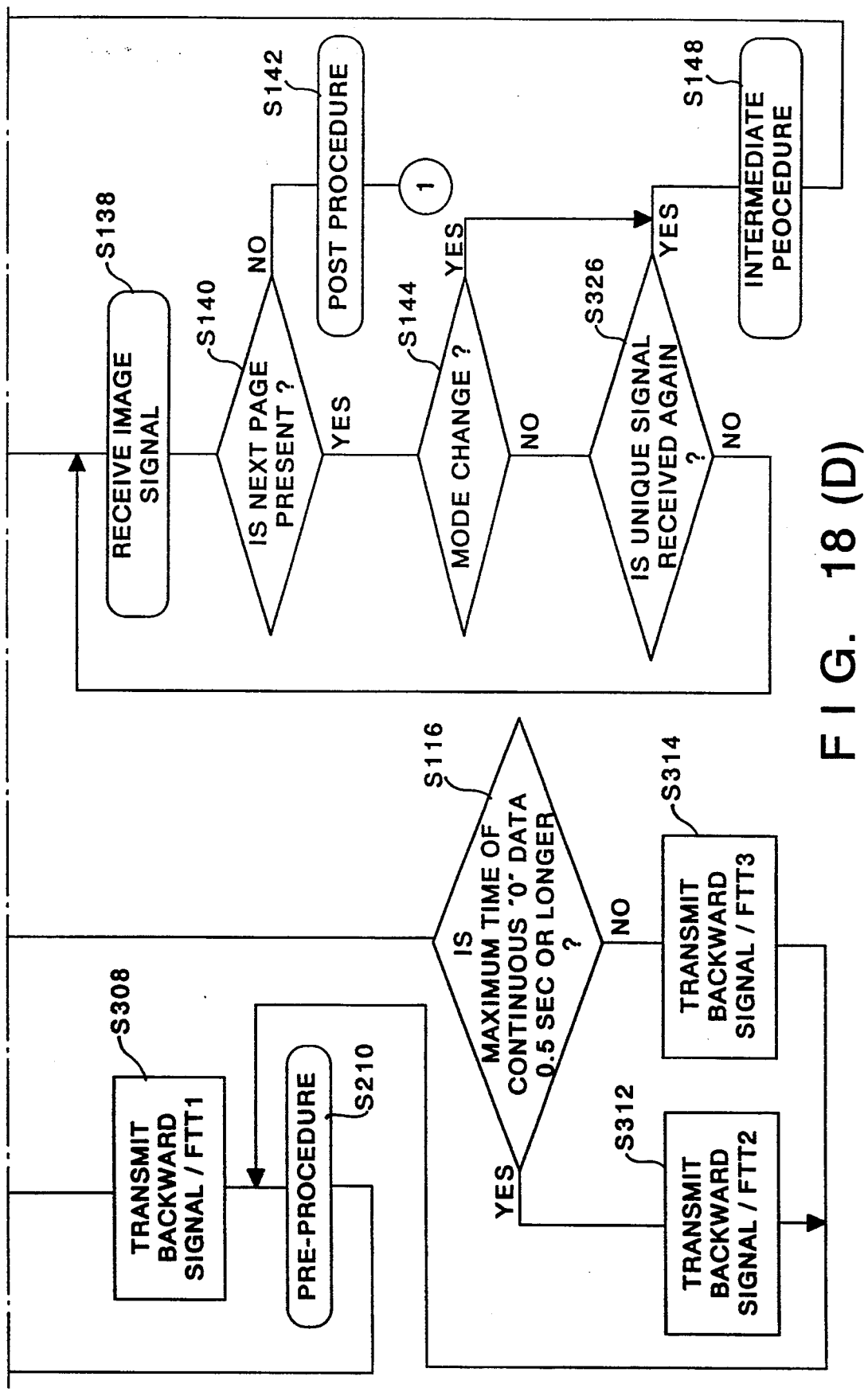

FIGS. 17(A) and 17(B) are detailed block diagrams for realizing the image communication system of this embodiment. The same reference numerals in FIGS. 17(A) and 17(B) denote the same parts as in the arrangement shown in FIGS. 10(A) and 10(B), and a detailed description thereof will be omitted.

In FIGS. 17(A) and 17(B), a backward signal transmitting circuit 17 and a back signal detector 19 are added to the arrangement shown in FIGS. 10(A) and 10(B), and a unique signal generator 35 and a unique signal judging circuit 36 are arranged in place of the TCF signal generator 12 and the TCF signal judging circuit 28.

The backward signal transmitting circuit 17 sends a tonal signal (e.g., a 3,290-Hz tonal signal) onto a signal line 17a for 500 ms when a backward signal transmission start pulse appears on a signal line 30h. The backward signal transmitting circuit 17 generates an end pulse onto a signal line 17b upon completion of transmission of the tonal signal.

The backward signal detector 19 receives a reception signal through a signal line 6a. When the detector 19 detects a backward signal, it outputs a signal at signal level "1" onto a signal line 19a; otherwise, outputs a signal at signal level "0" onto the signal line 19a.

The unique signal generator 35 outputs a unique signal, i.e., a "1" signal for 1.0 sec onto a signal line 12a when a unique signal output pulse appears on a signal line 35b. The unique signal generator 35 generates an end pulse onto a signal line 35b upon completion of transmission of the unique signal.

When a signal at signal level "1" is output onto a signal line 36f, i.e., when the unique signal is received, a unique signal judging circuit 36 receives demodulated data output onto a signal line 22a, outputs an actual reception time of the unique signal onto a signal line 28a, and then outputs a maximum reception time of "1" data onto a signal line 28b.

In this embodiment, both the transmission- and reception-side apparatuses are G3 standard facsimile apparatuses having a transmission system complying with the CCITT recommendations V27ter and V29.

A reception-side apparatus first outputs initial identification signals (NSF/CSI/DIS signals). When the reception-side apparatus has a function unique to this embodiment, a 50th bit of an FIF (facsimile information field) in an NSF (non-standard device) signal is set to "1"; otherwise, it is set to "0".

When the reception-side apparatus on the other end of a line has the function unique to this embodiment and the transmission-side apparatus also has the function unique to this embodiment, the transmission-side apparatus sets a 50th bit of an FIF in an NSS (non-standard device setting) signal to be "1", and transmits NSS/TSI/DCS signals. The transmission-side apparatus then transmits a training signal after a wait time of 75 ns, transmits a unique signal (e.g., a "1" signal for 1 sec) after the transmission of the training signal, and subsequently transmits an image signal. Thereafter, when the transmission-side apparatus detects a backward channel signal from the reception-side apparatus, it interrupts transmission of the image signal, falls back a transmission speed by the number of steps designated by the reception-side apparatus, and restarts transmission of the image signal from the beginning of one page. Therefore, the transmission-side apparatus has a page memory used for this purpose. A signal for instructing to fall back a transmission speed by n steps from the reception-side apparatus will be referred to as an FTTn signal (n is a positive integer). For example, a 2-step fall-back instruction signal is "FTT2".

When one of the transmission- and reception-side apparatuses does not have the function unique to this embodiment, image data is transmitted in accordance with conventional procedures based on the CCITT recommendation T30.

More specifically, the reception-side apparatus informs, to the transmission-side apparatus using an NSF signal as an initial identification signal of a non-standard function, data indicating whether or not it has the function, unique to this embodiment, of instructing the transmission-side apparatus to fall back a transmission speed by the arbitrary number of steps when it is determined based on the reception result of the unique signal representing unsuccessful reception and transmitted prior to transmission of the image signal immediately after the training signal.

This information is performed by assigning a specific bit (e.g., a 50th bit) to, e.g., an FIF (facsimile information field) in the NSF signal. More specifically, if the 50th bit of the FIF in the NSF signal is "0", the reception-side apparatus does not have a function of instructing to fall back a transmission speed by the arbitrary number of steps when reception is unsuccessful based on the reception result of the unique signal transmitted prior to transmission of an image signal immediately after the training signal. On the other hand, if the 50th bit of the FIF in the NSF signal is "1", the reception-side apparatus has a function of instructing to fall back a transmission speed by the arbitrary number of steps when reception is unsuccessful based on the reception result of the unique signal transmitted prior to transmission of an image signal immediately after the training signal. When the reception-side apparatus can issue the fall-back instruction, it informs the transmission-side apparatus of the number of steps to be fallen back using the FTTn signal after transmission of the backward channel signal (more specifically, a 3,290-Hz tonal signal).

Since the transmission-side apparatus also comprises a facsimile apparatus to which this embodiment can be applied, when it receives from the reception-side apparatus the fall-back instruction of the arbitrary number of steps indicating a transmission speed after the backward channel signal, it is operated according to this instruction.

If the 50th bit of the FIF of the NSF signal from the reception-side apparatus on the other end of a line is "1", the transmission-side apparatus sets the 50th bit of the FIF in the NSS signal to be "1". More specifically, the transmission-side apparatus declares to the reception-side apparatus that it operates in the function unique to this embodiment.

If the 50th bit of the FIF of the NSF signal from the reception-side apparatus on the other end of the line is "0", the transmission-side apparatus sets the 50th bit of the FIF in the NSS signal to be "0". More specifically, the transmission-side apparatus instructs to the reception-side apparatus that it does not operate in the function unique to this embodiment. In this case, facsimile communication is performed according to normal procedures complying with the conventional CCITT recommendation T30.

The following description will be made under the assumption that the transmission- and reception-side apparatuses have the function unique to this embodiment.

The transmission-side apparatus sequentially transmits the NSS/TSI/DCS signals, the unique signal (a signal at signal level "1" for 1 sec), and an image signal.

The reception-side apparatus receives the training signal and the unique signal. The reception result of the unique signal is judged by the unique signal judging circuit 36, and simultaneously, an actual reception time of the unique signal and a maximum reception time of continuous "1" data are recognized by the circuit 36.

Since the unique signal has a predetermined duration of 1 sec, the unique signal judging circuit 36 determines based on the maximum reception time of continuous data whether image data transmission is performed at the present transmission speed or a fall-back instruction of a plurality of steps is issued.

When the duration of a line condition check signal corresponding to the unique signal is changed, an actual reception time of the unique signal must be measured.

For example, if the maximum reception time of continuous "1" data is equal to or longer than 0.7 sec, the reception-side apparatus allows to continue image data transmission at this transmission speed, and receives image data (image signal) transmitted after the unique signal.

However, if the reception time of continuous "1" data is equal to or longer than 0.6 sec and shorter than 0.7 sec, the reception-side apparatus transmits a signal for instructing the transmission-side apparatus to transmit training/unique signals and an image signal by falling back the present transmission speed by one step, i.e., the FTT1 signal after the backward signal.

If the reception time of continuous "1" data is equal to or longer than 0.5 sec and shorter than 0.6 sec, the reception-side apparatus transmits a signal for instructing the transmission-side apparatus to transmit training-/unique signals and an image signal by falling back the present transmission speed by two steps, i.e., the FTT2 signal after the backward signal.

If the reception time of continuous "1" data is shorter than 0.5 sec, the reception-side apparatus transmits a signal for instructing the transmission-side apparatus to transmit training/unique signals and an image signal by falling back the present transmission speed by three steps, i.e., the FTT3 signal after the backward signal.

When the transmission-side apparatus does not detect the backward signal, it ends transmission of an image signal of one page. When the transmission-side apparatus receives the FTT1 signal after the backward signal, it transmits the NSS/TSI/DCS signals declaring that the present transmission speed is fallen back by one step, and the training/unique signals and an image signal, whose transmission speed is fallen back by one step.

When the transmission-side apparatus receives the FTT2 signal after the backward signal, it transmits the NSS/TSI/DCS signals declaring that the present transmission speed is fallen back by two steps, and the training/unique signals and an image signal, whose transmission speed is fallen back by two steps.

When the transmission-side apparatus receives the FTT3 signal after the backward signal, it transmits the NSS/TSI/DCS signals declaring that the present transmission speed is fallen back by three steps, and the training/unique signals and an image signal, whose transmission speed is fallen back by three steps.

When a transmission speed cannot be fallen back by the designated number of steps, the transmission-side apparatus transmits the DCN (line disconnection) signal.

Thereafter, facsimile transmission is performed according to procedures based on the conventional CCITT recommendation T30.

Image communication processing of this embodiment will be described in detail below with reference to FIGS. 18(A) to 18(D).

Note that the same processing steps as in FIGS. 12(A) to 12(F) and FIGS. 15(A) to 15(D) are denoted by the same step numbers, and a detailed description thereof will be omitted.

In FIGS. 18(A) to 18(D), after the NSS/TSI/DCS signals in which the 50th bit of the FIF in the NSS signal is set to "1" are transmitted in step S62, the flow advances to step S364, and training and unique signals for checking a line condition are transmitted. In step S365, an image signal is transmitted. It is then checked in step S366 if transmission of the image signal is completed. If YES in step S366, the flow advances to step S370 to check if the next original is present. If YES in step S370, the flow advances to step S374; otherwise, post-procedure processing in step S372 is executed. The flow then returns to step S42, thus ending processing.

It is checked in step S374 if a mode is changed. If YES in step S374, the flow returns to step S60. If NO in step S374, the flow advances to step S376 to check if the reception-side apparatus issues a transmission request of the unique signal, that is, an RTP (re-train positive) signal or an RTN (re-train negative) signal is received. If YES in step S376, the flow returns to step S60.

If NO in step S376, the flow advances to step S377, and the training signal is transmitted. The flow then returns to step S365.

If it is determined in step S366 that transmission of the image signal is not yet completed, the flow advances to step S368 to check if the backward signal is received. If NO in step S368, the flow returns to step S365.

However, if YES in step S368, the flow advances to step S278 to check if the FTTn signal (in this embodiment n=1, 2, or 3) as the same fall-back control signal as in the fifth embodiment is received. Of course, n is not limited to the above values.

If NO in step S278, the flow advances to step S76.

If YES in step S278, the flow advances to step S280.

In the processing according to the decision of the maximum reception time of continuous "1" data in steps S112 to S116, when the maximum time is equal to or longer than 0.76 sec, the flow advances from step S112 to processing in step S138 and thereafter. If it is determined in step S144 that a mode is changed, the flow advances to step S148.

If NO in step S144, the flow advances to step S326. It is checked in step S326 if the reception-side apparatus wants to receive the unique/training signals again. If YES in step S326, a request signal therefor is transmitted, and the flow then advances to step S148.

If NO in step S326, a message indicating this is transmitted, and the flow then returns to step S138.

If the maximum reception time of continuous "1" data is equal to or longer than 0.6 sec and shorter than 0.7 sec, the flow advances from step S114 to step S308. The reception-side apparatus transmits, to the transmission-side apparatus, the backward signal and the FTT1 signal for instructing to transmit the training/unique signals whose transmission speed is fallen back by one step after the NSS/TSI/DCS signals. The flow then advances to step S210.

If the maximum reception time of continuous "1" data is equal to or longer than 0.5 sec and shorter than 0.6 sec, the flow advances from step S116 to step S312. The reception-side apparatus transmits, to the transmission-side apparatus, the backward signal and the FTT2 signal for instructing to transmit the training/unique signals whose transmission speed is fallen back by two steps after the NSS/TSI/DCS signals. The flow then advances to step S210.

If the maximum reception time of continuous "1" data is shorter than 0.5 sec, the flow advances from step S116 to step S314. The reception-side apparatus transmits, to the transmission-side apparatus, the backward signal and the FTT3 signal for instructing to transmit the training/unique signals whose transmission speed is fallen back by three steps after the NSS/TSI/DCS signals. The flow then advances to step S210.

In the above description, a transmission speed is fallen back by the arbitrary number of steps. When a transmission-/reception-side apparatus has a function of performing transmission at a higher transmission speed than that of a presently transmitted line condition check signal (more specifically, TCF signal) and when a reception state of the line condition check signal (more specifically, TCF signal) is very good, a transmission speed may be fallen up by the arbitrary number of steps according to the degree of the reception state.

For example, a fall-up instruction of this embodiment may be used at the time of transmission of the line condition check signal (more specifically, unique signal) when the reception-side apparatus transmits an RTN or RTP signal, or when the transmission-side apparatus transmits an EOM (end of message) signal, or while a plurality of originals are transmitted. A signal for instructing to fall up a speed by n steps when the line condition check signal (more specifically, unique signal) is received is named CFRn (n is a positive integer).

For example, a signal for instructing to fall up a speed by one step is "CFR1".

When the transmission-side apparatus sequentially receives the backward signal and the n-step fall-up instruction signal CFRn after it transmits the unique signal, it transmits the training/TCF signals at a fallen-up transmission speed again after the NSS/TSI/DCS signals.

In this embodiment, when a reception time of continuous "1" data is longer than 0.7 sec upon reception of the unique signal, image transmission is performed at the designated transmission speed.

When the reception time of continuous "1" data is equal to or longer than 0.6 sec and shorter than 0.7 sec, the reception-side apparatus transmits the NSS/TSI/DCS signals declaring that a transmission speed is fallen back by one step and transmits the FTT1 signal for instructing the transmission-side apparatus to transmit the training/unique signals and an image signal, whose transmission speed is fallen back by one step.

When the reception time of continuous "1" data is equal to or longer than 0.5 sec and shorter than 0.6 sec, the reception-side apparatus transmits the NSS/TSI/DCS signals declaring that a transmission speed is fallen back by two steps and transmits the FTT2 signal for instructing the transmission-side apparatus to transmit the training/unique signals and an image signal, whose transmission speed is fallen back by two steps.

When the reception time of continuous "1" data is shorter than 0.5 sec, the reception-side apparatus transmits the NSS/TSI/DCS signals declaring that a transmission speed is fallen back by three steps and transmits the FTT3 signal for instructing the transmission-side apparatus to transmit the training/unique signals and an image signal, whose transmission speed is fallen back by three steps.

When a transmission speed cannot be fallen back by the designated number of steps, the transmission-side apparatus transmits the DCN (line disconnection signal).

However, when the reception time of continuous "0" or "1" data is equal to or longer than 0.7 sec, the reception-side apparatus can execute the following control procedure, so that a fall-up instruction can be easily issued in addition to the above-mentioned fall-back function.

For example, if the reception time of continuous "0" data is equal to or longer than 0.7 sec and shorter than 0.8 sec, the reception-side apparatus continues reception of an image signal at this transmission speed.

If the reception time of continuous "0" data is equal to or longer than 0.8 sec and shorter than 0.9 sec, the reception-side apparatus sequentially transmits the backward signal and the NSS/TSI/DCS signals declaring that a transmission speed is fallen up by one step, and then transmits the CFR1 signal for instructing the transmission-side apparatus to transmit training/unique signals and an image signal, whose transmission speed is fallen up by one step.

If the reception time of continuous "0" data is equal to or longer than 0.9 sec, the reception-side apparatus sequentially transmits the backward signal and the NSS/TSI/DCS signals declaring that a transmission speed is fallen up by two steps, and then transmits the CFR2 signal for instructing the transmission-side apparatus to transmit training/unique signals and an image signal, whose transmission speed is fallen up by two steps.

When the transmission-side apparatus cannot fall up a transmission speed by the number of steps designated by the reception-side apparatus, the transmission-side apparatus tries to transmit data at the maximum speed.

More specifically, when the present transmission speed is a maximum one, the CFRn (n=0, 1, 2, ...) is regarded as the same signal as the CFR0 in both the transmission- and reception-side apparatuses. The CFR0 represents transmission at the same speed as the present transmission speed.

In this embodiment, transmission speeds are 2,400 bps, 4,800 bps, 7,200 bps, i.e., those recommended by the CCITT recommendations V27ter and V29.

However, this embodiment may be applied to transmission speeds of 12.0 kbps and 14.4 kbps which are provisionally recommended in the CCITT recommendation V33 and a transmission speed of 19.2 kbps which is expected to be recommended in the future.

In the present CCITT recommendation T30, however, since no bit of a transmission speed of 12.0 kbps, 14.4 kbps, or 19.2 kbps is assigned to DIS/DTC/DCS signals, the corresponding bit must be assigned to a signal representing a non-standard function, that is, NSF/NSC/NSS signals at present.

In this embodiment, the negotiation of whether or not the apparatus has the function according to the present invention is performed by a signal representing a non-standard function, that is, by assigning a bit to a specific bit position of the NSF/NSC/NSS signals.

However, if this function is recommended in a meeting of the CCITT, the bit can be assigned to the DIS/DTC/ACS signals.

Finally, a case will be described below wherein a method of judging an equalization rate by a PLL automatic equalizer with a square error accumulator and determining a transmission speed based on the judging result is applied to this embodiment.

(1) Method executed during training

CCITT modem recommendation V27ter segment 5 (a signal 8SI obtained by scrambling continuous "1"s) and V29 segment 4 (scrambled data "1" 48SI) are used, and the numbers of times of accumulation N in FIG. 4 are set to be 8 and 48, respectively.

A case will be described below wherein the V29 segment 4 is used. First, a bit error rate vs. S/N ratio curve of the V29 modem is drawn, so that a square error accumulation value $Q_L$ corresponding to an S/N ratio with respect to a user allowance error rate is calculated by simulation. The value obtained by the simulation is represented by $T_H$. In actual facsimile communication, if the value of the output $Q_L$ of the I.D.F. 313 is smaller than the $T_H$, a transmission speed of 9,600 bps is selected; otherwise, a transmission speed of 7,200 bps is selected. Therefore, when the above-mentioned method is employed, a transmission speed can be determined in single training.

When a value upon divergence of the output from the equalizer is calculated by simulation and is represented by $T_{div}$, and when the value of the output $Q_L$ of the I.D.F. 313 is larger than $T_{div}$, a tap coefficient of the equalizer may be saved to perform re-training.

The above method may be applied to the V27ter segment 5. Although ultra-high speed modems such as 14.4 kbps, 19.2 kbps, and the like have many transmission speeds, if the image communication system of this embodiment is employed, an optimal transmission speed can be determined in single training in principle.

(2) Method of using unique signal

In the embodiment of the present invention, when the training signal and scrambled "1" data as the unique signal are sequentially output, a square error accumulation value $Q_L$ can be obtained during this period. In this case, since the number of times of accumulation N can be larger than that in the method (1), a threshold $T_H$ is obtained by simulations as in the method (1) when this method is used.

Furthermore, a first image transmission speed may be determined on the basis of previous communication results in correspondence with destinations of communication.

When a reception-side apparatus fails to receive an image signal at a predetermined transmission speed, it may send a message indicating this to a transmission-side apparatus through a backward channel, and may subsequently inform an optimal transmission speed to the transmission-side apparatus.

In the above embodiment, a reception command signal (more specifically, NSS/TSI/DCS signals) is transmitted at 300 bps on the basis of the CCITT recommendation V21. However, these data may be transmitted at high speed after the training signal upon transmission of image data, and thereafter, image data may be transmitted.

When the reception-side apparatus fails to receive an image signal at a predetermined transmission speed, it may cause the transmission-side apparatus to interrupt transmission using a backward channel of the tonal signal, and may instruct the transmission-side apparatus to fall back or fall up a transmission speed by the arbitrary number of steps using an FSK signal (e.g., a 300-bps signal).

Furthermore, when the transmission-side apparatus sequentially receives the backward signal and the FTTn signal, it sequentially transmits the NSS/TSI/DCS signals and the training signal/unique signal/image signal. However, the NSS/TSI/DCS signals may be omitted.

As described above, according to the embodiments of the present invention, when transmission is performed among facsimile apparatus having a function of performing transmission at a plurality of transmission speeds and when a line condition is good, transmission/reception of the training/TCF or CFR signal can be omitted; when a line condition is poor, a transmission speed can be immediately fallen back to a designated one. Thus, a time required for determining an optimal transmission speed can be greatly reduced as compared to a conventional apparatus.

Figure 19:
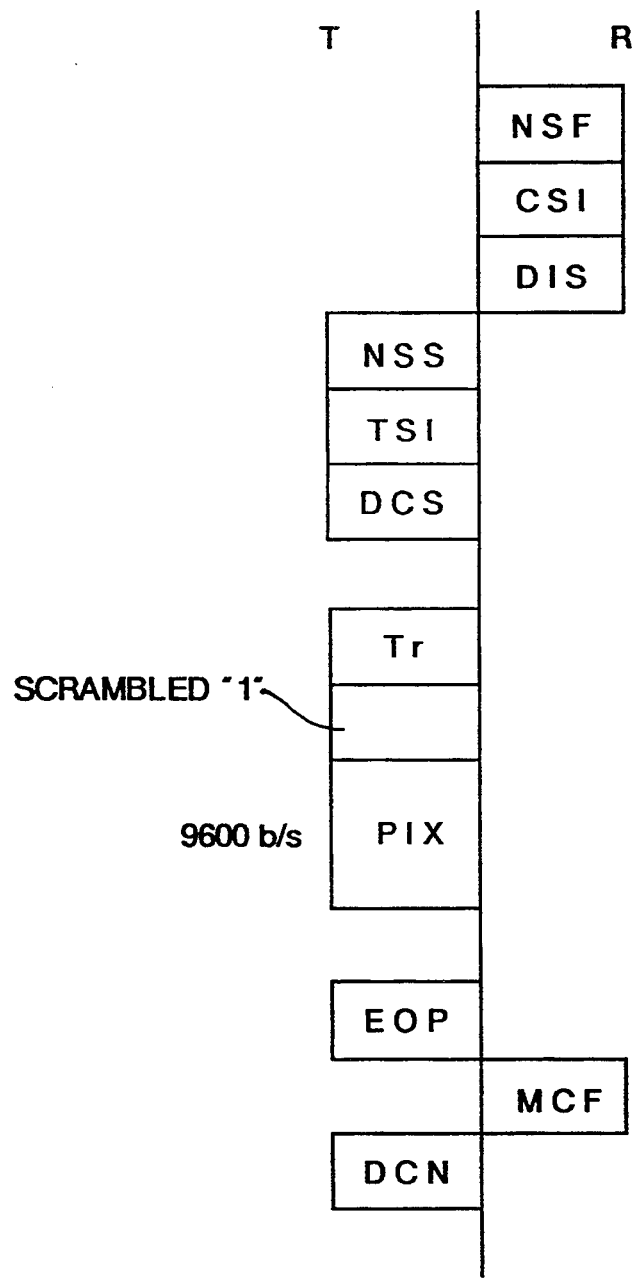
FIGS. 19(A) and 19(B) are flow charts showing control procedures in another image transmission to be executed by the controller of the sixth embodiment.
Figure 19:
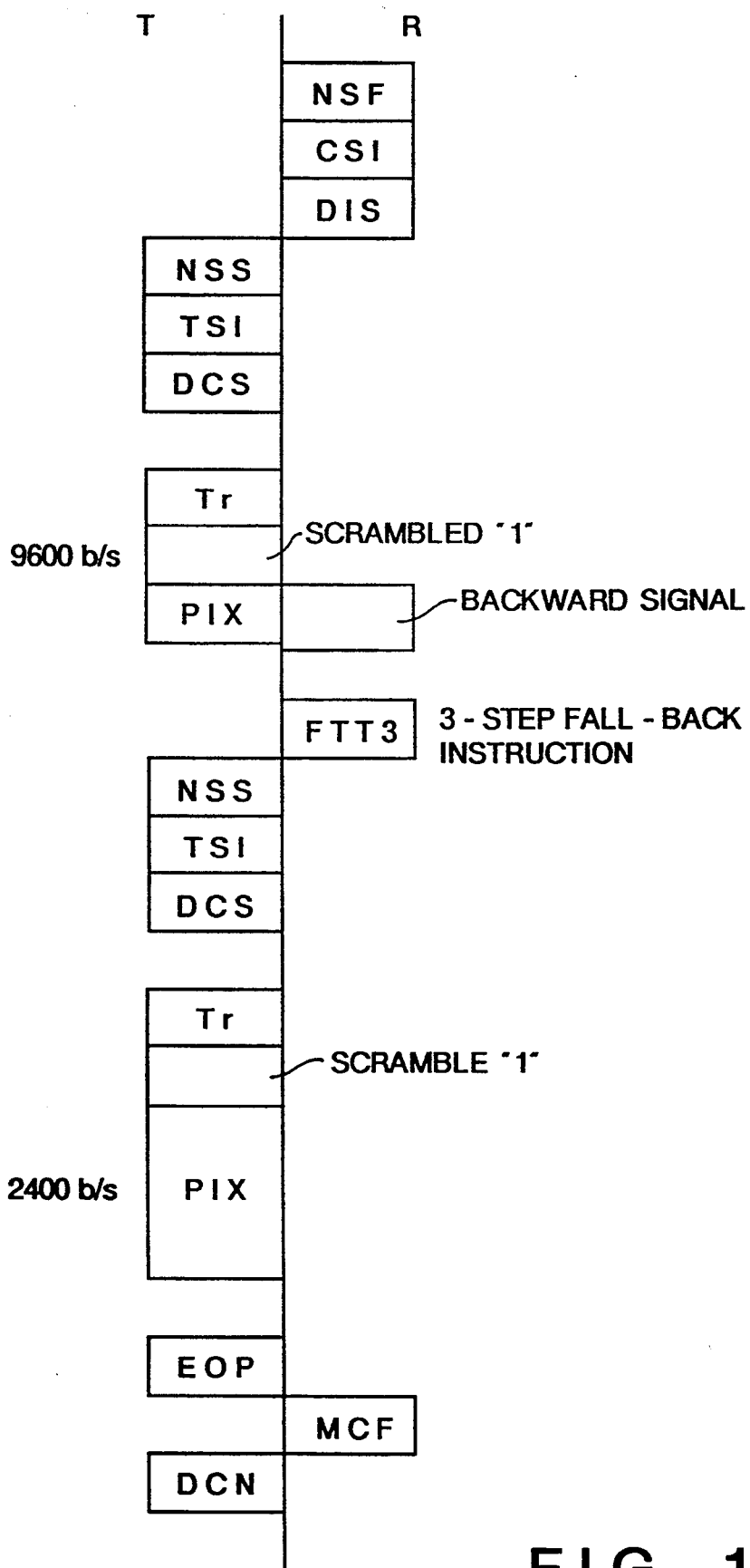

FIGS. 19(A) and 19(B) show such an operation in detail. In FIGS. 19(A) and 19(B), both the transmission- and reception-side apparatuses have a function of performing transmission at transmission speeds of 2,400 bps, 4,800 bps, 7,200 bps, and 9,600 bps.

FIG. 19(A) exemplifies a case wherein a line condition is good, and transmission is performed while omitting the Tr/TCF signals and CFR signal.

In FIG. 19(B), training/unique signals are first transmitted from the transmission-side apparatus at 9,600 bps. However, since a line condition is poor, a 3-step fall-back instruction signal is transmitted from the reception-side apparatus after transmission of the backward signal.

Thereafter, 3-step fallen-back (e.g., 2,400-bps) training/unique signals and an image signal are transmitted from the transmission-side apparatus to the reception-side apparatus, and communication is successful.

Figure 20:
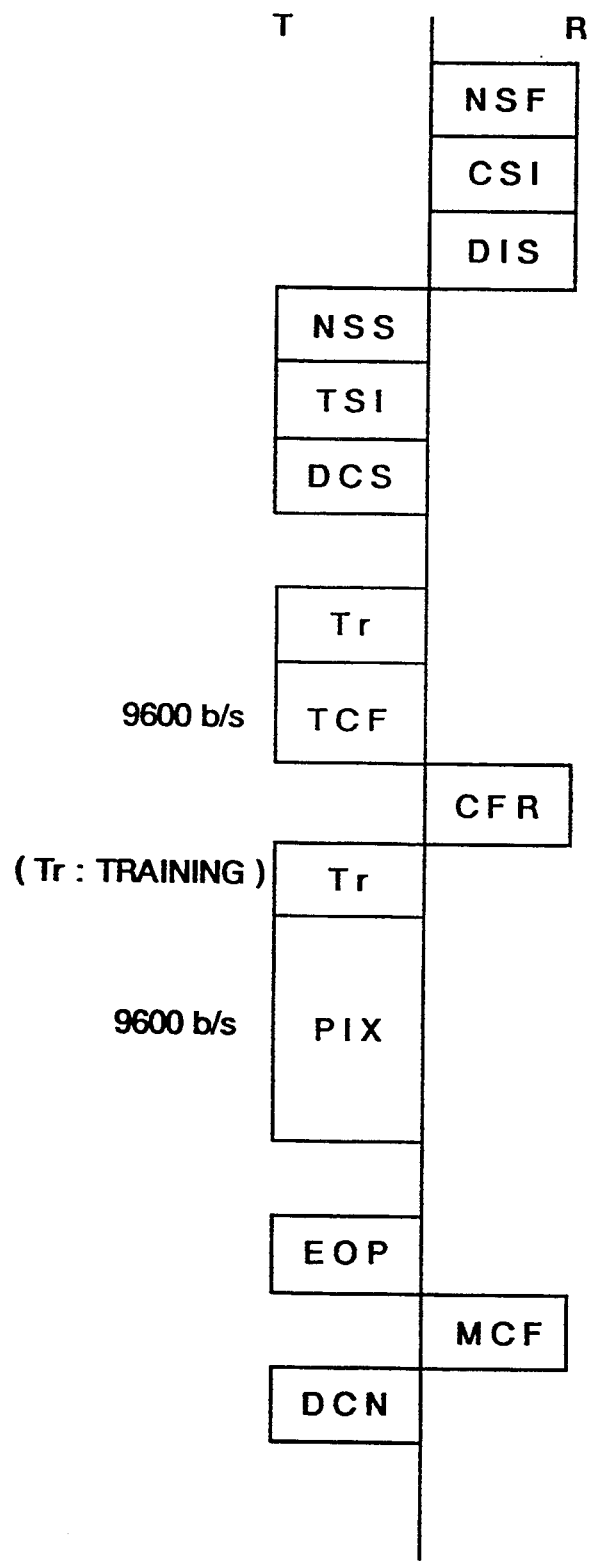
Figure 20:
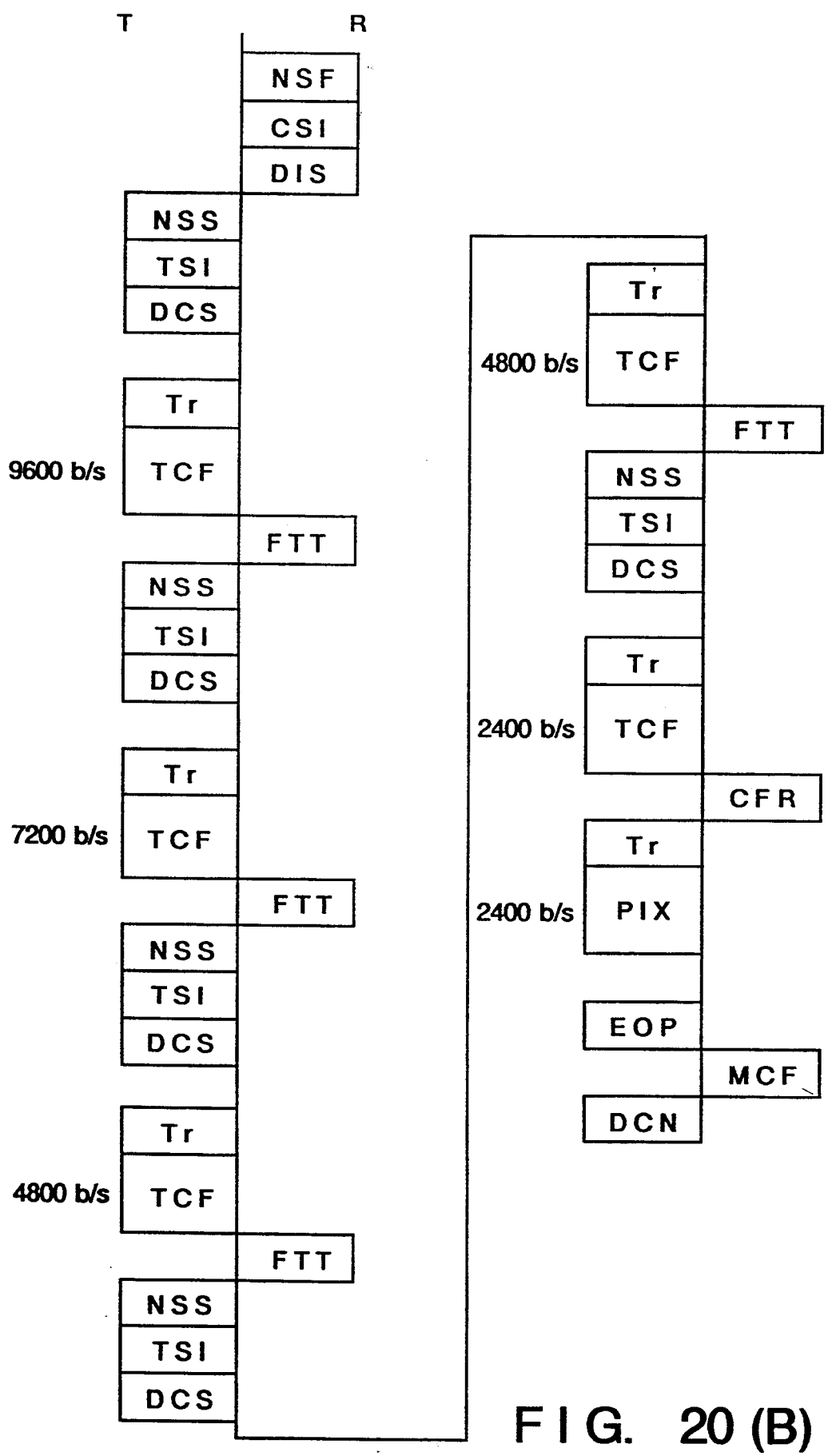

Upon comparison between FIG. 19(B) of this embodiment and FIG. 20 showing a case wherein a transmission speed is fallen back to 2,400 bps by the conventional facsimile apparatus, this embodiment can greatly shorten a procedure as compared to the conventional apparatus. Thus, this embodiment is obviously superior to the prior art.

In the future, the number of transmission speeds of a G3 standard facsimile is expected to be increased from four (present) to seven. At this time, a further advantage can be obtained upon application of the present invention.

As described above, according to this embodiment, when the reception-side apparatus fails reception at a transmission speed declared by the transmission-side apparatus, it can issue an instruction for falling back a transmission speed by the arbitrary number of steps, and a time required for determining an optimal transmission speed can be greatly reduced.

We claim:

1. A data communication system for performing communication by selecting one of a plurality of transmission speeds, comprising:

a transmission-side apparatus that transmits line check data for determining a transmission speed to a reception-side apparatus, and the reception-side apparatus which receives the line check data, said reception-side apparatus measuring the number of times of receiving the line check data correctly or the period of receiving the line check data correctly, wherein said transmission-side apparatus or said reception-side apparatus performs subsequent communication at a selected optimal one of the transmission speeds based on the measured number of times or the measured period.

2. The data communication system according to claim 1, wherein a transmission speed of the line check data is set at a maximum transmission speed available in said transmission-side and reception-side apparatuses.

3. The data communication system according to claim 1, wherein the line check data is included in training/TCF signals.

4. The data communication system according to claim 3, wherein said reception-side apparatus determines the optimal transmission speed on the basis of a time of the TCF signal and a maximum reception time of continuous "0" data.

5. The data communication system according to claim 3, wherein the transmission speeds include at least 2,400 bps, 4,800 bps, 7,200 bps, and 9,600 bps, and when the training/TCF signals are transmitted at 9,600 bps, said reception-side apparatus issues, to said transmission-side apparatus, a transmission instruction of 9,600 bps when the maximum reception time of continuous "0" data at said reception-side apparatus is longer than 1.0 sec; a transmission instruction of 7,200 bps when the maximum reception time is equal to or longer than 0.8 sec and shorter than 1.0 sec; a transmission instruction of 4,800 bps when the maximum reception time is equal to or longer than 0.6 sec and shorter than 0.8 sec; and an instruction of line disconnection when the maximum reception time is equal to or longer than 0.4 sec and shorter than 0.6 sec.

6. The data communication system according to claim 3, wherein when the training/TCF signals are transmitted at 7,200 bps, said reception-side apparatus issues, to said transmission-side apparatus, a transmission instruction of 9,600 bps when the maximum reception time of continuous "0" data at said reception-side apparatus is longer than 1.4 sec; a transmission instruction of 7,200 bps when the maximum reception time is equal to or longer than 1.0 sec and shorter than 1.4 sec; a transmission instruction of 4,800 bps when the maximum reception time is equal to or longer than 0.8 sec and shorter than 1.0 sec; a transmission instruction of 2,400 bps when the maximum reception time is equal to or longer than 0.6 sec and shorter than 0.8 sec; and an instruction of line disconnection when the maximum reception time is shorter than 0.6 sec.

7. The data communication system according to claim 3, wherein the training/TCF signals are transmitted at 4,800 bps, said reception-side apparatus issues, to said transmission-side apparatus, a transmission instruction of 7,200 bps when the maximum reception time of continuous "0" data at said reception-side apparatus is longer than 1.4 sec; a transmission instruction of 4,800 bps when the maximum reception time is equal to or longer than 1.0 sec and shorter than 1.4 sec; a transmission instruction of 2,400 bps when the maximum reception time is equal to or longer than 0.8 sec and shorter than 1.0 sec; and an instruction of line disconnection when the maximum reception time is equal to or shorter than 0.8 sec.

8. The data communication system according to claim 3, wherein when the training/TCF signals are transmitted at 2,400 bps, said reception-side apparatus issues, to said transmission-side apparatus, a transmission instruction of 4,800 bps when the maximum reception time of continuous "0" data at said reception-side apparatus is longer than 1.4 sec; a transmission instruction of 2,400 bps when the maximum reception time is equal to or longer than 1.0 sec and shorter than 1.4 sec; and an instruction of line disconnection when the maximum reception time is shorter 1.0 sec.

9. A data communication apparatus for performing communication by selecting one of a plurality of transmission speeds, comprising:

transmission means for transmitting data at a first transmission speed for determining a transmission speed to a destination apparatus;

reception means for receiving a full-duplex response from the destination apparatus, through a backward channel during data transmission by said transmission means;

setting means for setting a second transmission speed by selecting a desired one of said plurality of transmission speeds on the basis of the full-duplex response through the backward channel received by the reception means during data transmission by said transmission means.

10. The data communication apparatus according to claim 9, wherein said reception means receives a response to define a desired second speed.

11. The data communication apparatus according to claim 9, wherein said transmission means retransmits, at the second transmission speed, the data transmitted at the first transmission speed.

12. A data communication apparatus capable of performing communication by selecting one of a plurality of transmission speeds, comprising:
  reception means for receiving a check data for determining a transmission speed sent from a communication partner,
  measuring means for measuring a number of times or a period of receiving the check data received correctly by said reception means; and
  communication means for performing subsequent communication with the communication partner at the transmission speed based on the number of times or the period measured by said measuring means.

13. The data communication apparatus according to claim 12, wherein a transmission speed of the check data is a maximum transmission speed of the communication partner.

14. The data communication apparatus according to claim 12, wherein the line check data is included in training/TCF signals, and said determining means determines an optimal transmission time on the basis of a time of the TCF signal and a maximum reception time of continuous "0" data.

15. The data communication apparatus according to claim 12, wherein said communication means performs the subsequent communication at a desired transmission speed of the plurality of transmission speeds.

16. A data communication method for performing communication by selecting one of a plurality of transmission speeds, comprising the steps of:
  receiving a check data for determining a transmission speed sent from a communication partner;
  measuring a number of times or a period of receiving the check data correctly in the receiving step; and
  performing subsequent communication at the transmission speed based on the number of times or the period measured at the measuring step.

17. The data communication method according to claim 16, wherein a transmission speed of the check data is a maximum transmission speed available in said apparatus.

18. The data communication method according to claim 16, wherein the check data are included in training/TCF signals.

19. The data communication method according to claim 16, wherein said transmission speeds include at least 2,400 bps, 4,800 bps, 7,200 bps, and 9,600 bps, and when the training/TCF signals are transmitted at 9,600 bps, said transmission speed determining means determines 9,600 bps when the maximum reception time of continuous "0" data is longer than 1.0 sec; 7,200 bps when the maximum reception time of continuous "0" data is equal to or longer than 0.8 sec and shorter than 1.0 sec; 4,800 bps when the maximum reception time of continuous "0" data is equal to or longer than 0.6 sec and shorter than 0.8 sec; and line disconnection when the maximum reception time of continuous "0" data is equal to or longer than 0.4 sec and shorter than 0.6 sec.

20. The data communication method according to claim 16, wherein the performing step comprises determining the transmission speed on the basis of a time of the TCF signal and a maximum reception time of continuous "0" data.

21. The data communication method according to claim 20, wherein when the training/TCF signals are transmitted at 7,200 bps, said transmission speed determining means determines 9,600 bps when the maximum reception time of continuous "0" data at a reception-side apparatus side is longer than 1.4 sec; 7,200 bps when the maximum reception time of continuous "0" data is equal to or longer than 1.0 sec and shorter than 1.4 sec; 4,800 bps when the maximum reception time of continuous "0" data is equal to or longer than 0.8 sec and shorter than 1.0 sec; 2,400 bps when the maximum reception time of continuous "0" data is equal to or longer than 0.6 sec and shorter than 0.8 sec; and line disconnection when the maximum reception time of continuous "0" data is shorter than 0.6 sec.

22. The data communication method according to claim 16, wherein the subsequent communication is performed at a desired transmission speed of the plurality of transmission speeds in the performing step.

23. A data communication method for performing communication by selecting one of a plurality of transmission speeds, comprising the steps of:
  transmitting line check data for determining a transmission speed;
  receiving the line check data;
  confirming that the line check data is received satisfactorily a predetermined number of times;
  selecting a desired one of the plurality of transmission speeds in accordance with a number of times the line check data is received satisfactorily or a number of times the line check data is not received satisfactorily;
  transmitting a response for designating the selected transmission speed;
  receiving the response; and
  performing a transmission speed changing operation in accordance with the received response.

24. The data communication method according to claim 23, wherein the line check data are included in training/TCF signals.

25. The data communication method according to claim 23, further comprising the step of determining an optimal transmission time on the basis of a time of the TCF signal and a maximum reception time of continuous "0" data.

26. A data communication system capable of performing communication at a plurality of transmission speeds, comprising:
  a transmission-side apparatus that transmits first data at a first transmission speed, said first data including a unique signal and continuous "1" data; and
  a reception-side apparatus that instructs said transmission-side apparatus to transmit second data at a second transmission speed by falling back from the first transmission speed by a desired number of steps in response to a reception state of the first data and first threshold values;
  wherein said transmission-side apparatus retransmits the second data at a second transmission speed in accordance with the instruction from said reception-side apparatus,
  wherein said reception-side apparatus determines whether or not the second transmission speed is satisfactory on the basis of a reception state of the second data and second threshold values, and wherein said reception-side apparatus determines the second transmission speed on the basis of a time of the unique signal and a maximum reception time of the continuous "1" data, and determines the number of fall-back steps so that the transmission speed of the transmission side apparatus coincides with the determined second transmission speed or with the first transmission speed.

27. The data communication system according to claim 26, wherein said reception-side apparatus determines a number of fall-back steps on the basis of training/unique signals sent prior to communication of an image signal.

28. The data communication system according to claim 26, wherein said transmission-side apparatus performs a fall-back operation in accordance with the instruction from said reception-side apparatus, and transmits training/unique signals and an image signal.

29. The data communication system according to claim 27, wherein said reception-side apparatus issues, to said transmission-side apparatus, an image transmission instruction at the present transmission speed when the maximum reception time of continuous "1" data is equal to or longer than 0.7 sec; a 1-step fall-back instruction when the maximum reception time of continuous "1" data is equal to or longer than 0.6 sec and shorter than 0.7 sec; a 2-step fall-back instruction when the maximum reception time of continuous "1" data is equal to or longer than 0.5 sec and shorter than 0.6 sec; and a 3-step fall-back instruction when the maximum reception time of continuous "1" data is shorter than 0.5 sec.

30. The data communication system according to claim 26, wherein said reception-side apparatus stores a plurality of predetermined threshold values corresponding to each of the plurality of transmission speeds.

31. A data communication method capable of performing communication at a plurality of transmission speeds, comprising the steps of:
receiving data transmitted at a first transmission speed;
determining a desired second transmission speed from the plurality of transmission speeds on the basis of a reception state in the receiving step; and
transmitting, when the transmission data cannot be satisfactorily received from a destination apparatus, a full-duplex instruction signal through a backward channel during the data reception in the receiving step to communicate the data at the second transmission speed.

32. The data communication method according to claim 31, wherein the second transmission speed on the basis of a time of a unique signal and a maximum reception time of continuous "1" data, and the number of fall-back steps to the second transmission speed or transmission at the present transmission speed are determined in the determining step.

33. The data communication method according to claim 32 further comprising the step of instructing retransmission at the present transmission speed when the maximum reception time of continuous "1" data is equal to or longer than 0.7 sec; a 1-step fall-back instruction when the maximum reception time of continuous "1" data is equal to or longer than 0.6 sec and shorter than 0.7 sec; a 2-step fall-back instruction when the maximum reception time of continuous "1" data is equal to or longer than 0.5 sec and shorter than 0.6 sec; and a 3-step fall-back instruction when the maximum reception time of continuous "1" data is shorter than 0.5 sec.

34. The data communication method according to claim 31, further comprising the step of determining a number of fall-back steps on the basis of a training-/unique signal sent prior to communication of an image signal.

35. A data communication method capable of performing communication at a plurality of transmission speeds, comprising the steps of:
transmitting data at a first transmission speed to a destination apparatus;
receiving a full-duplex response from the destination apparatus through a backward channel during the data transmission in the transmitting step; and
performing data transmission at a desired second transmission speed of the plurality of transmission speeds corresponding to the full-duplex response received in the receiving step.

36. The data communication method according to claim 34, wherein a response to define a desired second transmission speed is received in the receiving step.

37. A data communication apparatus capable of performing communication at a plurality of transmission speeds, comprising:
communication means for communicating information for specifying a first speed with a communication partner;
selecting means for selecting threshold values corresponding to the first speed;
arithmetic means for calculating an error during reception of data transmitted by the communication partner at the first speed; and
determining means for determining a second transmission speed for communicating with the communication partner in accordance with the error calculated by said arithmetic means and the threshold values selected by said selecting means.

38. The apparatus according to claim 37, wherein said arithmetic means calculates a mean square error during reception of the predetermined data.

39. The apparatus according to claim 38, wherein said determining means compares the mean square error calculated by said arithmetic means with the threshold value, when the mean square error is smaller than the threshold value, said determining means selects a high transmission speed and when the mean square error is larger than the threshold value, the determining means selects a low transmission speed.

40. The apparatus according to claim 37, wherein said arithmetic means includes a square error arithmetic circuit and an IDS filter, and wherein said square error arithmetic circuit includes an absolute value error arithmetic circuit.

41. The apparatus according to claim 37, wherein said arithmetic means comprises a square error arithmetic circuit and a low-pass filter.

42. The data communication apparatus according to claim 37, wherein said arithmetic means counts a number of times of erroneous receiving of the transmitted data.

43. The data communication apparatus according to claim 37, wherein said determining means compares the threshold value which varies in accordance with the first speed with the error.

44. The apparatus according to claim 37, wherein said determining means comprises means for storing a plurality of threshold values corresponding to each of the plurality of transmission speeds.

45. A data communication method capable of performing communication at plural transmission speeds, comprising the steps of:
- selecting a first speed from the plural transmissions speeds;
- selecting threshold values corresponding to the first speed;
- calculating an error during reception of predetermined data transmitted at the first speed;
- determining a second transmission speed based upon the error calculated in the calculating step and the selected threshold values.

46. The method according to claim 45, wherein the calculation in the calculating step is performed by a square error arithmetic circuit and an IDF filter.

47. The method according to claim 46, wherein said square error arithmetic circuit includes an absolute value error arithmetic circuit.

48. The method according to claim 45, wherein the calculation in the calculating step is performed by a square error arithmetic circuit and a low-pass filter.

49. The method according to claim 45, wherein in the calculating step a mean square error accumulation value is calculated and the threshold value is compared to the means square error accumulation value, and when the mean square error accumulation value is smaller than the threshold value, a high transmission speed is selected and when the mean square error accumulation value is larger than the threshold value, a low transmission speed is selected.

50. The data communication method according to claim 45, wherein the number of times of erroneous receiving of the transmitted data is counted in the calculating step.

51. The data communication method according to claim 45, wherein the threshold value which varies in accordance with the first speed is compared with the error.

52. The data communication method according to claim 45, further comprising the step of predetermining a plurality of threshold values corresponding to each of the plurality of transmission speeds.

53. A data communication apparatus capable of performing communication at a plurality of transmission speeds, comprising:
- count means for counting a number according to reception errors; and
- determining means for determining a transmission rate on the basis of a count of said count means.

54. The apparatus according to claim 53, wherein said determining means selects a high transmission speed when the count of said count means is smaller than a predetermined threshold value, and selects a low transmission speed when the count is larger than the predetermined threshold value.

55. The data communication apparatus according to claim 53, wherein said count means counts the number of times of erroneous receiving of the transmitted data.

56. The data communication apparatus according to claim 53, wherein said determining means determines a desired one of plural transmission speeds.

57. A data communication method capable of performing communication at a plurality of transmission speeds, comprising the steps of:
- counting a number according to errors during a predetermined reception period; and
- determining a transmission speed upon a count counted in the counting step.

58. The data communication method according to claim 57, wherein a desired one of the plurality of transmission speeds is determined in the determining step.

59. The data communication method according to claim 57, wherein the number of times of erroneous receiving of the transmitted data is counted in the counting step.

60. The data communication method according to claim 35, wherein image data is transmitted in the transmitting step.

* * * * *

UNITED STATES PATENT AND TRADEMARK OFFICE
CERTIFICATE OF CORRECTION

PATENT NO. : 5,351,134
DATED : September 27, 1994
INVENTOR(S) : TATSUYA YAGUCHI, ET AL.

It is certified that error appears in the above-identified patent and that said Letters Patent is hereby corrected as shown below:

ON TITLE PAGE

In [30] Foreign Application Priority Data:
"Jun. 30, 1988 [JP] Japan ...... 160688" should read
--Jun. 30, 1988 [JP] Japan ..... 63-160688--.

COLUMN 2

Line 67, "signal "$a_k$" should read --signal $â_k$--.

COLUMN 3

Line 4, "signal "$a_k$" should read --signal $â_k$--.

COLUMN 4

Figure 21:
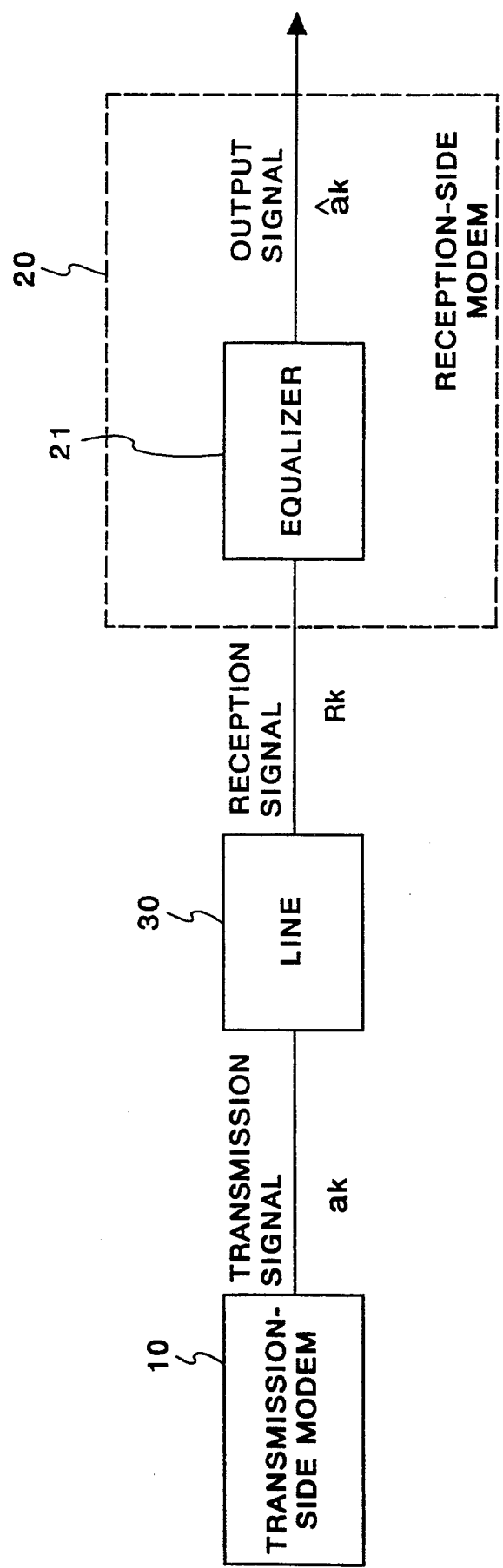
Figure 22A:
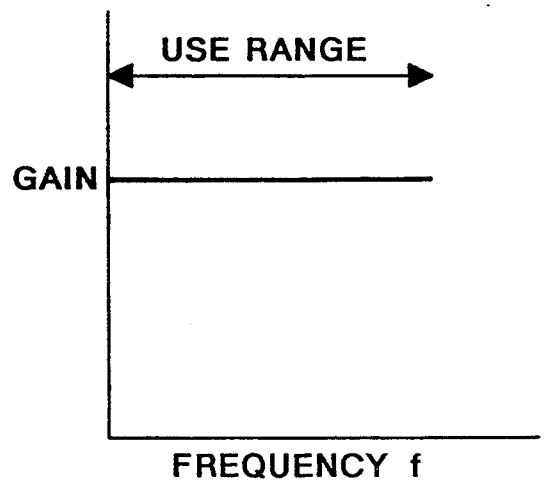
FIG. 22A is a graph showing frequency characteristics of a general line.
Figure 22B:
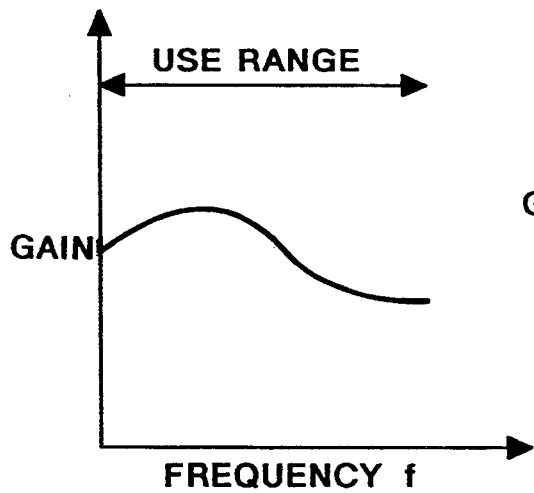
FIG. 22B is a graph showing frequency characteristics in a general equalizer.
Figure 22C:
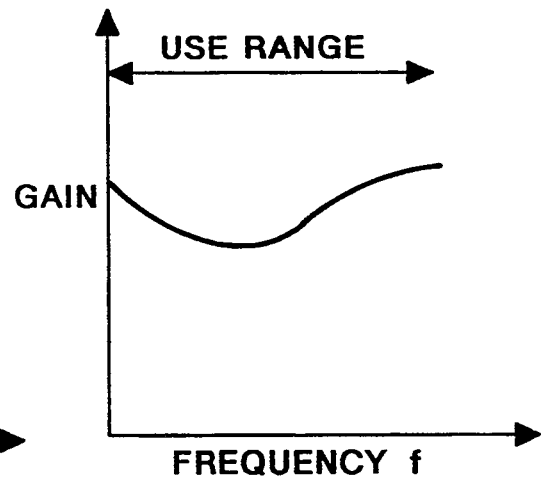
FIG. 22C is a graph showing frequency characteristics of a transmission signal from a general transmission-side apparatus modem, and frequency characteristics of an output signal corrected by the equalizer.

Line 13, "FIG. 21" should read --FIG. 20(B)--.

COLUMN 11

Line 42, "equalizer 201" should read --equalizer 114--.
Line 48, "$a_k)^2$" should read --$â_k)^2$--.
Line 53, "$a_k$:" should read --$â_k$:--.
Line 54, "$a_k=a_k$" should read --$â_k=a_k$--.
Line 57, "$y_k-a_k$:" should read --$y_k-â_k$:--

COLUMN 18

Line 33, "S1017," should read --2017,--.

COLUMN 21

Line 42, "con, hand" should read --command--.

UNITED STATES PATENT AND TRADEMARK OFFICE
CERTIFICATE OF CORRECTION

PATENT NO. : 5,351,134
DATED : September 27, 1994
INVENTOR(S) : TATSUYA YAGUCHI, ET AL.

It is certified that error appears in the above-identified patent and that said Letters Patent is hereby corrected as shown below:

COLUMN 25

Line 3, "0.1 sec," should read --1.0 sec,--.
  Line 35, "equal to or longer" should read --shorter--.

COLUMN 26

Line 60, "signal "338" should read --signal "3"--.

COLUMN 31

Line 40, "0.1 sec," should read --1.0 sec,--.

COLUMN 33

Line 65, "RTT3 signal" should read --FTT3 signal--.

COLUMN 38

Line 59, "step S62," should read --step S60,--.

COLUMN 41

Line 46, "DIS/DTC/ACS signals." should read
        --DIS/DTC/DCS signals.--.

COLUMN 44

Line 52, "shorter" should read --shorter than--.

COLUMN 48

Line 19, "claim 34," should read --claim 35,--.

UNITED STATES PATENT AND TRADEMARK OFFICE
CERTIFICATE OF CORRECTION

PATENT NO. : 5,351,134
DATED : September 27, 1994
INVENTOR(S) : TATSUYA YAGUCHI, ET AL.

It is certified that error appears in the above-identified patent and that said Letters Patent is hereby corrected as shown below:

<u>COLUMN 49</u>

Line 4, "transmissions" should read --transmission--.
    Line 9, "speed;" should read --speed; and--.
    Line 25, "means" should read --mean--.

Signed and Sealed this

Eleventh Day of April, 1995

Attest:

BRUCE LEHMAN

Attesting Officer      Commissioner of Patents and Trademarks